(12) United States Patent
Bove et al.

(10) Patent No.: US 7,552,079 B2
(45) Date of Patent: *Jun. 23, 2009

(54) COMPUTER-IMPLEMENTED APPARATUS FOR AUTOMATING AND EXECUTING INVESTMENT PLANNING FOR A CLIENT

(75) Inventors: Steven A. Bove, Scottsdale, AZ (US); Ralph C. Wileczek, Wilmington, DE (US); Jeanne Gill, Lansdale, PA (US)

(73) Assignee: The Vanguard Group, Inc., Malvern, PA (US)

( * ) Notice: Subject to any disclaimer, the term of this patent is extended or adjusted under 35 U.S.C. 154(b) by 166 days.

This patent is subject to a terminal disclaimer.

(21) Appl. No.: 11/636,894

(22) Filed: Dec. 11, 2006

(65) Prior Publication Data

US 2007/0083455 A1    Apr. 12, 2007

Related U.S. Application Data

(63) Continuation of application No. 09/328,626, filed on Jun. 9, 1999, now Pat. No. 7,149,713.

(51) Int. Cl.
*G06Q 40/00* (2006.01)
(52) U.S. Cl. .......................... 705/36 R; 705/37; 705/35
(58) Field of Classification Search .............. 705/35–45
See application file for complete search history.

(56) References Cited

U.S. PATENT DOCUMENTS 4,334,270 A    6/1982 Towers
4,674,044 A    6/1987 Kalmus et al.
4,751,640 A    6/1988 Lucas et al.

(Continued)

FOREIGN PATENT DOCUMENTS

GB    2306713    * 7/1997
WO    WO 99/05625    * 2/1999

OTHER PUBLICATIONS

Ibbotson Portfolio Strategist™ product description, Ibbotson Associates, printout from website (www.ibbotson.com/Products/software/portfolio.sub.—strategist.asp), Feb. 26, 1999 printout date, 2 pages.

(Continued)

*Primary Examiner*—Hani Kazimi
*Assistant Examiner*—Abhishek Vyas
(74) *Attorney, Agent, or Firm*—Panitch Schwarze Belisario & Nadel LLP

(57) ABSTRACT

An apparatus automates and executes investment planning for a client. The apparatus includes a processor and a trade execution computer. The processor receives data regarding the client's current asset portfolio, including the taxable status of each asset, the client's desired asset allocation, and the client's preferred domain. The processor is configured to use the data to automatically generate financial transaction recommendations for modifying the client's current asset portfolio to reach as close as possible to the desired asset allocation and the preferred domain. The recommendations include specific recommendations for selling amounts of selected current assets and specific recommendations for buying amounts of one or more investment funds. The trade execution computer is configured to sell amounts of selected current assets or buy amounts of one or more investment funds in accordance with the specific recommendations.

12 Claims, 30 Drawing Sheets

U.S. PATENT DOCUMENTS

| | | | |
|---|---|---|---|
| 5,126,936 A | 6/1992 | Champion et al. | |
| 5,132,899 A | 7/1992 | Fox | |
| 5,388,248 A | 2/1995 | Robinson et al. | |
| 5,418,888 A | 5/1995 | Alden | |
| 5,644,727 A | 7/1997 | Atkins | |
| 5,774,881 A | 6/1998 | Friend et al. | |
| 5,799,287 A | 8/1998 | Dembo et al. | |
| 5,812,987 A | 9/1998 | Luskin et al. | |
| 5,819,238 A | 10/1998 | Fernholz | |
| 5,819,263 A | 10/1998 | Bromley et al. | |
| 5,852,811 A | 12/1998 | Atkins | |
| 5,864,828 A | 1/1999 | Atkins | |
| 5,884,287 A | 3/1999 | Edesess | |
| 5,999,918 A | 12/1999 | Williams et al. | |
| 6,018,722 A | 1/2000 | Ray et al. | |
| 6,021,397 A | 2/2000 | Jones et al. | |
| 6,161,098 A * | 12/2000 | Wallman | 705/36 T |
| 6,430,541 B1 * | 8/2002 | Brown et al. | 705/28 |
| 6,430,542 B1 * | 8/2002 | Moran | 705/36 R |
| 6,601,044 B1 * | 7/2003 | Wallman | 705/36 R |

OTHER PUBLICATIONS

"Financial Planning for the Long Term." Interview with R. W. Stevens, Principal, Vanguard Personal Financial Services, printout from website (www.vanguard.com/cgi-bin/NewsPrint/878914651) posted on Nov. 7, 1997, website hosted by Vanguard Marketing Corporation, Jan. 13, 1999 printout date, 4 pages.

"Portfolio Planning: Integrating Your 401(k) Into Your Investment Portfolio," online publication of In the Vanguard, Summer 1997, printout from website (www.vanguard.com/educ/newss . . . TV/1997Summer/Your401ksumm1997.html) hosted by Vanguard Marketing Corporation, Jan. 13, 1999 printout date, 2 pages.

Laderman, J.M. "First, Asset Allocation. Now, "Asset Placement"", Business Week Online: Your Money, , The McGraw-Hill Companies, Inc., Aug. 14, 1997, printout from website (www.businessweek.com/bwdaily/dnflash/august/nf70814a.htm), Jan. 13, 1997 printout date, 2 pages.

* cited by examiner

PORTFOLIO ALLOCATIONS

| Portfolio | 1 Tax | 2 Tax | 3 Tax | 4 Tax | 5 Tax | 6 Tax | 7 Tax |
|---|---|---|---|---|---|---|---|
| Cash | 10% | 5% | | | | | |
| Stocks | | | | | | | |
| Large Mkt Index | 7% | 14% | 13% | 16% | 20% | 22% | 28% |
| Large Growth | | | 6% | 8% | 10% | 11% | 14% |
| Large Value | | | 6% | 8% | 11% | 12% | 14% |
| Total Large Mkt | 7% | 14% | 25% | 32% | 41% | 45% | 56% |
| Mid-Small Active | | | 5% | 6% | 8% | 9% | 12% |
| Mid-Small Index | 3% | 6% | 5% | 7% | 9% | 10% | 12% |
| Total Mid-Small | 3% | 6% | 10% | 13% | 17% | 19% | 24% |
| International Developed | | | | 4% | 6% | 14% | 18% |
| International Emerging Mkts. | | | | 1% | 1% | 2% | 2% |
| Total International | | | | 5% | 7% | 16% | 20% |
| Total Stocks | 10% | 20% | 35% | 50% | 65% | 80% | 100% |
| Bonds | | | | | | | |
| Short-Term | | | | | | | |
| STCorp | 58% | 40% | 17% | 13% | 10% | 3% | |
| ST Treasury | 14% | 9% | 6% | 5% | 4% | 2% | |
| Total Short-Term Bonds | 72% | 49% | 23% | 18% | 14% | 5% | |
| Intermediate Term | | | | | | | |
| IT Corp | 8% | 22% | 20% | 13% | 11% | 13% | |
| IT Treasury | | 4% | 5% | 4% | | 2% | |
| Total Intermediate-Term Bonds | 8% | 26% | 25% | 17% | 11% | 15% | |
| Long-Term/High Yield | | | | | | | |
| Long-Term Corp | | | 3% | 2% | 2% | | |
| Long-Term Treasury | | | 4% | 3% | 3% | | |
| Total Long-Term Bonds | | | 7% | 5% | 5% | | |
| High Yield Taxable | | | 10% | 10% | 5% | | |
| Total High Yield Bonds | | | 10% | 10% | 5% | | |
| Total Long-Term/High Yield Bonds | | | 17% | 15% | 10% | | |
| Total Bonds | 80% | 75% | 65% | 50% | 35% | 20% | |

*Fig. 2A*

| Portfolio | 1 Non-Tax | 2 Non-Tax | 3 Non-Tax | 4 Non-Tax | 5 Non-Tax | 6 Non-Tax |
|---|---|---|---|---|---|---|
| Cash | | | | | | |
| Stocks <br> Large Mkt Index <br> Large Growth <br> Large Value <br> Total Large Mkt | | | | | | |
| Mid-Small Active <br> Mid-Small Index <br> Total Mid-Small | | | | | | |
| International Developed <br> International Emerging Mkts. <br> Total International | | | | | | |
| Total Stocks | | | | | | |
| Bonds <br> ST Tax Exempt <br> Total Short-Term Bonds | 72% <br> 72% | 49% <br> 49% | 23% <br> 23% | 18% <br> 18% | 14% <br> 14% | 5% <br> 5% |
| Intermediate Term <br> IT Tax Exempt <br> Total Intermediate-Term Bonds | 8% <br> 8% | 26% <br> 26% | 25% <br> 25% | 17% <br> 17% | 11% <br> 11% | 15% <br> 15% |
| Long-Term/High Yield <br> Long-Term Municipal <br> Total Long-Term Bonds | | | 10% <br> 10% | 10% <br> 10% | 5% <br> 5% | |
| High Yield Tax Exempt <br> Total High Yield Bonds | | | 7% <br> 7% | 5% <br> 5% | 5% <br> 5% | |
| Total Long-Term/High Yield Bonds | | | 17% | 15% | 10% | |
| Total Bonds | 80% | 75% | 65% | 50% | 35% | 20% |

*Fig. 2B*

PFP Questionnaire v3.0: Core Data - Mailing Address

Client: Basic, Billy
Household ID: 112326
Questionnaire No: 83590

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information INVESTMENT PLANNING ANALYSIS
10. Financial Objectives
11. Risk Assessment
12. Past Investment Experience
13. Additional Experience RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information ESTATE PLANNING ANALYSIS
22. Estate planning
23. Current and Future Pension Income
24. Additional Estate Information

1. Family Members

| | Last Name | First Name | MI | Birth Date | Social Security # | US Citizen? | Gender | State | Relationship |
|---|---|---|---|---|---|---|---|---|---|
| ✓ | Basic | Billy | | | 123-37-2987 | ☐ | M | PA | Primary |
| | | | | | | | | | |
| | | | | | | | | | |
| | | | | | | | | | |
| | | | | | | | | | |

2. Mailing Address

Name: Billy Basic
Address: 123 Haddon Ave.
Line 2:
Line 3:
Line 4:
City: Haddonfield   State: NJ   Zip: 08009-
County:   ▽ Foreign Postal Code:

Phone
⊙ Home: (609) 555-1212
○ Business:
Fax Number:
Email Address:
Foreign Phone:
Foreign Fax:

3. Marital Status
⊙ Single    ○ Married

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information

INVESTMENT PLANNING ANALYSIS
10. Financial Objectives
11. Risk Assessment
12. Past Investment Experience
13. Additional Experience

RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information

ESTATE PLANNING ANALYSIS
22. Estate planning
23. Current and Future Pension Income
24. Additional Estate Information PFP Questionnaire v3.0: Core Data - Investment Assets Client: Basic, Billy
Household ID: 112326
Questionnaire No: 83590

Investment Assets

| Asset | Asset Type | Owner | Market Value | Cost Basis | Repositionable |
|---|---|---|---|---|---|
| Vanguard Explorer | Vanguard Fund | Billy Basic | $100,000.00 | $3,000.00 | ☑ |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

Vanguard Asset Valuation Date: [ ]     Total Market Value of Investment Assets: $100,000.00

PFP Questionnaire v3.0: Investment Analysis: Experience

Client: Rebal, Michael
Household ID: 112934
Questionnaire No: 04201

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information

INVESTMENT PLANNING ANALYSIS
10. Financial Objectives
11. Risk Assessment
12. Past Investment Experience
13. Additional Experience

RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information

ESTATE PLANNING ANALYSIS
22. Estate planning
23. Estate planning (page 2)
24. Current and Future Pension Income
25. Additional Estate Information

| | Level of Previous Investment Experience | Level of Satisfaction with the Investment |
|---|---|---|
| Short-term assets: | ○ None ○ Low ○ Med ● High | ○ V Low ○ Low ● Med ○ High ○ V High ○ N/A |
| US Govt/Corp Bonds: | ○ None ○ Low ● Med ○ High | ○ V Low ○ Low ○ Med ● High ○ V High ○ N/A |
| High Yield/Junk Bonds: | ○ None ○ Low ○ Med ● High | ○ V Low ○ Low ○ Med ● High ○ V High ○ N/A |
| US Large-Cap Stocks: | ○ None ○ Low ○ Med ● High | ○ V Low ○ Low ○ Med ○ High ● V High ○ N/A |
| US Small-Cap Stocks: | ○ None ○ Low ○ Med ● High | ○ V Low ○ Low ○ Med ○ High ● V High ○ N/A |
| Foreign Stocks/Bonds: | ○ None ○ Low ○ Med ● High | ○ V Low ○ Low ○ Med ○ High ● V High ○ N/A |

Ibbotson

SAA: [ ]

[Calculate SAA]

Ibbotson Score: [ ]

Preferred SAA: [ ]

[Run Ibbotson Report...]

Model Grids:
| # | Min | Max |
|---|---|---|
| 1 | 9 | 22 |
| 2 | 23 | 31 |
| 3 | 32 | 39 |
| 4 | 40 | 50 |
| 5 | 51 | 58 |
| 6 | 59 | 68 |
| 7 | 69 | 75 |

Current SAA

| SAA Code | SAA Percentage | SAA Amount |
|---|---|---|
| Bonds | 0.00% | $0 |
| Cash | 6.00% | $50,000 |
| Stocks | 94.00% | $735,600 |

Investment Stage
● Income
○ Accumulation

Annual Income Needed: $0

Portfolio Tilt:
● Core
○ Income
○ Tax Efficient

*Fig. 3E*

| Analysis for Invest | | | | |
|---|---|---|---|---|
| Client Data | Detailed Parameters | Desktop System | Distributed System | Common |

Kit Requested: Apr 8, 1998

Questionnaire Received: Apr 8, 1998

Questionnaire Last Modified: November 4, 1998 3:26 P

Counselor Assigned:

Auto Rebalancing
☑ Show Intermediate Screens

☑ Save Spreadsheets
☑ Format Report

Choose Service
- Retirement...
- Estate...
- Investment...
- VPAS...

Path:

Questionnaire Notes:
Questionnaire record automatically creat

Close

*Fig. 4*

Target Allocation

Vanguard Funds    Enter Fund ID: [  ]

| ID | Name | Class |
|----|------|-------|
| 19 | Vanguard Admiral Intermedi | B3 |
| 20 | Vanguard Admiral Long-Ter | B4 |
| 12 | Vanguard Admiral Short-Ter | B2 |
| 11 | Vanguard Admiral U.S. Trea | C1 |
| 78 | Vanguard Asset Allocation | BL |
| 2  | Vanguard Balanced Index | BL |
| 314 | Vanguard Bond Index - Inter | B3 |
| 522 | Vanguard Bond Index - Lon | B4 |
| 132 | Vanguard Bond Index - Sho | B2 |
| 84 | Vanguard Bond Index - Tota | B3 |
| 100 | Vanguard CA Tax-Free - Ins | B6 |
| 75 | Vanguard CA Tax-Free - Ins | B7 |
| 62 | Vanguard CA Tax-Free - Mo | C2 |
| 82 | Vanguard Convertible Secur | S9 |
| 528 | Vanguard Employee Index | S7 |
| 65 | Vanguard Equity Income | S9 |
| 24 | Vanguard Explorer | S3 |
| 36 | Vanguard GNMA | B4 |
| 29 | Vanguard High Yield Corpo | B4 |
| 71 | Vanguard Intermediate-Ter | B3 |

Get Recommended Funds
- ○ Show Taxable Bonds
- ○ Show Exempt Bonds
- ● Show Both

[Clear List] [Get Funds]

☑ Use Auto Rebalancing

[Auto Rebalancing]
[Manual Rebalancing]
[Show Current Assets]

Selected Funds

| ID | Name | Amount | Plan/Owner |
|----|------|--------|------------|
| 26 | Vanguard/Morgan Gr | ($15,000) | Sam |
| 78 | Vanguard Asset Alloc | $0.00 | Sam |
| 103 | Vanguard Tax-Manag | $10,000 | Sam-401K |
| 115 | Vanguard Horizon Fu | $0.00 | Sam |
| 129 | Vanguard Horizon Fu | $100,000 | Marge-IRA |

Total Allocated: $95,000.00

Client SAA: [ 4 ]
Preferred SAA: [ 4 ]

[Cancel] [Cancel]

*Fig. 5*

Manual Fund Rebalancing

Proposed: $95,000.00 − Current: $2,100,000.00 = Difference: ($2,005,000.00)

Current and Proposed Investment Portfolio

| Item | Asset Class | Owner | Tax Status | Current Total | Current Total% | Suggested Change (+/-) | Proposed Total | Proposed Total% | Target Total% | Basis |
|---|---|---|---|---|---|---|---|---|---|---|
| Cash Reserves □ | CS | | | | | | | | | |
| Stock/Cash Bal (50% Cash) | CS | Sam | Taxable | $50,000.00 | | | | | | $0.00 |
| Vanguard Money Market - Prime | CS | Marge | Taxable | $50,000.00 | | | | | | $0.00 |
| Vanguard Money Market - Prime | CS | Marge | Taxable | $50,000.00 | | | | | | $0.00 |
| Vanguard Horizon - Global Asset Alloc(22%) | CS | Sam | Taxable | $22,000.00 | | | | | | $0.00 |
| Vanguard Asset Allocation (20%) | CS | Sam | Taxable | $20,000.00 | | $0.00 | $0.00 | | | $0.00 |
| Vanguard Asset Allocation (20%) | CS | Sam | Taxable | | | $0.00 | $0.00 | | | $0.00 |
| Vanguard Horizon - Global Asset Alloc(22%) | CS | Sam | Taxable | | | | | | | |
| Total - Cash Reserves □ | | | | $192,000.00 | 9.14% | | $0.00 | 0.00% | 0.00% | |
| | | | | | | | | | | |
| Total - Cash Reserves □ | | | | $192,000.00 | 9.14% | | $0.00 | 0.00% | | |
| | | | | | | | | | | |
| Bonds □ | BI | | | | | | | | | |
| Individual Bond □ | BI | | | | | | | | | |
| Bonds | | Marge | Taxable | $100,000.00 | | | | | | $0.00 |
| Stock/Bond Bal (50% Bond) | BI | Sam | Taxable | $50,000.00 | | | | | | $0.00 |
| Total - Individual Bond □ | | | | $100,000.00 | 7.14% | | $0.00 | 0.00% | 0.00% | |

All column totals are currently accurate.

Balanced Funds

| Item | Owner | Current Total | Suggested Change (+/-) | Proposed Total |
|---|---|---|---|---|
| CREF - Bond Market | Sam | $0.00 | $0.00 | $0.00 |
| CREF - Equity Index | Sam | $100,000.00 | $0.00 | $0.00 |
| CREF - Global Equities | Sam | $100,000.00 | $0.00 | $0.00 |
| CREF - Growth | Sam | $100,000.00 | $0.00 | $0.00 |

Legend: Current Assets, Proposed Assets, Subasset Class/Total, Asset Class/Total, Grand Total, Deleted Line Item

[Ok] [Cancel]

Fig. 6

PORTFOLIO ALLOCATIONS

| PORTFOLIO | 1 | 2 | 3 | 4 | 5 | 6 | 7 |
|---|---|---|---|---|---|---|---|
| BONDS | 80% | 75% | 65% | 50% | 35% | 20% | 0% |
| High Yield* | 0% | 0% | 10% | 10% | 5% | 0% | 0% |
| Long-Term* | 0% | 0% | 7% | 5% | 5% | 0% | 0% |
| Intermediate-Term Index | 0% | 8% | 10% | 8% | 0% | 4% | 0% |
| Intermediate-Term Active | 8% | 18% | 15% | 9% | 11% | 11% | 0% |
| Short-Term Index | 24% | 15% | 10% | 8% | 7% | 4% | 0% |
| Short-Term Active | 48% | 34% | 13% | 10% | 7% | 1% | 0% |
| STOCKS | 10% | 20% | 35% | 50% | 65% | 80% | 100% |
| Large Market/Index | 7% | 14% | 12% | 16% | 20% | 22% | 28% |
| Large Growth | 0% | 0% | 6% | 8% | 10% | 11% | 14% |
| Large Value | 0% | 0% | 6% | 8% | 11% | 12% | 14% |
| Mid/Small Market/Index | 3% | 6% | 6% | 6% | 8% | 10% | 12% |
| Mid Active | 0% | 0% | 2% | 3% | 4% | 4% | 6% |
| Small Active | 0% | 0% | 3% | 4% | 5% | 5% | 6% |
| International-Developed | 0% | 0% | 0% | 4% | 6% | 13% | 16% |
| International-Emerging | 0% | 0% | 0% | 1% | 1% | 3% | 4% |

\* When using Municipal Bonds for portfolios 3 and 4, percentages are flipped for long-term and high-yield bonds. For portfolio 5 use 4% high-yield and 6 % long-term municipal bond.

*Fig. 7*

| Control |
|---|
| m_PreferredDomain : char[2]<br>m_MuniForInterTermBonds : boolean<br>m_MinRetirementFundBalance : ARValue<br>m_MuniForShortTermBonds : boolean<br>m_MuniForLongTermBonds : boolean<br>m_MuniForHighYield : boolean<br>m_ProduceExplanations : boolean<br>m_BusinessArea : char[4]<br>m_MinRetailFundBalance : ARValue<br>m_MinTransactionAmt : ARValue<br>m_TSMPToleranceBelow<br>m_TSMPToleranceAbove<br>m_TIPToleranceBelow<br>m_TIPToleranceAbove<br>m_CarryForwardLoss : ARValue<br>m_CurrentYearGains : ARValue<br>m_RoundingTo : int<br>m_EstimateTaxCostAssetPct<br>m_EstimateTaxCost : boolean<br>m_SAAVarianceAbove<br>m_SAAVarianceBelow<br>m_CapGainTaxRate<br>m_LegalResidenceState : char<br>m_TaxExemptDCAFund<br>m_PortfolioNumber : int<br>m_TacticalShift<br>m_PortfolioTilt<br>m_TaxAcctDCAFund<br>m_MaxAssetConstraints<br>m_MaxAssetVariable<br>m_RequiredVariables<br>m_RequiredConstraints |
| Control() |

*Fig. 9E*

| Database |
|---|
| $ m_LastFundID : String |
| getControlVariables()<br>getPurchaseOrder()<br>getTargetTemplate()<br>getAssetHierarchy()<br>getAssets()<br>getEquivalentAssets()<br>getAllInvestmentPlans()<br>connect()<br>disconnect()<br>searchAsset()<br>updateBreakdown()<br>searchInvestment()<br>updateInvestmentChoices()<br>getCandidateFunds() |

| InvestmentPlanData |
|---|
| getPlanId()<br>getTitle()<br>getPlanType()<br>getOwner()<br>getInvestmentRestrictedFlag()<br>getTaxFlag()<br>getRepositionDestination()<br>getRestrictedPlanId()<br>getRestrictedPlanChoices() |

| AssetData |
|---|
| getAssetId()<br>getAssetTitle()<br>getCurrentValue()<br>getHoldAmount()<br>getMinimumBalance()<br>getCostBasis()<br>getRepositionIndicator()<br>getFundID()<br>getVanguardFundFlag()<br>getCastBasisFlag()<br>getInvestmentPlanNumber()<br>getAssetClassBreakdown()<br>getVendor()<br>getVGIFundNumber()<br>getAfterTaxBalance()<br>getLoanAmount()<br>getBuyAmount()<br>getSellAmount()<br>getProposedAmount() |

| AssetHierarchyData |
|---|
| getAssetClass()<br>getParent()<br>getIncluded() |

| PurchasePreferenceData |
|---|
| getGrouping()<br>getSequenceNumber()<br>getAssetClassCode()<br>taxable() |

*Fig. 9F*

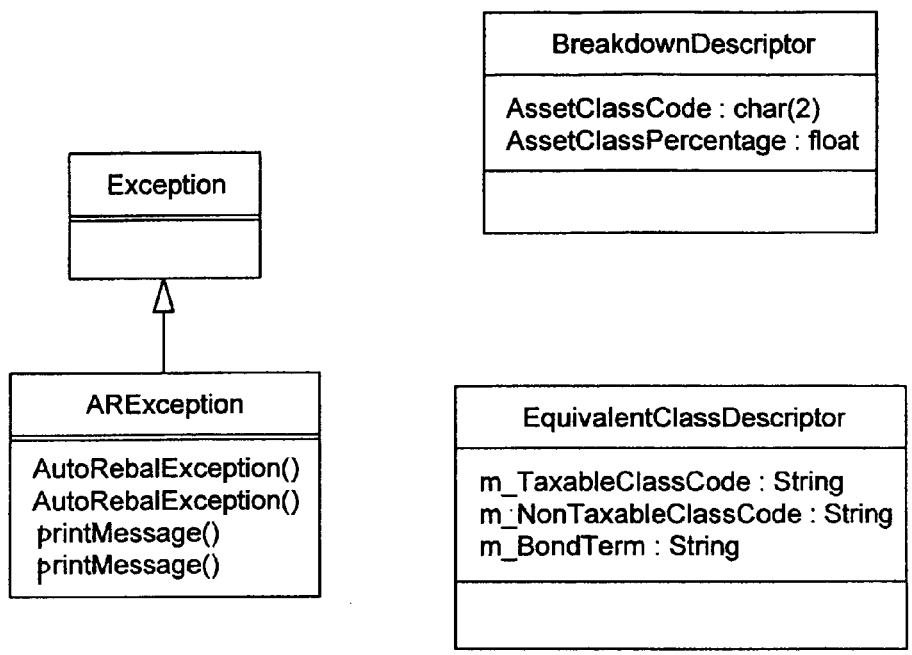
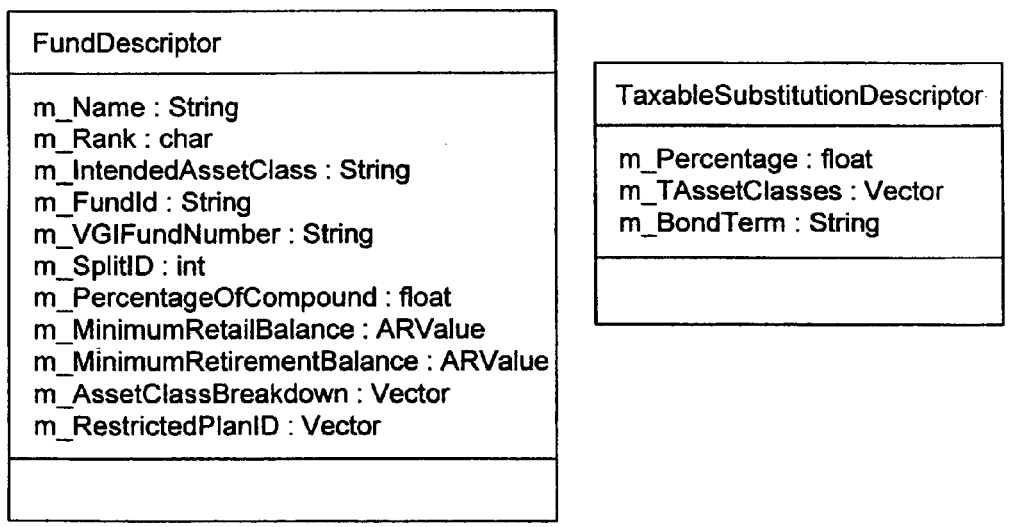
Fig. 9H

COMPUTER-IMPLEMENTED APPARATUS FOR AUTOMATING AND EXECUTING INVESTMENT PLANNING FOR A CLIENT

CROSS-REFERENCE TO RELATED APPLICATIONS

This application is a continuation of U.S. application Ser. No. 09/328,626 filed Jun. 9, 1999, now U.S. Pat. No. 7,149,713, the entire disclosure of which is incorporated herein by reference.

BACKGROUND OF THE INVENTION

The present invention relates to automated investment planning, particularly to systems and methods which automatically generate financial transaction recommendations for modifying a client's current asset portfolio to reach as close as possible to a desired asset allocation and asset placement (i.e., preferred domain).

Personal investment planning is a complex process. Accordingly, many software products have been developed to assist individual investors, investment counselors and investment professionals in the process. Software products have been developed to select the appropriate asset allocation and portfolio of assets within each asset class. A properly managed investment portfolio must be periodically rebalanced either to maintain the investor's desired allocation or to modify the current allocation to a different allocation if the needs of the investor changes. In the rebalancing process, specific assets are bought and/or sold.

The rebalancing process is conceptually simple. For example, if an investor's portfolio becomes too heavily weighted in equities and not sufficiently weighted in bonds for the desired asset allocation, then some stock assets are sold and some bond assets are purchased. However, the problem is deciding which stock assets to sell and which bond assets to purchase. Ideally, the investor would like to rebalance the portfolio without incurring any tax implications or transaction costs. However, selling stock assets almost always has tax implications, and any buying and selling of assets incurs transaction costs which immediately decrease the total assets of the investor. Thus, it is not necessarily beneficial to fully reach the desired asset allocation if doing so would incur excessive transaction costs and/or significant negative tax implications.

The conventional process of evaluating an investor's asset portfolio for rebalancing is a very labor intensive process even when assisted by a software program. Furthermore, even an experienced investment counselor cannot mentally sort through all of the factors to be considered in the rebalancing process so as to identify the best assets to buy and sell.

Despite the sophistication of conventional investment planning tools, there is still an unmet need for a rebalancing tool which automatically generates transaction recommendations that take into account an investor's desired asset allocation, as well as the investor's preferred domain, while minimizing tax implications and transaction costs. The present invention fulfills such a need.

BRIEF SUMMARY OF THE PRESENT INVENTION

One embodiment of the present invention provides a computerized scheme for automating investment planning for a client. In the scheme, data regarding the client's desired asset allocation (also referred to herein as the "strategic asset allocation" or SAA), current asset portfolio and preferred domain (also referred to herein as "asset placement") are input into a computer or processor. This data are used to automatically generate financial transaction recommendations for modifying the client's current asset portfolio to reach as close as possible to the desired asset allocation and the preferred domain. The recommendations include specific recommendations for selling amounts of selected current assets and specific recommendations for buying amounts of one or more investment funds. The recommendations are displayed on a summary report for review by the client or the client's financial manager. Alternatively, the recommendations are used to sell amounts of selected current assets or to buy amounts of one or more investment funds. In the alternative embodiment, the recommendations may be electronically communicated to a trade execution computer which automatically performs the necessary transactions to execute the buy/sell recommendations. The recommendations may suggest that the client add specific amounts of shares to currently held mutual funds, and/or open one or more new mutual funds and contribute specific amounts of shares to the new funds.

The recommendations are selected in a manner which minimizes the tax impacts and transaction costs of potential sell transactions, and the summary report includes the tax impacts and transaction costs of at least some of the recommendations.

In the scheme, the computer also receives data regarding the client's asset portfolio preferences, including current assets that the client wishes to hold or sell, any constraints on asset selling, and the client's Ibbotson score, and this data are also used to automatically generate the financial transaction recommendations. Target portfolio amounts and adjusted target portfolio amounts are developed for each asset category in the desired asset allocation.

The client's current asset portfolio includes repositionable assets, non-repositionable assets and possibly repositionable assets. The scheme recommends holding the client's possibly repositionable assets if the client's new asset allocation will be within a predetermined percentage of the desired asset allocation, such as 3%, after selling all of the client's repositionable assets. The scheme may also treat possibly repositionable assets as non-repositionable assets when making the current asset portfolio modifications. Furthermore, the scheme may also recommend selling the client's repositionable assets until the tax cost of selling equals a predetermined percentage of the client's current asset portfolio.

The present invention also provides a computer program product including at least one computer readable medium having computer program logic recorded thereon for automating investment planning for a client in accordance with the scheme described above.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIGS. 2A and 2B show sample portfolio allocations used in explaining Part I of the disclosure below;

FIGS. 3A through 3E are client questionnaire input screens;

FIG. 4 is a screen used to initiate analysis and report creation;

FIG. 5 is a screen used to specify funds which should be added to the client's proposed portfolio;

FIG. 6 is a worksheet screen for specifying buy/sell amounts;

FIG. 7 shows additional sample portfolio allocations used in explaining Part II of the disclosure below;

FIGS. 9A through 9H show class diagrams for all of the objects used in the present invention.

DETAILED DESCRIPTION OF THE INVENTION

Figure 1A:
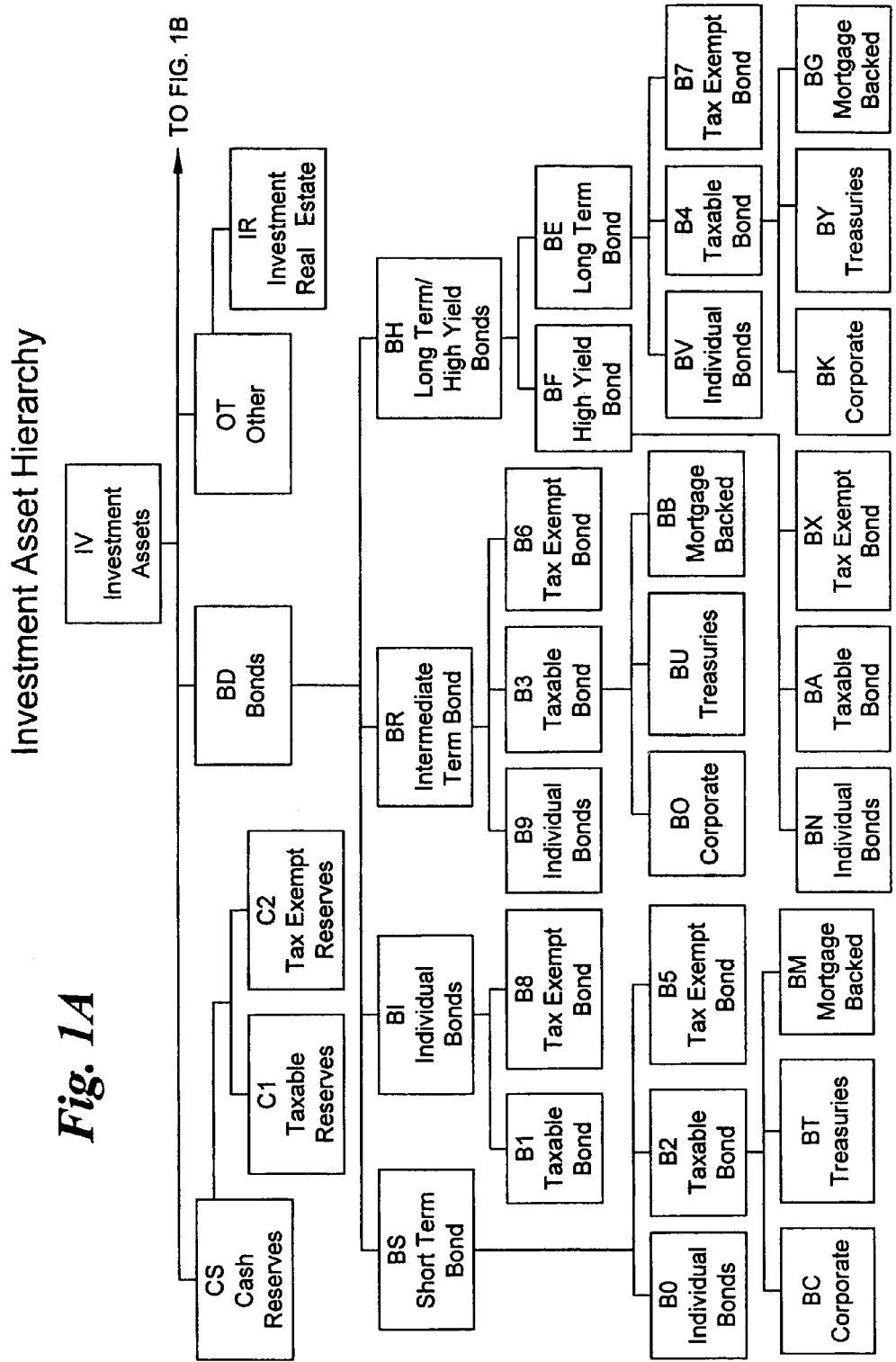
FIG. 1 is an investment asset hierarchy for use in the present invention.
Figure 1B:
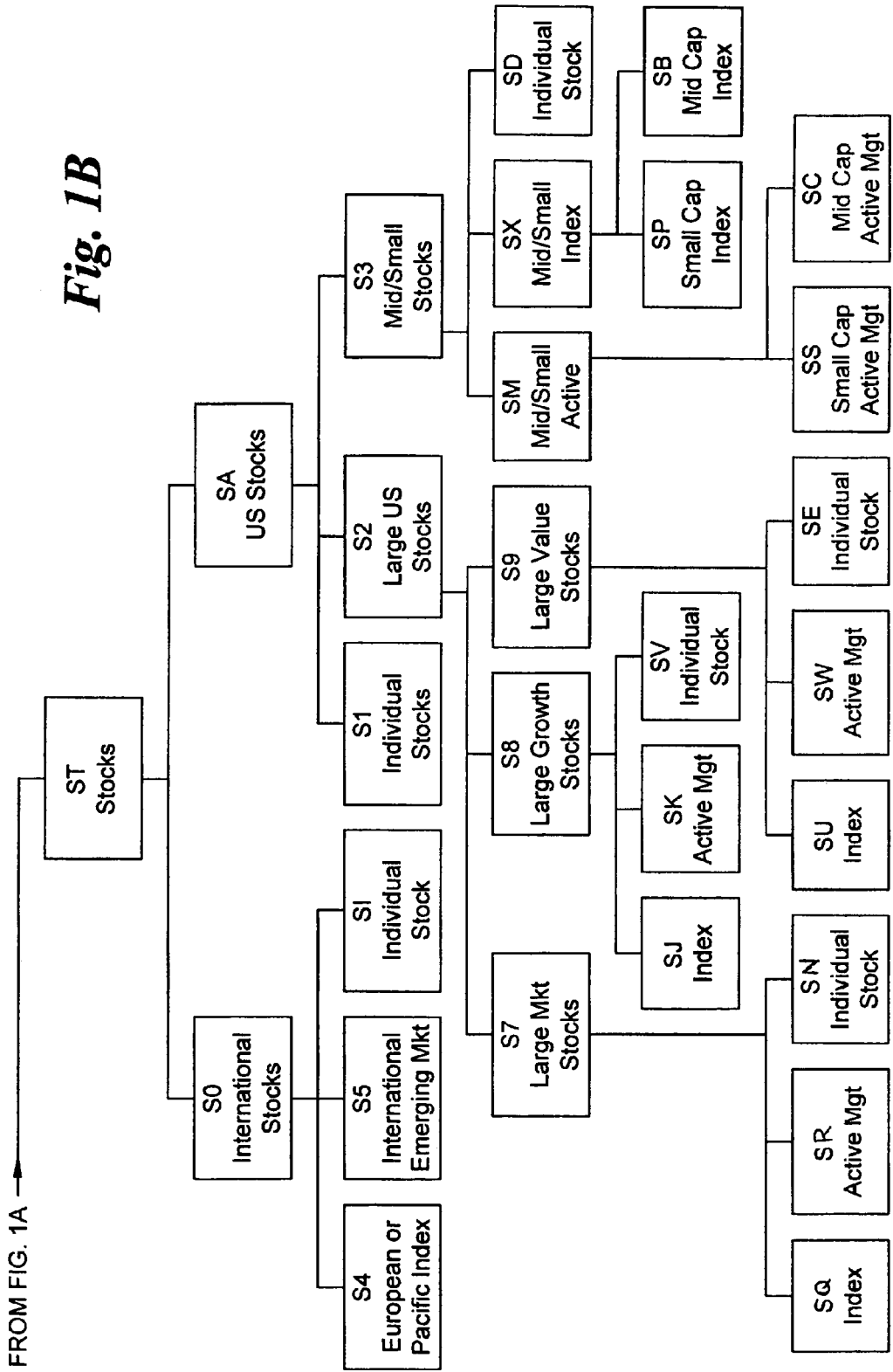

Certain terminology is used herein for convenience only and is not to be taken as a limitation on the present invention. In the drawings, the same reference letters are employed for designating the same elements throughout the several figures.

The present invention is described in the context of one or more software programs, collectively referred to as a "computer program product," for automatic rebalancing of assets. The phrase "Auto Rebal" is also used to refer to the automatic rebalancing process. The computer program product resides in one or more computer readable media having the computer logic recorded thereon, such as a magnetic or optical disk, RAM, ROM, or the like. The computer program product may be executed on any general purpose computer. When executed, the computer program product performs the functions provided by the computer program logic (i.e., software code) associated therewith.

The executed computer program product accepts input data regarding the investors, interchangeably referred to hereafter as "clients" or "customers," and provides outputs in the form of recommendations on a summary report or in the form of signals which execute automated buy/sell trades based on recommendations determined by the program. The client may interact with the executed computer program product directly, or a financial counselor may provide the inputs on behalf of the client. The description of the invention set forth below presumes that a counselor will interact with a client to provide all of the necessary input data.

Since the entire process occurs in a computerized and automated environment, the client, the computer program product, and the financial counselor (if used), may reside in the same physical location or each may be remote from one another and may communicate with each other by any suitable communication media. Furthermore, one or more portions of the computer program product may be remote from the general purpose computer which executes its software code. The present invention is thus best viewed as an automated financial service wherein the steps which are performed to provide the service and the associated physical hardware and software for performing the steps may be physically centralized or distributed in any suitable manner. The present invention may be implemented by any suitable combination of software and hardware.

The present invention is further described in the context of an automated financial service provided by a mutual fund entity, particularly, The Vanguard Group, Valley Forge, Pa. Thus, the examples provided herein which illustrate one embodiment of the present invention refer to specific Vanguard funds by their well-known fund names. The use of Vanguard funds to illustrate the invention is not intended to limit the scope of the invention in any manner. For example, most large, diversified mutual fund companies manage funds which have similar investment objectives as the funds described in the examples. Also, the funds described in the examples may be replaced with funds from a plurality of different mutual fund companies.

The example of the Vanguard automatic rebalancing process is explained in multiple parts, as follows:

PART I—Explains types of assets which are manipulated, provides sample portfolio asset allocations, shows sample client input screens and provides sample output report screens PART II—Explains the logic behind the entire process in accordance with the disclosed embodiment of the present invention.

PART III—Provides detailed, functional data flowcharts and class diagrams for the disclosed embodiment of the present invention.

APPENDIX—Provides a linear programming version of the disclosed embodiment of the present invention.

Figures 1, 8A:
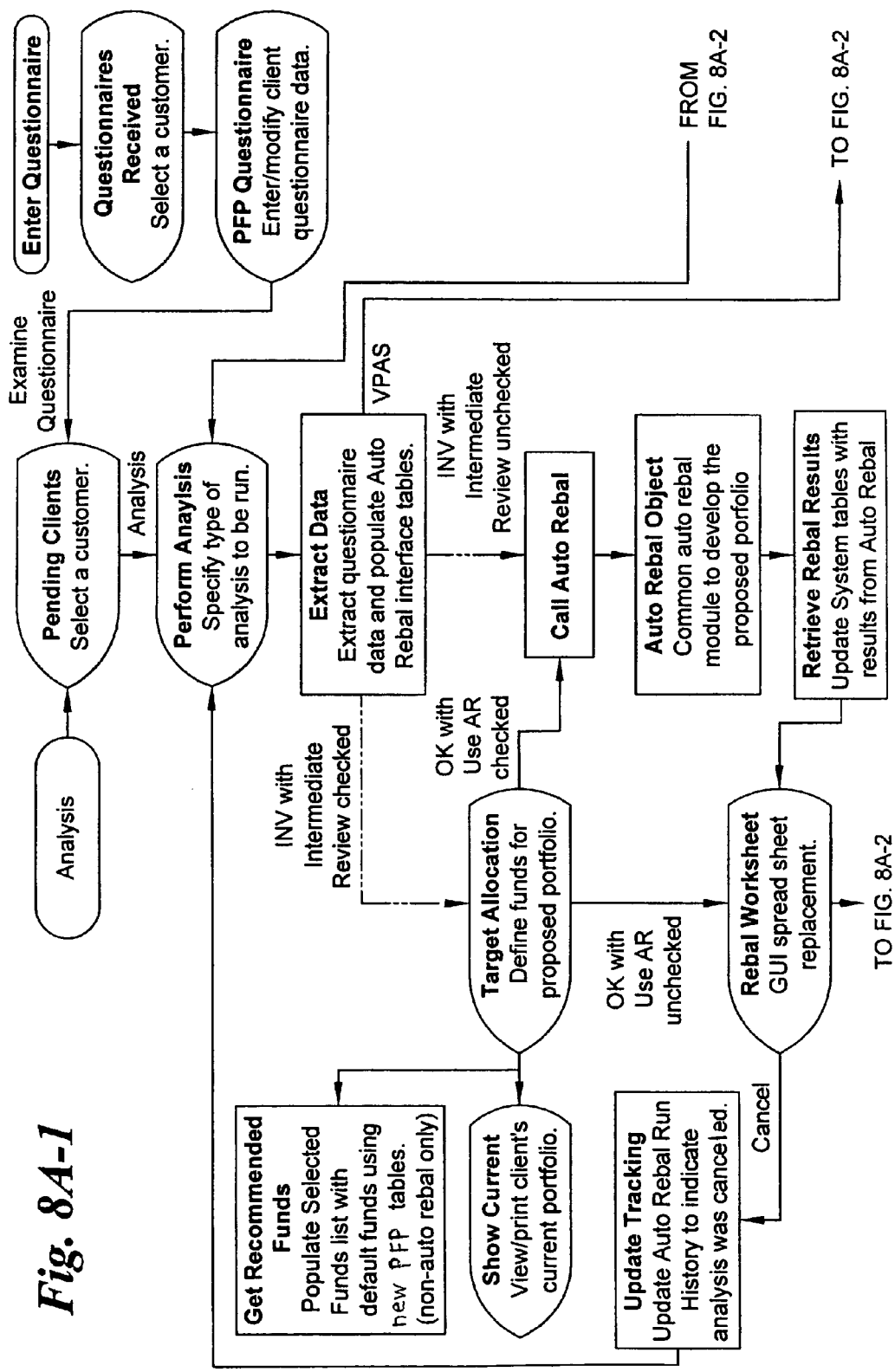
FIG. 8A through FIG. 8H, taken together, provide a detailed, functional data flowchart of the present invention.

FIG. 1 is a self-explanatory investment asset hierarchy which is necessary to understand the process. References are made to the asset hierarchy throughout the disclosure below.

Figures 2, 8A:
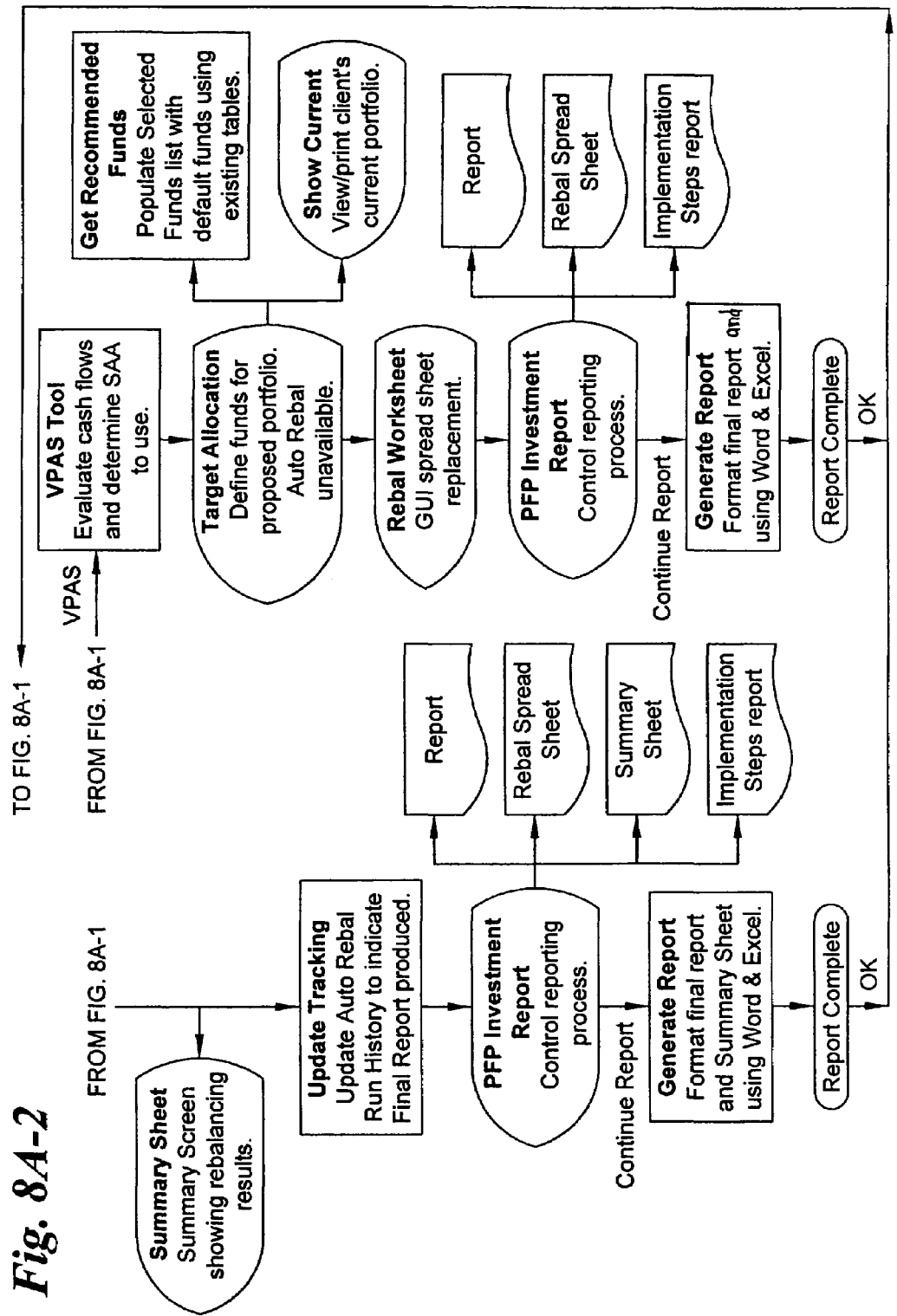

FIG. 2A shows seven sample taxable portfolio allocations, and FIG. 2B shows six sample non-taxable portfolio allocations.

Part I

Auto-Rebal Sales and Purchases

Step 1—Auto-Rebal sells repositionable assets and proceeds are put in a "money market" on a per registration basis.
  a. Non-Vanguard non-repositionable assets are never sold
  b. Non-Vanguard repositionable assets are always sold
  c. Vanguard non-repositionable assets are never sold
  d. Vanguard repositionable assets may or may not be sold
  Example: A client needs $100,000 of Windsor II. Preferred domain says we need municipals in taxable accounts. The client has $100,000 of
  Windsor II in a taxable account. Auto-Rebal will recognize that Windsor II should be kept.

Step 2—Auto-Rebal determines strategic asset allocation and sub-asset allocation by comparing the target portfolio amounts against what is non-repositionable. The greater of the non-repositionable amount or the target amount will be used as the proposed amount.

Step 3—Auto-Rebal makes purchases
  Auto-Rebal will make purchases in the following order:
  $1^{st}$—Stocks will be purchased into a Roth IRA if available.
  $2^{nd}$—Stocks will be purchased into an annuity if available.
  $3^{rd}$—Preferred domain rules are initiated.
    a. If the client is in the 39.6% MTB, bonds will be bought first every time.
    b. If the client is not in the 39.6% tax bracket and the income stage is checked, bonds will be bought first.
    c. If the client is not in the 39.6% tax bracket and the accumulative stage is checked, stocks will be bought first.
  $4^{th}$—Taxable accounts are used to buy stocks or bonds based on the above preferred domain rules until no taxable money is left. If additional purchases are required they will be made in retirement plans.
  $5^{th}$—Purchases are made in retirement accounts (other than Roth IRAs and annuities).
    a. Restricted plans (i.e., limited fund choices) are used first.
    b. Non-restricted plans are used next. (If a system limitation exists, restricted plans are used last. This may cause a purchase to be made in a less than optimal fund and may require a manual adjustment. For an example, see Auto Rebal Work Arounds.)

When making purchases, Auto-Rebal will follow the stocks out bonds in hierarchy or the bonds out stocks in hierarchy, as described below. Purchases are made from the accounts with the largest dollar balance first (based on the above), to minimize the duplication of funds.

I. Stock Outside Hierarchy
  1. Large Index Purchases (50% of large)
  2. Mid/Small Index (50% of mid/small)
  3. Growth Exposure (25% of large)
  4. Value Exposure (25% of large)
  5. Active Mid Cap Exposure (25% of mid/small)
  6. Active Small Cap Exposure (25% of mid/small)
  7. International Developed
  8. International Emerging II. Stock Inside Hierarchy
  1. International Developed
  2. International Emerging
  3. Active Small Cap Exposure (25% of mid/small)
  4. Active Mid Cap Exposure (25% of mid/small)
  5. Value Exposure (25% of large)
  6. Growth Exposure (25% of large)
  7. Mid/Small Cap Index Exposure (50% of mid/small)
  8. Large Index Exposure (50% of large)

III. Bonds Outside Hierarchy
  Municipal or Corporate Bonds will be purchased based on a client's tax bracket. The category order is illustrated below:
  A. Long-term Bond Exposure
    1. Corporate and Treasury, or
    2. Municipal
  B. High-Yield Bond Exposure
    1. Corporate, or
    2. Municipal
  C. Intermediate-Term Bond Exposure
    1. Corporate and Treasury, or
    2. Municipal
  D. Short-term Bond Exposure
    1. Corporate and Treasury, or
    2. Municipal IV. Bonds Inside Hierarchy
  A. Short-term Bond Exposure
    1. Corporate and Treasury
  B. Intermediate-Term Exposure
    1. Corporate and Treasury
  C. High-Yield Exposure
    1. Corporate
  D. Long-term Exposure
    1. Corporate and Treasury New Asset Classes A. Stocks
  1. Large Cap
    a. Index
    b. Active
      1. Growth
      2. Value
      3. Market
  2. Mid Cap
    a. Index
    b. Active
  3. Small Cap
    a. Index
    b. Active
B. Bonds (across the yield curve)
  1. Corporate
  2. Treasury
  3. Mortgage Vanguard Fund Choices (Core Portfolio)
Auto-Rebal will always purchase the preferred fund if any of the following conditions apply:
  1. The client has no funds in the asset class.
  2. The preferred fund is owned in isolation.
  3. The preferred fund is owned along with an alternate fund in the same registration.

Auto-Rebal will purchase the alternate fund if:
  1. It is the only fund owned in the asset class.
  2. If the preferred and alternate fund are owned in different registrations and preferred domain requires a purchase of the alternate fund.
  3. If it is the only available fund in the restricted plan.

For bonds, Auto-Rebal will attempt to use corporate and index funds whenever possible. If not possible, corporate and treasury funds will be used to achieve the appropriate corporate/treasury mix based on the portfolio in question. The "Alternate Funds" referred to below are not listed in order of preference.

I. STOCKS
  A. Large
    1. Index
      a. Preferred—500 Portfolio
      b. Alternate—Growth and Income, Trustees' Equity and Tax-Managed Growth & Income
    2. Growth
      a. Preferred—U.S. Growth
      b. Alternate—Morgan Growth and Index Growth
    3. Value
      a. Preferred—Windsor II
      b. Alternate—Equity Income and Index Value
  B. U.S. Total Stock Market (to be used when large market/index to mid/small market/index equals 70/30)
    1. Preferred—Total Stock Market
    2. Alternate—Tax-Managed Capital Appreciation
  C. Mid/Small U.S. Stocks
    1. Index
      a. Preferred—Extended Market
      b. Alternate—Index Small Cap
    2. Mid Cap Active
      a. Preferred—Horizon—Aggressive Growth
      b. Alternate—Primecap, Selected Value, Horizon—Capital Opportunity, Windsor
    3. Small Cap Active
      a. Preferred—Explorer
      b. Alternate—None
  D. International Stocks
    1. Developed
      a. Preferred—European and Pacific
      b. Alternate—None
    2. Emerging
      a. Preferred—Emerging Markets Index
      b. Alternate—None
    3. Total International
      a. Preferred—European Index and Pacific Index
      b. Alternate—International Growth and Trustees' International II. BONDS
  A. High Yield
    1. Municipal
      a. Preferred—High Yield Muni
      b. Alternate—None
    2. Corporate
      a. Preferred—High Yield Corporate
      b. Alternate—None B. Long-term
1. Municipal
   a. Preferred—Insured Long-term Muni or State specific Muni or State specific Muni if available
   b. Alternate—Long-term Muni
2. Taxable
   a. Preferred—Long-term Bond Index
   b. Alternate—Long-term Corporate and Admiral Long-term U.S. Treasury or Long-term U.S. Treasury
C. Intermediate-Term
1. Municipal
   a. Preferred—Intermediate-Term Muni or State specific Muni
   b. Alternate—None
2. Taxable
   a. Preferred—Intermediate-Term Bond Index and Intermediate-Term Corporate
   b. Alternate—Intermediate-Term Corporate and Admiral Intermediate-Term U.S. Treasury or Intermediate-Term U.S. Treasury
D. Short-term
1. Municipal
   a. Preferred—Short-term Muni (Portfolio 1) and Limited-Term and Muni (Portfolio 2-7)
   b. Alternate—Limited-Term Muni (Portfolio 1) and Short-term Muni (Portfolio 2-7)
2. Taxable
   a. Preferred—Short-term Corporate and Short-term Bond Index
   b. Alternate—Short-term Corporate and Short-term Admiral U.S. Treasury or Short-term U.S. Treasury Vanguard Fund Choices (Annuity)

I. Stocks
A. Large U.S. Stocks
1. Index
   a. Preferred—Equity Index
   b. Alternate—None
2. Growth
   a. Preferred—Growth Portfolio
   b. Alternate—None
3. Value
   a. Preferred—Equity Income and Diversified Value
   b. Alternate—None
B. Mid/Small U.S. Stocks
1. Mid Cap Index
   a. Preferred—Mid Cap Index
   b. Alternate—None
2. Small Cap Active
   a. Preferred—Small Company Growth
   b. Alternate—None
D. International Stocks
1. Developed and Emerging
   a. Preferred—International
   b. Alternate—None II. Bonds
A. High Yield
1. Corporate
   a. Preferred—High Yield Bond
   b. Alternate—None
B. Intermediate-Term
1. Taxable
   a. Preferred—High Grade Bond Index
   b. Alternate—None
C. Short-Term
1. Corporate
   a. Preferred—Short-Term Corporate
   b. Alternate—None Auto Rebal Summary After auto-rebal has produced a report, a summary is made of its conclusions. This will allow the counselor and reviewer to get an overview of the client's situation. The following is a prototype of the document and its contents:

SAA Summary:
  "The client reached the target SAA and the sub-SAA," or
  "The client reached the target SAA but was off in the following sub-categories (list the sub-asset categories where proposed does not equal target)," or
  "The client did not reach the target SAA and was off in the following sub-categories (list the asset and sub-asset categories where proposed does not equal target)."

Indexing Summary:
  Stock Indexing:
  Current=_%
  Proposed=_%
  Target=_%
  Stock Active:
  Current=_%
  Proposed=_%
  Target=_%

Growth vs. Value Summary:
  Growth Stocks:
  Current=_%
  Proposed=_%
  Target=_%
  Value Stocks:
  Current=_%
  Proposed=_%
  Target=_%

Tax Cost Summary:
  Total Tax Cost=$_
  Tax Cost as a percent of portfolio=_%

Transaction Summary:
  Total Number of Steps=_
  Total Number of Transactions=_

Fund Summary:
  Preferred Funds:
  The following preferred funds were not used: (list funds)
  Alternate Funds:
  The following alternate funds were used: (list funds)

Income Summary:
  Client Income Need=$_
  Taxable Bond Funds Generate=$_
  Surplus or Deficit=$_

Preferred Domain Summary:
  Client is an income investor or an accumulation investor or in the 39.6% MTB
  Stocks or Bonds should be outside
  Taxable Accounts:
  Stocks=_%
  Bonds=_%
  Cash Reserves=_%

Tax-Deferred Accounts: (This includes Roth IRA's and annuities which may differ from preferred domain.)
  Stocks=_%
  Bonds=_%
  Cash Reserves=_%
Dollar-Cost Averaging Summary:
  DCA amount (proposed)=_% and $_
  DCA amount (target)=_% and $_

The Vanguard Group uses a personal financial planning (PFP) questionnaire to collect information for its clients. The present invention takes advantage of the existing questionnaire format and screens wherever possible. The discussion below highlights changes made to the existing (conventional) PFP screens to collect the data necessary to implement the present invention. Entry for all new data fields needed by Auto Rebalancing which is specific to the client was added to existing Client Questionnaire screens. If during analysis, the counselor finds that changes are needed to any of these elements, the counselor will need to exit the Analysis function and update the data through the questionnaire process. This process is the same as the update process that currently exists for updating questionnaire data.

The following sections describe the changes made to existing Questionnaire screens. Only screens which are impacted by the Auto Rebalancing project are shown.

Family Members/Mailing Address

FIG. 3A is a questionnaire screen for entering core data regarding the client's family members and mailing address. The Auto Rebalancing algorithm needs the client's legal residence state to determine which municipal bond funds should be used in the proposed portfolio. No additional fields will be needed to support this process. For Auto Rebalancing purposes, the state shown for the primary client (and not the state listed in the mailed address) will be used as the legal residence state for the client group during the rebalancing process.

This screen is modified to provide entry of state code from a drop down list of valid state codes. This will insure that the value entered will be a valid state code.

Employment and Tax Information

Figure 3B:
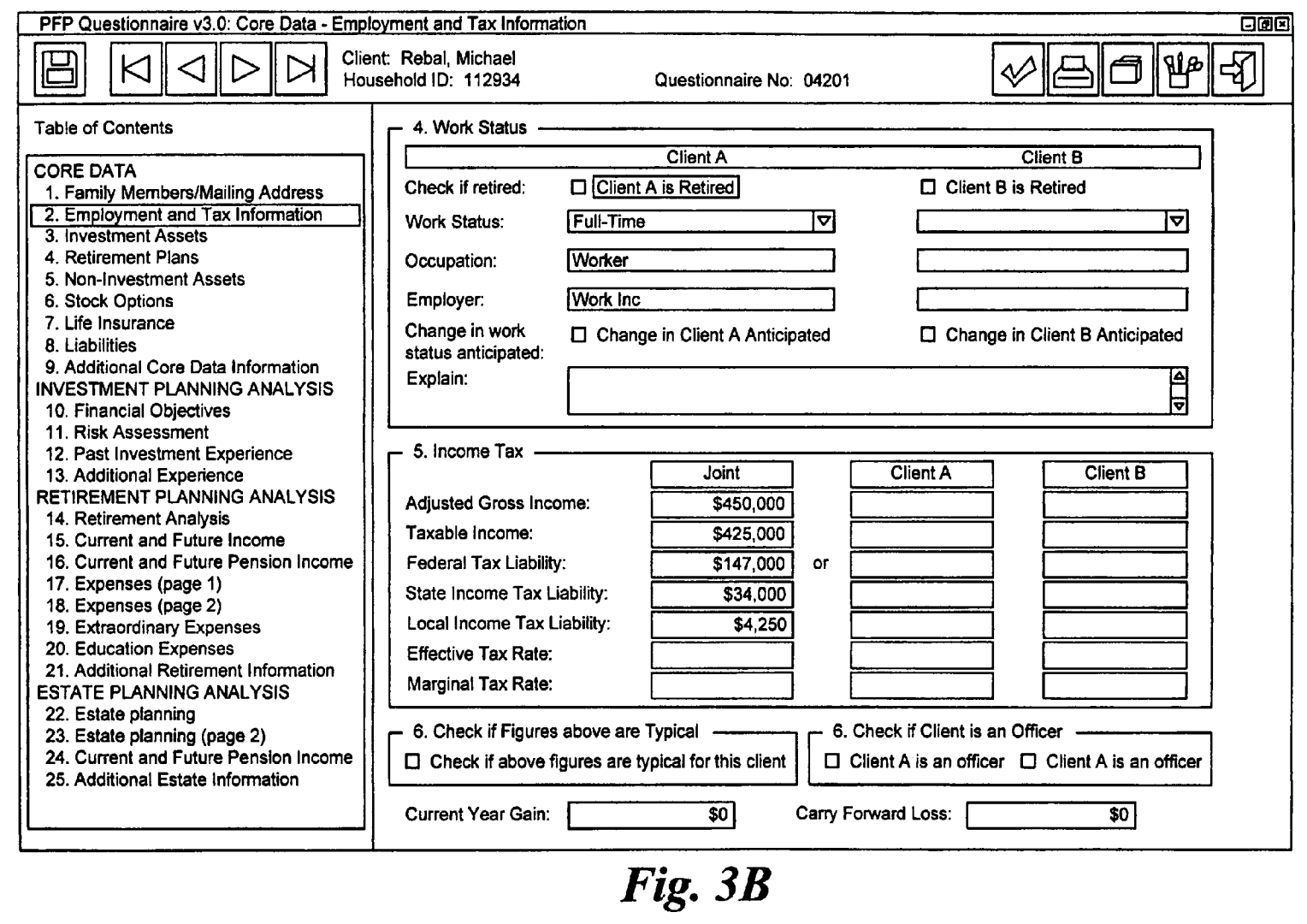

FIG. 3B is a questionnaire screen for entering additional core data regarding the client's employment and tax information. The following new fields were added to the PFP Questionnaire support the Auto Rebalancing project:
  1. Current Year Gain
  2. Carry Forward Loss
Current Year Gain—This field is used to input a gain that will be included in the total cost calculation used by auto rebal in determining whether to sell a "maybe" asset. This gain amount could be the result of customer activity outside the rebalancing process or it could be the gains resulting from previous rebalancing activity during the year. The default is zero.
Carry Forward Loss—This field is used to input a loss that will be included in the total cost calculation used by auto rebal in determining whether to sell a "maybe" asset. A loss amount can be used to offset gains from the sale of assets. The default is zero.

Investment Assets

FIG. 3C is a questionnaire screen for entering additional core data regarding the client's investment assets. The Investment Assets screen is used to supply information on the client's current non-retirement investment holdings. There were no changes are being made to this screen compared to the conventional PFP screen.

An additional change will be needed when Auto Rebalancing is implemented for PAS. A new field will be needed to allow the PAS counselor to identify whether an asset should be included in the rebalancing process.

Figure 3D:
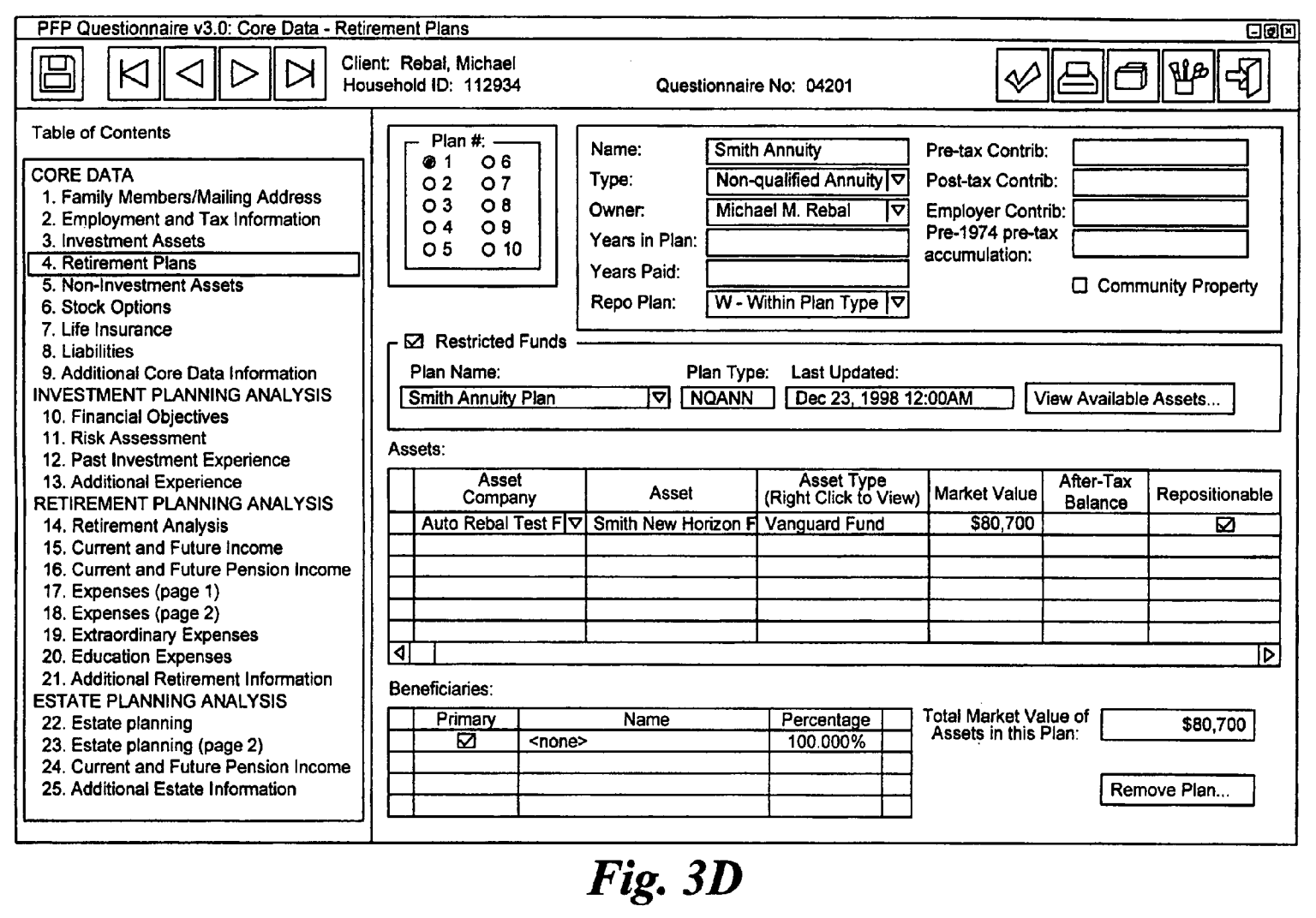

FIG. 3D is a questionnaire screen for entering additional core data regarding the client's current retirement plan holdings. This screen was modified for Auto Rebalancing to allow the counselor to do the following:

(1) Identify the plan to which assets in the existing plan should be moved during rebalancing.

(2) Indicate whether the plan has restricted assets.

(3) If investment alternatives are restricted, what assets are available as investment alternatives.

The following are new fields which are added to the screen:

(1) Repo Plan—This field contains 3 choices: Repo within same plan type, Repo to a new plan type, Do not reposition. If the Repo to a new plan type is selected, the system will determine the destination plan type based on the source plan type. The system will then look to see if there is already a plan of that type for the client. If there is, assets from the original plan will be added to the first plan for the new type plan. If there is not an existing plan of the new type for the client, the system will create a new plan for the purposes of buying assets with the proceeds of the original plan.

(2) Restricted Funds—This is a check box used to indicate whether or not the investment choices for this plan are limited. This box will only be available when reposition within the plan is specified in Repo Plan. If the box is checked, investment options for the plan are restricted; the Plan Name drop down list will then be functional.

(3) Plan Name, Plan Type and Last Update—These fields will only be available when Restricted Funds is checked. These are drop down list boxes showing the associated plan descriptions for which available funds have been defined. The counselor would select the correct Plan Name. The Plan Type (Annuity, 401(K), etc.) is a display only field which will show the plan type of the selected company/plan combination. The last update field will show the date of the last time this plan has been updated.

If the proper plan is not available, the counselor would need to obtain the available investment options from the client and have this information entered into the system via the Master Plan Maintenance mechanism before the plan could be completed.

The following new button was added to the screen to enable the counselor to review the investment choices available to a restricted plan:

View Available Assets—The view button is provided to enable the counselor to view and print the assets available for investment in the selected plan. This button will only be enabled when the counselor has specified yes for Restricted Funds. The system will display the assets for the plan identified in the company/plan fields.

Investment Analysis: Experience

FIG. 3E is a questionnaire screen for entering data regarding the client's past investment experience. The Experience screen is the last screen within the risk quiz portion of the Questionnaire. The following new elements were added in support of the Auto Rebalancing project:

Model Grids—This area is display only. It will show the range of Ibbotson scores associated with each of the seven target portfolios.

Current SAA—This text box will display the client's current percent asset allocation and the dollar amount currently held in each asset class.

Investment Stage—Radio buttons to indicate whether the client is in the income or accumulation stage. This setting will impact the preferred domain choice for the use of bonds in taxable accounts.

Annual Income Needed—This is the annual income which must be provided by the portfolio. This field will default to zero and must be entered by the counselor if a specific amount of income is expected. This field will be entered if Investment Stage is Income. If Investment Stage is Accumulation, Annual Income Needed will be set to zero and will not be enterable.

Portfolio Tilt—This is a set of push buttons used to indicate the valid portfolio tilt to be used for the customer. The tilt will change the percent allocations for target portfolio asset classes and/or modify preferred funds. Acceptable tilts are core, income, and tax efficient.

Analysis Screen Changes

The Analysis function was modified to use Auto Rebalancing to determine the contents of the proposed portfolio. Use of Auto Rebalancing is optional.

Perform Analysis

FIG. 4 is a screen used by the counselor to initiate the analysis and report creation. This screen was modified to contain an Intermediate Review check box.

Show Intermediate Screens—This check box is used to allow the report to be completed without the need for counselor intervention. If the box is checked, the system will stop at intermediate screens, prior to creating the final report. The counselor will be able to stop the process without creating the report. If the box is unchecked, the system will run through the entire flow, not stopping until the final report is complete.

For PFP, the box would default to unchecked. For PAS (Personal Advisory Service), the box will default to checked. If the box is unchecked for PAS, the system would not start the "automatic" processing until the VPAS (Vanguard Personal Advisory Service) analysis portion of the flow is completed.

Target Allocation

FIG. 5 is an existing screen currently used to specify the funds which should be added to the client's proposed portfolio. Several new buttons/boxes have been added to this screen to support Auto Rebal and the new GUI (graphical user interface) spreadsheet. The new items are:

(1) Use Auto Rebalancing Check Box
(2) Auto Rebalancing Button
(3) Manual Rebalancing Button Use Auto Rebalancing check box—The Use Auto Rebalancing check box controls whether manual updates to the Selected Funds portion of the window can be made. When this box is checked, the functionality to clear the Selected Funds window, populate Selected Funds from the list of funds on the left side of the screen, and to populate Selected Funds using Get Funds are not available for use. Unchecking the Use Auto Rebalancing box causes the controls needed to manually fill the Selected Funds box to become available. The Use Auto Rebal check box and button will be available for all counselors. Eventually, these will be available or unavailable based on the counselor's experience level. For PFP counselors, the Use Auto Rebalancing check box will default to checked.

Auto Rebalancing button—The Auto Rebalancing button causes the system to run the auto rebal algorithm to determine how the customer's portfolio should be modified to meet the target portfolio. The results of Auto Rebal will be displayed in the Selected Funds window. The buy/sell amounts specified for the funds may be changed by the counselor. If this button is pressed after changes have been made in the Selected Funds window, these changes are lost. The new results from Auto Rebal will replace, not update, the contents of the Selected Funds window.

If the counselor needs to make more complex changes to the results from Auto Rebal, the Use Auto Rebalancing box may be unchecked and funds may be manually added and/or deleted from the Selected Funds window.

Manual Rebalancing button—The Manual Rebalancing button causes the GUI spread sheet to be displayed.

OK button—The OK button will continue to function as it does currently. When this button is pressed, the Excel Rebalancing spread sheet is displayed and the report can be run.

New GUI Rebal Worksheet

FIG. 6 shows the GUI Rebal Worksheet which allows the counselor to specify buy/sell amounts for the funds held by the customer or added to the portfolio via the Target Allocation window. The display shows the assets by asset class so that the counselor can determine whether the proposed portfolio is meeting the targets. When the counselor presses the OK button, the Target Allocation screen is displayed with the changes made on the GUI Worksheet shown in the Selected Funds window.

Part II

Summary

This portion of the disclosure provides the logic for the auto-rebal project (the automated process for developing investment plans). One of the main purposes of auto-rebal is to eliminate the labor intensive aspects of generating an Investment Planning Analysis (IPA). A summary of how a client's asset allocation is determined is presented first, since this is the framework around auto-rebal and its functionality. That methodology is behind the preferred domain logic (steps) that will provide the foundation for auto-rebal. Auto-rebal may address only repositionable and non-repositionable assets. This should allow PFP to automate 70%+ of all IPAs. Alternatively, auto-rebal may address repositionable and non-repositionable assets, as well as "possibly repositionable assets." While the functionality of possibly repositionable assets will not be immediately addressed from a systems standpoint, they will from an implementation standpoint. However, it is critical to the success of auto-rebal that the repositionable functionality be automated and that counselors have the ability on the front end to flush out these issues with clients. Finally, sample language is provided that will be programmed to flow in the report automatically. This will enable the IPA to be fully automated.

All Investment Assets will be one of the following:

1. Non-Repositionable—These assets will never be sold and repositioned to Vanguard funds.

2. Repositionable—These assets will be liquidated and invested in Vanguard funds according to preferred domain rules.

3. Possibly Repositionable—Are assets needed to reach target SAA?

If no, do not reposition. If yes, reposition based on conditionality.

Possibly repositioned assets will be constrained by client preferences, tax costs and redemption fees. Whether or not these assets will be moved to Vanguard will be determined by the counselor. These possibly repositioned assets will be run as non-repositionable at first. If the target SAA is not met then the counselor will re-run the plan with certain assets as repositionable or because of constraints leave the assets alone.

Determining Asset Allocation

The following steps should be followed when determining a client's strategic asset allocation. This is the first step in the auto-rebal process.

Step 1. Total Assets—determine the client's total investment assets. This is the total amount of assets from the "Show Current."

Step 2. Cash Reserves—subtract out any cash reserves that the client cannot or will not reposition from total assets. These are cash reserves that are included in the report, but are not being repositioned. This does not include emergency reserves that are not included in the analysis.

Note: If the client has a target Portfolio of 1 or 2 as shown in FIG. 6, use the cash reserves that are not repositioned to meet their target cash reserves allocation.

Step 3. Strategic Asset Allocation (SAA)—determine the dollar amount that should be invested in stocks, bonds and cash reserves based upon the client's Ibbotson score.

Step 4. Compare SAAs—compare the target dollar amount of stocks, bonds and cash reserves to the client's proposed allocation. For example, a client has a $1 million portfolio: $800,000 in stocks ($600,000 is non-repositionable), $100,000 in bonds (all repositionable) and $100,000 in cash reserves (all repositionable). The target portfolio is four, 50% stocks and 50% bonds. The proposed portfolio will be $600,000 in stocks and $400,000 in bonds because the client will only reposition $200,000 of stocks.

Note: Any time a client has a current non-repositionable position in an asset or subasset class that exceeds the target, propose the higher non-repositionable amount. Then adjust the other asset or subasset classes accordingly.

Step 5. Determine Stock Suballocation—compute the dollar amount that you will propose for each stock subasset class as follows:

1. Determine the allocation to foreign stocks.
2. Subtract out foreign stocks and individual stocks from the total proposed stock allocation.
3. Multiply 70% times the remaining proposed allocation to stocks after subtracting out foreign and individual stocks to determine allocation to large cap stocks.
4. Multiply 30% times the remaining proposed allocation to stocks after subtracting out foreign and individual stocks to determine allocation to mid/small cap stocks.

Note: If the client has non-repositionable positions in a stock subasset class that exceeds the target, propose the higher non-repositionable amount. Then adjust the other asset or subasset classes accordingly. For example, after subtracting foreign and individual stocks, you have $100,000 to allocate to U.S. stocks. The target would be $70,000 large and $30,000 mid/small. However, the client has $80,000 of non-repositionable large cap stocks, the proposed allocation should be $80,000 large and $20,000 mid/small.

Step 6. Determine Bond Suballocation—compute the dollar amount that you will propose for each bond subasset class as follows:

1. Subtract out individual bonds from the total proposed bond allocation.
2. Multiply the appropriate bond suballocations to the remaining bond allocation after subtracting out individual bonds to determine exposure to short-, intermediate- and long-term bonds.

Note: If the client has non-repositionable positions in a bond subasset class that exceeds the target, propose the higher non-repositionable amount. Then adjust the other asset or subasset classes accordingly. For example, after subtracting individual bonds, you have $1,000,000 to allocate to bond funds. The target is 18% ($360,000) short-, 27% ($540,000) intermediate- and 5% ($100,000) long-term bonds, based on a 50/50 portfolio. However, if the client has $200,000 of non-repositionable long-term bonds, there is only $800,000 to allocate between short- and intermediate-term, rather than the needed $900,000. You would propose $320,000 in short-term bonds ($800,000 times 18%/45%), $480,000 in intermediate-term bonds ($800,000 times 27%/45%) and $200,000 in long-term bonds.

Step 7. Determine Cash Allocation—The client will have a proposed cash allocation if the target portfolio is number 1 or number 2 or if there are non-repositionable cash reserves.

The above logic will provide the client's asset and subasset allocation dollar amounts. Once these dollar amounts are determined we can use the Preferred Domain Rules.

Preferred Domain

Before proceeding to the Preferred Domain Rules, the system will have liquidated all repositionable assets. These proceeds will have been placed in a repositionable money market on a per registration basis. For example, each registration will have a repositionable money market that purchases will be made from.

The only asset and subasset classes that will be considered (for purchases) are those where the target dollar amount is greater than the current dollar amount. If the current asset or subasset dollar amount is greater than the target, the current dollar amount will be used. Determining the proposed amounts will be a function of applying the appropriate ratios based on the target SAA.

When applying preferred domain, taxable investments are always considered first. If the client is in the 39.6% MTB or has an income need, start with the Bonds Outside Hierarchy (based on tax bracket). If the client is in the accumulation stage, or does not have an income need, start with the Stocks Outside Hierarchy. Then, follow the appropriate combination paths that are listed at the end of the hierarchy sets.

I. Stock Outside Hierarchy (If Current Stock Allocation is less than the Target Stock Allocation after all repositionable assets have been liquidated and placed into a money market, continue. If not, proceed to the next step in the determined hierarchy. This logic holds true when determining whether any additional money will be added to an asset or sub-asset class).

A. Large Cap Stocks
   1. Index/Market Exposure*
      a. If client has S&P 500 or alternate Vanguard fund, add to Vanguard S&P 500 fund to the extent that proposed equals target (only add to alternate fund if client does not own "preferred fund" in this registration).
      b. If client does not have any Vanguard index/market exposure, open a new Vanguard S&P 500 fund, and add to it to the extent that proposed equals target.
   2. Growth Exposure
      a. If client has U.S. Growth or alternate Vanguard fund, add to Vanguard U.S. Growth fund to the extent that proposed equals target (only add to alternate fund if client does not own "preferred fund" in this registration).
      b. If client does not have any Vanguard growth exposure, open a new Vanguard U.S. Growth fund, and add to it to the extent that proposed equals target.
   3. Value Exposure
      a. If client has Windsor II or alternate Vanguard fund, add to Vanguard Windsor II fund to the extent that proposed equals target (only add to alternate fund if client does not own "preferred fund" in this registration).
      b. If client does not have any Vanguard value exposure, open a new Vanguard Windsor II fund, and add to it to the extent that proposed equals target.

B. Mid/Small Cap Stocks
   1. Index/Market Exposure*
      a. If client has Extended Market or alternate Vanguard fund, add to Vanguard Extended Market fund to the extent that proposed equals target (only add to alternate fund if client does not own "preferred fund" in this registration).
      b. If client does not have any Vanguard index/market exposure, open a new Vanguard Extended Market fund, and add to it to the extent that proposed equals target.
   2. Active Mid Cap Exposure
      a. If client has Horizon Aggressive Growth or alternate Vanguard fund, add to Vanguard Horizon Aggressive Growth fund to the extent that proposed equals target (only add to alternate fund if client does not own "preferred fund" in this registration).
      b. If client does not have any Vanguard active mid cap exposure, open a new Vanguard Horizon Aggressive Growth fund, and add to it to the extent that proposed equals target.
   3. Active Small Cap Exposure
      a. If client has Explorer or alternate Vanguard fund, add to Vanguard Explorer fund to the extent that proposed equals target (only add to alternate fund if client does not own "preferred fund" in this registration).
      b. If client does not have any Vanguard active small cap exposure, open a new Vanguard Explorer fund, and add to it to the extent that proposed equals target.

* If A1 and B1 provide a 70/30 split, substitute TSMP

C. International Exposure
   1. International Developed**
      a. If client has European Index or Pacific Index or alternate Vanguard fund, add to European Index or Pacific Index funds to the extent that proposed equals target (only add to alternate fund if client does not own "preferred fund" in this registration).
      b. If client does not have any Vanguard international developed exposure, open a new Vanguard European Index or Pacific Index fund, and add to it to the extent that proposed equals target.
   2. International Emerging**
      a. If client has Emerging Markets or alternate Vanguard fund, add to Vanguard Emerging Markets fund to the extent that proposed equals target (only add to alternate fund if client does not own "preferred fund" in this registration).
      b. If client does not have any Vanguard international emerging exposure, open a new Vanguard Emerging Markets fund, and add to it to the extent that proposed equals target.

** If C1 and C2 provide an 80/20 split, or if there is no international exposure, use European Index or Pacific Index II. Stock Inside Hierarchy
   (If Current Stock Allocation is less than the Target Stock Allocation after all repositionable assets have been liquidated and placed into a money market, continue. If not, proceed to the next step in the determined hierarchy. This logic holds true when determining whether any additional money will be added to an asset or sub-asset class).

A. International Exposure
   1. International Developed***
      a. If client has European Index or Pacific Index or alternate Vanguard fund, add to Vanguard European Index or Pacific Index fund to the extent that proposed equals target (only add to alternate fund if client does not own "preferred fund" in this registration).
      b. If client does not have any Vanguard international developed exposure, open a new Vanguard European Index or Pacific Index fund, and add to it to the extent that proposed equals target.
   2. International Emerging***
      a. If client has Emerging Markets or alternate Vanguard fund, add to Vanguard Emerging Markets fund to the extent that proposed equals target (only add to alternate fund if client does not own "preferred fund" in this registration).
      b. If client does not have any Vanguard international emerging exposure, open a new Vanguard Emerging Markets fund, and add to it to the extent that proposed equals target.

*** If A1 and A2 provide an 80/20 split, or if there is no international exposure, use European Index or Pacific Index B. Mid/Small Cap Stocks
   1. Active Small Cap Exposure
      a. If client has Explorer or alternate Vanguard fund, add to Vanguard Explorer fund to the extent that proposed equals target (only add to alternate fund if client does not own "preferred fund" in this registration).
      b. If client does not have any Vanguard active small cap exposure, open a new Vanguard Explorer fund, and add to it to the extent that proposed equals target.
   2. Active Mid Cap Exposure
      a. If client has Horizon Aggressive Growth or alternate Vanguard fund, add to Vanguard Horizon Aggressive Growth fund to the extent that proposed equals target (only add to alternate fund if client does not own "preferred fund" in this registration).
      b. If client does not have any Vanguard active mid cap exposure, open a new Vanguard Horizon Aggressive Growth fund, and add to it to the extent that proposed equals target.
   3. Index/Market Exposure****
      a. If client has Extended Market or alternate Vanguard fund, add to Vanguard Extended Market fund to the extent that proposed equals target (only add to alternate fund if client does not own "preferred fund" in this registration).
      b. If client does not have any Vanguard index/market exposure, open a new Vanguard Extended Market fund, and add to it to the extent that proposed equals target.

C. Large Cap Stocks
  1. Value Exposure
    a. If client has Windsor II or alternate Vanguard fund, add to Vanguard Windsor II fund to the extent that proposed equals target (only add to alternate fund if client does not own "preferred fund" in this registration).
    b. If client does not have any Vanguard value exposure, open a new Vanguard Windsor II fund, and add to it to the extent that proposed equals target.
  2. Growth Exposure
    a. If client has U.S. Growth or alternate Vanguard fund, add to Vanguard U.S. Growth fund to the extent that proposed equals target (only add to alternate fund if client does not own "preferred fund" in this registration).
    b. If client does not have any Vanguard growth exposure, open a new Vanguard U.S. Growth fund, and add to it to the extent that proposed equals target.
  3. Index/Market Exposure****
    a. If client has S&P 500 or alternate Vanguard fund, add to Vanguard S&P 500 fund to the extent that proposed equals target (only add to alternate fund if client does not own "preferred fund" in this registration).
    b. If client does not have any Vanguard index/market exposure, open a new Vanguard S&P 500 fund, and add to it to the extent that proposed equals target.

**** If B3 and C3 provide a 70/30 split, substitute TSMP

III. Bonds Outside Hierarchy
  (If Current Bond Allocation is less than the Target Bond Allocation after all repositionable assets have been liquidated and placed into a money market, continue. If not, proceed to the next step in the determined hierarchy. This logic holds true when determining whether any additional money will be added to an asset or sub-asset class).

A. 31% MTB and Higher
  1. Long-Term Municipal Exposure
    a. If client has Insured Long-Term Municipal (or State specific) or alternate Vanguard fund, add to Vanguard Insured Long-Term Municipal Bond fund to the extent that proposed equals target (only add to alternate fund if client does not own "preferred fund" in this registration).
    b. If client does not have any Vanguard long-term municipal bond exposure, open a new Vanguard Insured Long-Term Municipal Bond fund (or State specific), and add to it to the extent that proposed equals target.
  2. High-Yield Municipal Exposure
    a. If client has High-Yield Municipal or alternate Vanguard fund, add to Vanguard High-Yield Municipal Bond fund to the extent that proposed equals target (only add to alternate fund if client does not own "preferred fund" in this registration).
    b. If client does not have any Vanguard high-yield municipal bond exposure, open a new Vanguard High-Yield Municipal Bond fund, and add to it to the extent that proposed equals target.
  3. Intermediate-Term Municipal Exposure
    a. If client has Intermediate-Term Municipal (or State specific) or alternate Vanguard fund, add to Vanguard Intermediate-Term Municipal Bond fund to the extent that proposed equals target (only add to alternate fund if client does not own "preferred fund" in this registration).
    b. If client does not have any Vanguard intermediate-term municipal bond exposure, open a new Vanguard Intermediate-Term Municipal Bond fund, and add to it to the extent that proposed equals target.
  4. Short-Term Municipal Exposure
    a. If client has Limited-Term/Short-Term Municipal (or State specific) or alternate Vanguard fund, add to Vanguard Short-Term Municipal Bond fund to the extent that proposed equals target (only add to alternate fund if client does not own "preferred fund" in this registration).
    b. If client does not have any Vanguard short-term municipal bond exposure, open a new Vanguard Limited-Term/Short-Term Municipal Bond fund, and add to it to the extent that proposed equals target.

B. 28% MTB and Higher
  1. Long-Term Municipal Exposure
    a. If client has Insured Long-Term Municipal (or State specific) or alternate Vanguard fund, add to Vanguard Insured Long-Term Municipal Bond fund to the extent that proposed equals target (only add to alternate fund if client does not own "preferred fund" in this registration).
    b. If client does not have any Vanguard long-term municipal bond exposure, open a new Vanguard Insured Long-Term Municipal Bond fund (or State specific), and add to it to the extent that proposed equals target.
  2. High-Yield Municipal Exposure
    a. If client has High-Yield Municipal or alternate Vanguard fund, add to Vanguard High-Yield Municipal Bond fund to the extent that proposed equals target (only add to alternate fund if client does not own "preferred fund" in this registration).
    b. If client does not have any Vanguard high-yield municipal bond exposure, open a new Vanguard High-Yield Municipal Bond fund, and add to it to the extent that proposed equals target.
  3. Intermediate-Term Municipal Exposure
    a. If client has Intermediate-Term Municipal (or State specific) or alternate Vanguard fund, add to Vanguard Intermediate-Term Municipal Bond fund to the extent that proposed equals target (only add to alternate fund if client does not own "preferred fund" in this registration).
    b. If client does not have any Vanguard intermediate-term municipal bond exposure, open a new Vanguard Intermediate-Term Municipal Bond fund, and add to it to the extent that proposed equals target.
  4. Short-Term Exposure
    a. Active
      1. If client has Short-Term Corporate or alternate Vanguard fund, add to Vanguard Short-Term Corporate Bond fund to the extent that proposed equals target (only add to alternate fund if client does not own "preferred fund" in this registration).
      2. If client does not have any Vanguard short-term active bond exposure, open a new Vanguard Short-Term Corporate Bond fund, and add to it to the extent that proposed equals target.
    b. Passive
      1. If client has Short-Term Bond Index or alternate Vanguard fund, add to Vanguard Short-Term Bond Index fund to the extent that proposed equals target (only add to alternate fund if client does not own "preferred fund" in this registration).
      2. If client does not have any Vanguard short-term passive bond exposure, open a new Vanguard Short-Term Bond Index fund, and add to it to the extent that proposed equals target.

C. 15% MTB and Higher
  1. Long-Term Exposure
    a. If client has Long-Term Bond Index or alternate Vanguard fund, add to Vanguard Long-Term Bond Index fund to the extent that proposed equals target (only add to alternate fund if client does not own "preferred fund" in this registration).

b. If client does not have any Vanguard long-term bond exposure, open a new Vanguard Long-Term Bond Index fund, and add to it to the extent that proposed equals target.

2. High-Yield Exposure a. If client has High-Yield Corporate or alternate Vanguard fund, add to Vanguard High-Yield Corporate Bond fund to the extent that proposed equals target (only add to alternate fund if client does not own "preferred fund" in this registration).

b. If client does not have any Vanguard high-yield bond exposure, open a new Vanguard High-Yield Corporate Bond fund, and add to it to the extent that proposed equals target.

3. Intermediate-Term Exposure a. Active

1. If client has Intermediate-Term Corporate or alternate Vanguard fund, add to Vanguard Intermediate-Term Corporate Bond fund to the extent that proposed equals target (only add to alternate fund if client does not own "preferred fund" in this registration).
2. If client does not have any Vanguard intermediate-term active bond exposure, open a new Vanguard Intermediate-Term Corporate fund, and add to it to the extent that proposed equals target.

b. Passive

1. If client has Intermediate-Term Bond Index or alternate Vanguard fund, add to Vanguard Intermediate-Term Bond Index fund to the extent that proposed equals target (only add to alternate fund if client does not own "preferred fund" in this registration).
2. If client does not have any Vanguard intermediate-term passive bond exposure, open a new Vanguard Intermediate-Term Bond Index fund, and add to it to the extent that proposed equals target.

4. Short-Term Exposure a. Active

1. If client has Short-Term Corporate or alternate Vanguard fund, add to Vanguard Short-Term Corporate Bond fund to the extent that proposed equals target (only add to alternate fund if client does not own "preferred fund" in this registration).
2. If client does not have any Vanguard short-term active bond exposure, open a new Vanguard Short-Term Corporate Bond fund, and add to it to the extent that proposed equals target.

b. Passive

1. If client has Short-Term Bond Index or alternate Vanguard fund, add to Vanguard Short-Term Bond Index fund to the extent that proposed equals target (only add to alternate fund if client does not own "preferred fund" in this registration).
2. If client does not have any Vanguard short-term passive bond exposure, open a new Vanguard Short-Term Bond Index fund, and add to it to the extent that proposed equals target.

IV. Bonds Inside Hierarchy (If Current Bond Allocation is less than the Target Bond Allocation after all repositionable assets have been liquidated and placed into a money market, continue. If not, proceed to the next step in the determined hierarchy. This logic holds true when determining whether any additional money will be added to an asset or sub-asset class).

1. Short-Term Exposure a. Active

1. If client has Short-Term Corporate or alternate Vanguard fund, add to Vanguard Short-Term Corporate Bond fund to the extent that proposed equals target (only add to alternate fund if client does not own "preferred fund" in this registration).
2. If client does not have any Vanguard short-term active bond exposure, open a new Vanguard Short-Term Corporate Bond fund, and add to it to the extent that proposed equals target.

b. Passive

1. If client has Short-Term Bond Index or alternate Vanguard fund, add to Vanguard Short-Term Bond Index fund to the extent that proposed equals target (only add to alternate fund if client does not own "preferred fund" in this registration).
2. If client does not have any Vanguard short-term passive bond exposure, open a new Vanguard Short-Term Bond Index fund, and add to it to the extent that proposed equals target.

2. Intermediate-Term Exposure a. Active

1. If client has Intermediate-Term Corporate or alternate Vanguard fund, add to Vanguard Intermediate-Term Corporate Bond fund to the extent that proposed equals target (only add to alternate fund if client does not own "preferred fund" in this registration).
2. If client does not have any Vanguard intermediate-term active bond exposure, open a new Vanguard Intermediate-Term Corporate fund, and add to it to the extent that proposed equals target.

b. Passive

1. If client has Intermediate-Term Bond Index or alternate Vanguard fund, add to Vanguard Intermediate-Term Bond Index fund to the extent that proposed equals target (only add to alternate fund if client does not own "preferred fund" in this registration).
2. If client does not have any Vanguard intermediate-term passive bond exposure, open a new Vanguard Intermediate-Term Bond Index fund, and add to it to the extent that proposed equals target.

3. High-Yield Exposure a. If client has High-Yield Corporate or alternate Vanguard fund, add to Vanguard High-Yield Corporate Bond fund to the extent that proposed equals target (only add to alternate fund if client does not own "preferred fund" in this registration).

b. If client does not have any Vanguard high-yield bond exposure, open a new Vanguard High-Yield Corporate Bond fund, and add to it to the extent that proposed equals target.

4. Long-Term Exposure a. If client has Long-Term Bond Index or alternate Vanguard fund, add to Vanguard Long-Term Bond Index fund to the extent that proposed equals target (only add to alternate fund if client does not own "preferred fund". in this registration).

b. If client does not have any Vanguard long-term bond exposure, open a new Vanguard Long-Term Bond Index fund, and add to it to the extent that proposed equals target.

Combinations

The following are the various combinations that will be used depending upon the preferred domain rules. When making purchases, on a per registration basis, the registration with the highest dollar amount will be used first.

A. Bonds Outside First (when there is not enough money to fully fund the bond exposure using all taxable dollars)

The following order should be used:
Bonds Outside Hierarchy (based on tax bracket)
Bonds Inside Hierarchy
Stocks Inside Hierarchy B. Bonds Outside First (when there is enough money to fully fund the bond exposure using all taxable dollars)

The following order should be used:
Bonds Outside Hierarchy (based on tax bracket)
Stocks Outside Hierarchy
Stocks Inside Hierarchy C. Stocks Outside First (when there is not enough money to fully fund the stock exposure using all taxable dollars)

The following order should be used:
Stocks Outside Hierarchy
Stocks Inside Hierarchy
Bonds Inside Hierarchy D. Stocks Outside First (when there is enough money to fully fund the stock exposure using all taxable dollars)

The following order should be used:
Stocks Outside Hierarchy
Bonds Outside Hierarchy (based on tax bracket)
Bonds Inside Hierarchy Text Before each set of steps, a heading that reads "Exchanges Within Your Joint Accounts" (or that registration title) is inserted. Each Registration ultimately has up to four steps. However, if any of the above steps are not used, the step numbers adjust to be sequential.

Each step has its own Tax Impact followed by its own Transaction Fees. Since Vanguard and non-Vanguard redemptions, and Vanguard purchases, each have their own step, combining tax and fee notes is not a concern.

Vanguard Assets

Step 1—Exchange $25,000 from your joint Vanguard Windsor II Fund and $25,000, or all remaining shares, from your Vanguard U.S. Growth Fund to a new or your existing Vanguard Money Market Prime Portfolio.

Step 2—Exchange $50,000, or all shares, from your Vanguard Money Market Prime Portfolio to the following Vanguard Funds:
(1) $ amount to fund
(2) $ amount to fund
(add "or all remaining shares" to text in last purchase, if a full redemption)

Non-Vanguard Repositionable Assets

Step 1—Liquidate the following assets: list funds to be sold and dollar value, where appropriate add "or all shares". Invest the proceeds in a new or your existing Vanguard Money Market Prime Portfolio.

Step 2—Exchange $50,000, or all shares, from your Vanguard Money Market Prime Portfolio to the following Vanguard Funds:
(1) $ amount to fund
(2) $ amount to fund
(add "or all remaining shares" to text in last purchase, if a full redemption)

Non-Vanguard "Possibly" Repositionable Assets

This language will be used by counselors when "possibly" repositionable assets are sold. When the "possibly" repositionable functionality is added to auto-rebal, this text will be inserted automatically.

Step 1—In order to reach your target asset allocation, liquidate the following assets: list funds to be sold and dollar value, where appropriate add "or all shares". Invest the proceeds in a new or your existing Vanguard Money Market Prime Portfolio.

Step 2—Exchange $50,000, or all shares, from your Vanguard Money Market Prime Portfolio to the following Vanguard Funds:
(1) $ amount to fund
(2) $ amount to fund
(add "or all remaining shares" to text in last purchase, if a full redemption)

Note: On a per registration basis, all sales will be made first. The following hierarchy will be used for each registration:
Step 1. Exchanges of Vanguard funds.
Step 2. Exchanges of repositionable non-Vanguard funds.
Step 3. Exchanges of "possibly" repositionable non-Vanguard funds.*
Step 4. Purchases of Vanguard funds.

*Step 3 is separated out by the counselor if possibly repositionable are not addressed.

Tax Cost

Tax Cost information will flow into the report based on the data entered into the system by the counselor. If the fund is a money market, the tax cost will be none. If redeeming a money market is part of several redemptions, that fund will not be part of the tax cost table. For funds where tax cost is not provided (non-Vanguard funds) or is unavailable (Vanguard funds) the counselor will enter a zero under cost basis in the system. If one of these funds is sold, the average cost not available language will flow in for Vanguard and/or non-Vanguard funds.

Vanguard Tax Cost Available

Tax Impact: The following is a summary of the potential tax consequences associated with the above recommendation. We use the average cost (single category) method to compute gains and losses on liquidations. Your actual gain or loss may vary.

Fund[1] Redemption Cost Basis[2] Redemption Proceeds[3] Gain/Loss[4]

1=Fund sold.
2=Shares sold multiplied by average cost per share. If total redemption, it equals total cost.
3=Shares sold multiplied by current price per share. If total redemption, it equals total value.
4=Redemption Proceeds minus Redemption Cost Basis. Negative numbers have brackets, i.e. ($200)

Non-Vanguard Tax Cost Available

Tax Impact: The following is a summary of the potential tax consequences associated with the above recommendation. The potential gains or losses are based on the information that you provided.

Fund[1] Redemption Cost Basis[2] Redemption Proceeds[3] Gain/Loss[4]

1=Fund sold.
2=Shares sold multiplied by average cost per share. If total redemption, it equals total cost.
3=Shares sold multiplied by current price per share. If total redemption, it equals total value.
4=Redemption Proceeds minus Redemption Cost Basis. Negative numbers have brackets, i.e., ($200)

Vanguard Tax Cost Not Available

Tax Impact: Average cost information on the above account(s) is pending and will be discussed prior to implementation.

Non-Vanguard Tax Cost Not Available

Tax Impact: The above recommendation was made without regard to cost basis. Please consider the tax ramifications of this transaction before implementing the above recommendation.

Some Vanguard Tax Cost Available

Tax Impact: Average cost information on the following accounts is pending: list funds with "zero" cost basis, and will be discussed prior to implementation. The following is a summary of the potential tax consequences associated with selling the remaining funds. We use the average cost (single category) method to compute gains and losses on liquidations. Your actual gain/loss may vary.

Fund[1] Redemption Cost Basis[2] Redemption Proceeds[3] Gain/Loss[4]

1=Fund sold.
2=Shares sold multiplied by average cost per share. If total redemption, it equals total cost.
3=Shares sold multiplied by current price per share. If total redemption, it equals total value.
4=Redemption Proceeds minus Redemption Cost Basis. Negative numbers have brackets, i.e. ($200)

Some Non-Vanguard Tax Cost Available

Tax Impact: The above recommendation considered cost basis where provided. The following represents your potential gains or losses for funds where cost basis was provided.

Transaction Fees

Vanguard Transaction Fees

Transaction Fees (New Funds): Please refer to "Your Fund Recommendations" section and prospectus for any applicable transaction fees associated with investing in . . . (the funds with possible or definite purchase or redemption fees will be listed based on the buy/sell recommendations).

Transaction Fees (Existing Funds): Please refer to your fund prospectus for any applicable transaction fees associated with investing in . . . (the funds with possible or definite purchase or redemption fees will be listed based on the buy/sell recommendations).

OR

Transaction Fees: None.

Non-Vanguard Transaction Fees

Transaction Fees: Please consult with the above providers for any fees associated with this transaction.

Dollar-Cost Averaging

The dollar amount to dollar-cost average will equal the proposed stock amount minus the current stock amount. We will only recommend dollar-cost-averaging when the proposed stock percentage increases by 10% or more over the current stock percentage. That dollar amount will be dollar-cost averaged over one year. The language is as follows: ($$1/5^{th}$ amount initially, and $$1/5^{th}$ amount every three months over the course of a year, for a total of five exchanges). The second $1/5^{th}$ amount will be rounded to the nearest $100 and the first adjusted accordingly. The system will dollar-cost average into stock funds until it reaches the total needed, adding the above text next to each fund it DCA's into.

Vanguard Fund Choices (Core Portfolio)

I. Stocks
   A. Large U.S. Stocks
      1. Market/Index
         a. Preferred—500 Portfolio
         b. Alternate—Quantitative, Trustees' Equity and Tax-Managed Growth & Income
      2. Growth
         a. Preferred—U.S. Growth
         b. Alternate—Morgan Growth and Index Growth
      3. Value
         a. Preferred—Windsor II
         b. Alternate—Windsor, Equity Income and Index Value
   B. U.S. Total Stock Market (to be used when large market/index to mid/small market/index equals 70/30)
      1. Preferred—Total Stock Market
      2. Alternate—Tax-Managed Capital Appreciation
   C. Mid/Small U.S. Stocks
      1. Market/Index
         a. Preferred—Extended Market
         b. Alternate—Index Small Cap
      2. Mid Cap Active
         a. Preferred—Horizon—Aggressive Growth
         b. Alternate—Primecap, Selected Value, Horizon—Capital Opportunity and REIT Index
      3. Small Cap Active
         a. Preferred—Explorer
         b. Alternate—None
   D. International Stocks
      1. Developed
         a. Preferred—European (50%) and Pacific (50%)
         b. Alternate—International Growth and Trustees' International
      2. Emerging
         a. Preferred—Emerging Markets Index
         b. Alternate—None
      3. European Index or Pacific Index (to be used when there is an 80/20 ratio between developed and emerging)
         a. Preferred—European Index or Pacific Index
         b. Alternate—None II. Bonds
   A. High Yield
      1. Municipal
         a. Preferred—High Yield Muni
         b. Alternate—None
      2. Corporate
         a. Preferred—High Yield Corporate
         b. Alternate—None
   B. Long-Term
      1. Municipal
         a. Preferred—Insured Long-Term Muni or State specific Muni
         b. Alternate—Long-Term Muni 2. Taxable
   a. Preferred—Long-Term Bond Index
   b. Alternate—Long-Term Corporate, Admiral Long-Term U.S. Treasury and Long-Term U.S. Treasury
C. Intermediate-Term
1. Municipal
   a. Preferred—Intermediate-Term Muni or State specific Muni
   b. Alternate—None
2. Active
   a. Preferred—Intermediate-Term Corporate
   b. Alternate—Admiral Intermediate-Term U.S. Treasury, Intermediate-Term U.S. Treasury
3. Passive
   a. Preferred—Intermediate-Term Bond Index
   b. Alternate—Total Bond Market Index
D. Short-Term
1. Municipal
   a. Preferred—Short-Term Muni (Portfolio 1) and Limited-Term and Muni (Portfolio 2-7)
   b. Alternate—Limited-Term Muni (Portfolio 1) and Short-Term Muni (Portfolio 2-7)
2. Active
   a. Preferred—Short-Term Corporate
   b. Alternate—Short-Term Admiral U.S. Treasury, Short-Term U.S. Treasury
3. Passive
   a. Preferred—Short-Term Bond Index
   b. Alternate—None Vanguard Fund Choices (Tax-Efficient Portfolio)

I. Stocks
  A. U.S. Total Stock Market (to be used when large market/index to mid/small market/index equals 70/30)
    1. Preferred—Total Stock Market (50%) and Tax-Managed Capital Appreciation (50%)
    2. Alternate—None
  B. Large U.S. Stocks
    1. Market/Index
      a. Preferred—None, only use alternate when Total Stock Market and Capital Appreciation cannot be used
      b. Alternate—Tax-Managed Growth & Income (50%) and 500 Portfolio (50%)
  C. Mid/Small U.S. Stocks
    1. Market/Index
      a. Preferred—None, only use alternate when Total Stock Market and Capital Appreciation cannot be used
      b. Alternate—Extended Market (50%) and Small Cap (50%)
  D. International Stocks
    1. Developed
      a. Preferred—Pacific (50%) and Europe (50%)
      b. Alternate—None
    2. Emerging
      a. Preferred—Emerging Markets Index
      b. Alternate—None
    3. European Index or Pacific Index (to be used when there is an 80/20 ratio between developed and emerging)
      a. Preferred—European Index or Pacific Index
      b. Alternate—None II. Bonds
  A. High Yield
    1. Municipal
      a. Preferred—High Yield Muni
      b. Alternate—None
    2. Corporate
      a. Preferred—High Yield Corporate
      b. Alternate—None
  B. Long-Term
    1. Municipal
      a. Preferred—Insured Long-Term Muni or State specific Muni
      b. Alternate—Long-Term Muni
    2. Taxable
      a. Preferred—Long-Term Bond Index
      b. Alternate—Long-Term Corporate, Admiral Long-Term U.S. Treasury and Long-Term U.S. Treasury
  C. Intermediate-Term
    1. Municipal
      a. Preferred—Intermediate-Term Muni or State specific Muni
      b. Alternate—None
    2. Active
      a. Preferred—Intermediate-Term Corporate
      b. Alternate—Admiral Intermediate-Term U.S. Treasury, Intermediate-Term U.S. Treasury
    3. Passive
      a. Preferred—Intermediate-Term Bond Index
      b. Alternate—Total Bond Market Index
  D. Short-Term
    1. Municipal
      a. Preferred—Short-Term Muni (Portfolio 1) and Limited-Term and Muni (Portfolio 2-7)
      b. Alternate—Limited-Term Muni (Portfolio 1) and Short-Term Muni (Portfolio 2-7)
    2. Active
      a. Preferred—Short-Term Corporate
      b. Alternate—Short-Term Admiral U.S. Treasury, Short-Term U.S. Treasury
    3. Passive
      a. Preferred—Short-Term Bond Index
      b. Alternate—None Vanguard Fund Choices (Income Portfolio)

I. Stocks
  A. Large U.S. Stocks
    1. Market/Index
      a. Preferred—500 Portfolio
      b. Alternate—Quantitative, Trustees' Equity and Tax-Managed Growth & Income
    2. Growth
      a. Preferred—None
      b. Alternate—None
    3. Value
      a. Preferred—Windsor II (50%) and Equity Income (50%)
      b. Alternate—Windsor and Index Value
  B. U.S. Total Stock Market (to be used when large market/index to mid/small market/index equals 70/30)
    1. Preferred—Total Stock Market
    2. Alternate—Tax-Managed Capital Appreciation
  C. Mid/Small U.S. Stocks
    1. Market/Index
      a. Preferred—Extended Market
      b. Alternate—Index Small Cap
    2. Mid/Small Active
      a. Preferred—REIT Index
      b. Alternate—Primecap, Selected Value, Horizon—Capital Opportunity and Explorer D. International Stocks
 1. Developed
  a. Preferred—European (50%) and Pacific (50%)
  b. Alternate—International Growth and Trustees' International
 2. Emerging
  a. Preferred—Emerging Markets Index
  b. Alternate—None
 3. European Index or Pacific Index (to be used when there is an 80/20 ratio between developed and emerging)
  a. Preferred—European Index or Pacific Index
  b. Alternate—None II. Bonds
 A. High Yield
  1. Municipal
   a. Preferred—High Yield Muni
   b. Alternate—None
  2. Corporate
   a. Preferred—High Yield Corporate
   b. Alternate—None
 B. Long-Term
  1. Municipal
   a. Preferred—None
   b. Alternate—None
  2. Taxable
   a. Preferred—Long-Term Corporate
   b. Alternate—None
 C. Intermediate-Term
  1. Municipal
   a. Preferred—Intermediate-Term Muni or State specific Muni
   b. Alternate—None
  2. Active
   a. Preferred—Intermediate-Term Corporate
   b. Alternate—None
  3. Passive
   a. Preferred—None
   b. Alternate—None
 D. Short-Term
  1. Municipal
   a. Preferred—Short-Term Muni and Limited-Term and Muni (Portfolio 1 and 2)
   b. Alternate—None
  2. Active
   a. Preferred—Short-Term Corporate
   b. Alternate—None
  3. Passive
   a. Preferred—None
   b. Alternate—None Vanguard Fund Choices (Annuity)

I. Stocks
 A. Large U.S. Stocks
  1. Market/Index
   a. Preferred—Equity Index
   b. Alternate—None
  2. Growth
   a. Preferred—Growth Portfolio
   b. Alternate—None
  3. Value
   a. Preferred—Equity Income
   b. Alternate—None
 B. Mid/Small U.S. Stocks
  1. Small Cap Active
   a. Preferred—Small Company Growth
   b. Alternate—None D. International Stocks
 1. Developed
  a. Preferred—International
  b. Alternate—None II. Bonds
 A. High Yield
  1. Corporate
   a. Preferred—High Yield Bond
   b. Alternate—None
 B. Intermediate-Term
  1. Passive
   a. Preferred—High Grade Bond Index
   b. Alternate—None Selling Possibly Repositionable Assets Once we have the functionality to add "possibly repositionable" assets to the system program, we will need a decision-making hierarchy to determine when, if at all, assets will be sold. There are two factors that will influence this decision: how close the client's strategic asset allocation (SAA) is to the target, without any further sales, and the tax cost associated with selling additional assets.

Step 1: Compare SAAs

If the client's SAA is within three percentage points (+/−3%) of the target, after selling all "repositionable" assets, do not consider selling any "possibly repositionable" assets. If the client's SAA is not within three percentage points (+/−3%) of the target, after selling all "repositionable assets", consider the tax cost of selling any "possibly repositionable" assets.

Rationale: Having a portfolio that is within 3 percent of the target should give a client a proposed portfolio with similar risk/return characteristics to the target portfolio. A portfolio 3% or less off target will behave similarly to the ideal target, but would have to be re-balanced in the future.

Step 2: Consider the Tax Cost

In order to get the client's SAA within three percentage points of the target, sell "possibly repositionable" assets until the tax cost equals five percent of the value of the portfolio. (The tax cost equals the market value minus the cost basis times 20% or 10%.) Liquidations will be made until the earlier of: (1) the proposed SAA is within three percent of the target or (2) the tax cost (including the cost of previous moves) equals five percent of the portfolio. Assets with the least tax cost will be sold first.

Note: It is possible that selling "repositionable" assets will result in a tax cost greater than five percent. If this is the case, no "possibly repositionable" assets will be sold.

Rationale (five percent rule): If the overall tax cost from the sale of securities is no greater than 5% of the portfolio (in aggregate), sales are made until the tax obligation equals 5% of the overall portfolio. Priority of sale is based on (a) tax consequence, lowest to highest (within each over-weighed asset or sub-asset class. The five percent threshold came from the fact that, in most of our allocations, the client would still have a positive real after-tax return, or the client's real wealth would not decline in most cases.

Rationale (20% and 10% tax rate): Using a 20% tax rate (or 10% for taxpayers in the 15% MTB) will be an accurate way to estimate a client's tax liability. It will understate their tax cost when they have a short-term holding period and their MTB is greater than 15%. (The likelihood of this is mitigated by the fact that assets greatly appreciating over a period less than twelve months, in many cases, will be non-repositionable.)

System Output Example Showing Summary of Conclusions

See the section entitled "AUTO REBAL SUMMARY" in Part 1. above.

Conclusion

Part II provides the foundation for auto-rebal. By first having the repositionable and non-repositionable functionality, at least 70% of the investment planning analyses can be automated. Further development will allow the auto-rebal product to handle a larger percentage of clients. The following are recommended developmental steps for auto-rebal:

Stage 1: Develop the foundation for auto-rebal by creating the repositionable functionality in conjunction with the preferred domain logic and automated text.

Stage 2: Add possibly repositionable functionality that is based on a tax and fee cost analysis.

Stage 3: Give the system (or counselor) the flexibility to choose an income tilt or tax-efficient portfolio.

Stage 4: Allow the counselor to pick the hierarchy of constraints (prioritize them) in the GUI.

Part III

FIGS. 8A-8H, taken together, provide a detailed, functional data flowchart of the Auto Rebal Model in accordance with the disclosed embodiment of the present invention. FIG. 8A is a flowchart of the overall Auto Rebal Model. The following abbreviations are used in FIG. 8A: VPAS refers to Vanguard Personal Advisory Service, INV refers to Investment, and AR refers to Auto Rebal. "PlanIT" is the name given by Vanguard to a system program used with the present invention. PlanIT is a Sybase database application program. However, the present invention may be practiced with any suitable type of database application program. PlanIT is also referred to in the text of the linear programming (see Appendix below).

Figure 8B:
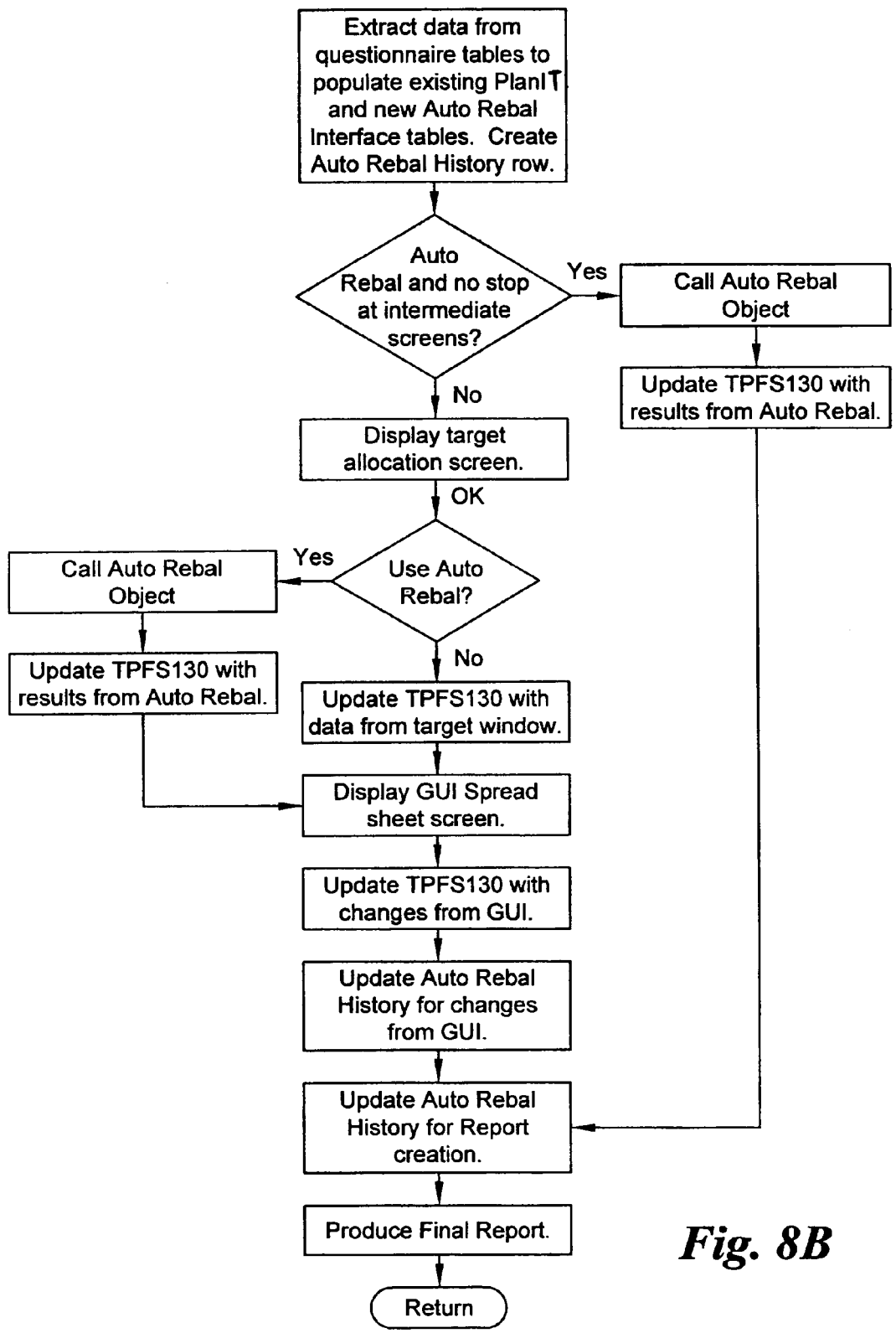

FIG. 8B is a flowchart of the analysis process associated with the Auto Rebal Model. TPFS130 refers to a database table which contains the changes to the current portfolio (buys and sells) recommended by Auto Rebal. Other tables identified by the format TPFS# are described in the text of the linear programming (see Appendix below).

Figure 8C:
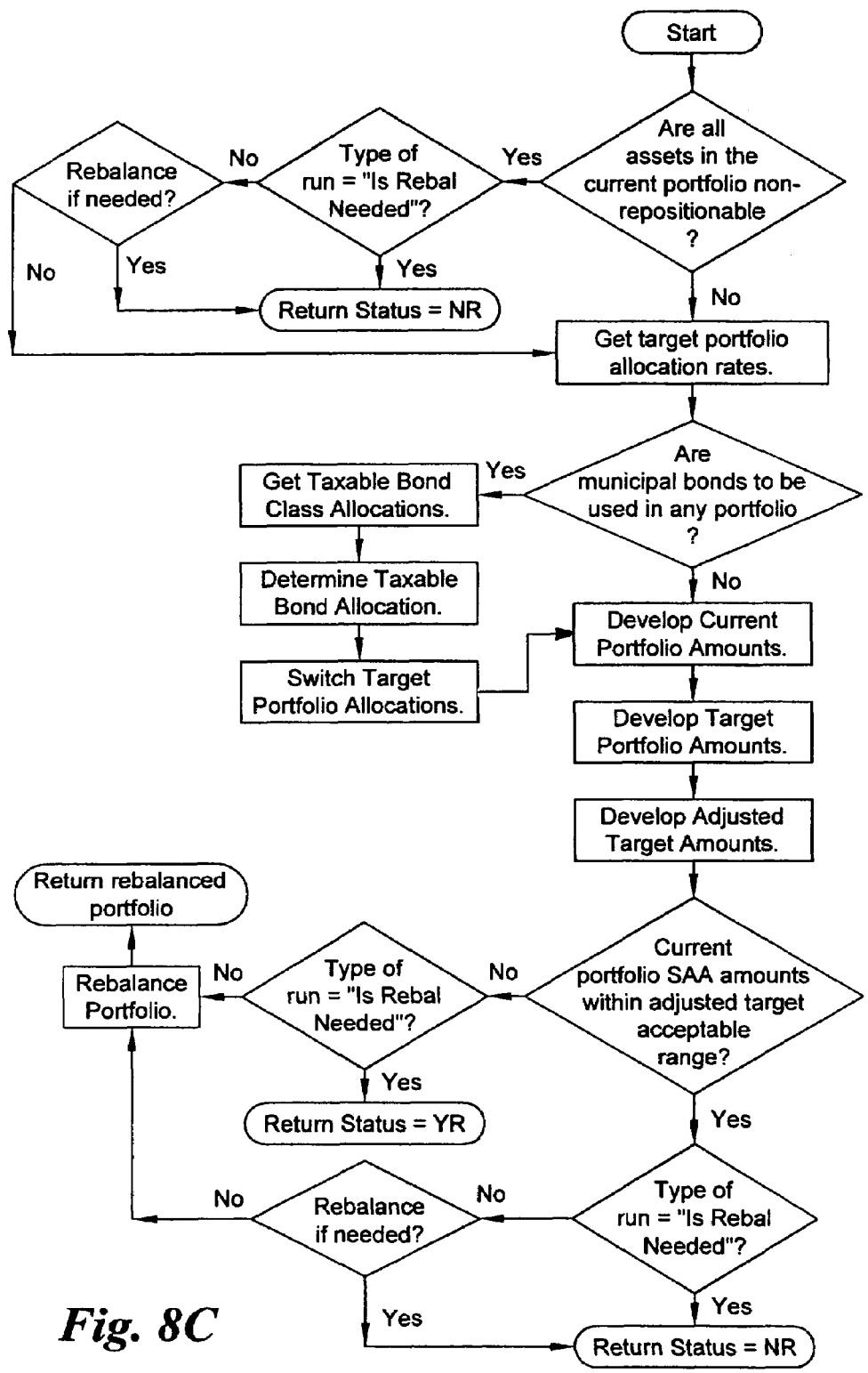

FIG. 8C is a flowchart of Auto Rebal Object associated with the Auto Rebal Model. NR refers to "rebalancing is not needed" (see Status Code values in the Appendix).

Figure 8D:
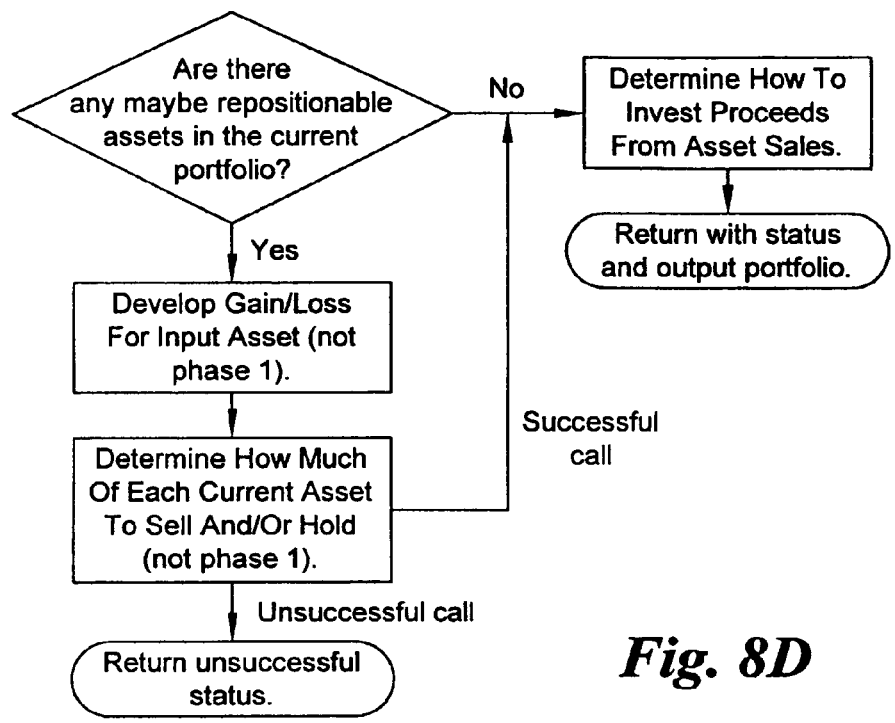

FIG. 8D is a flowchart associated with portfolio rebalancing in the Auto Rebal Model.

Figure 8E:
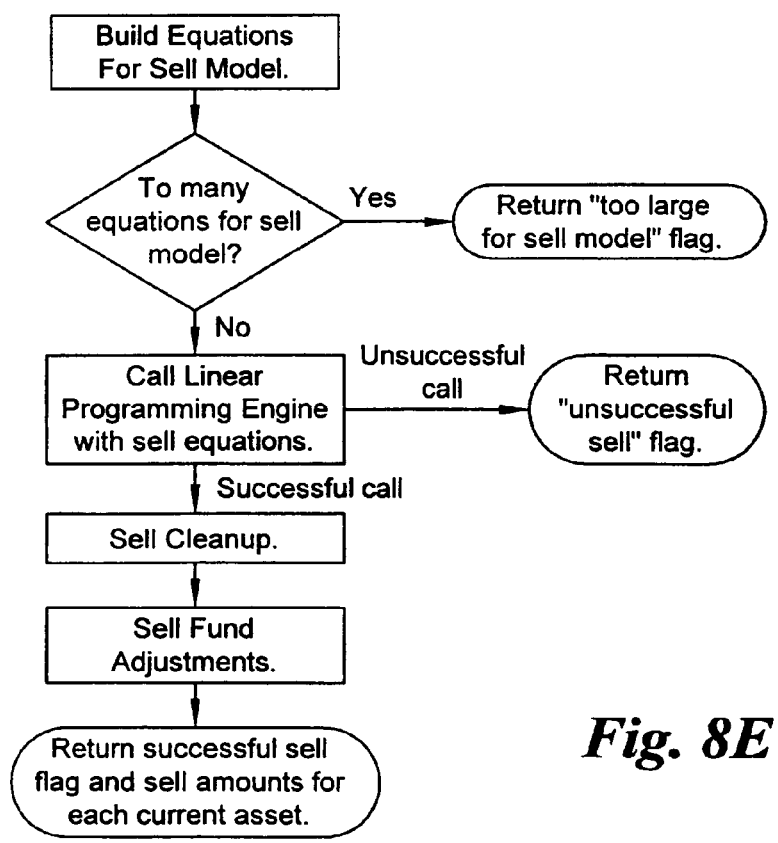

FIG. 8E is a flowchart associated with determining how much of each current asset to sell and/or hold in the Auto Rebal Model.

Figure 8F:
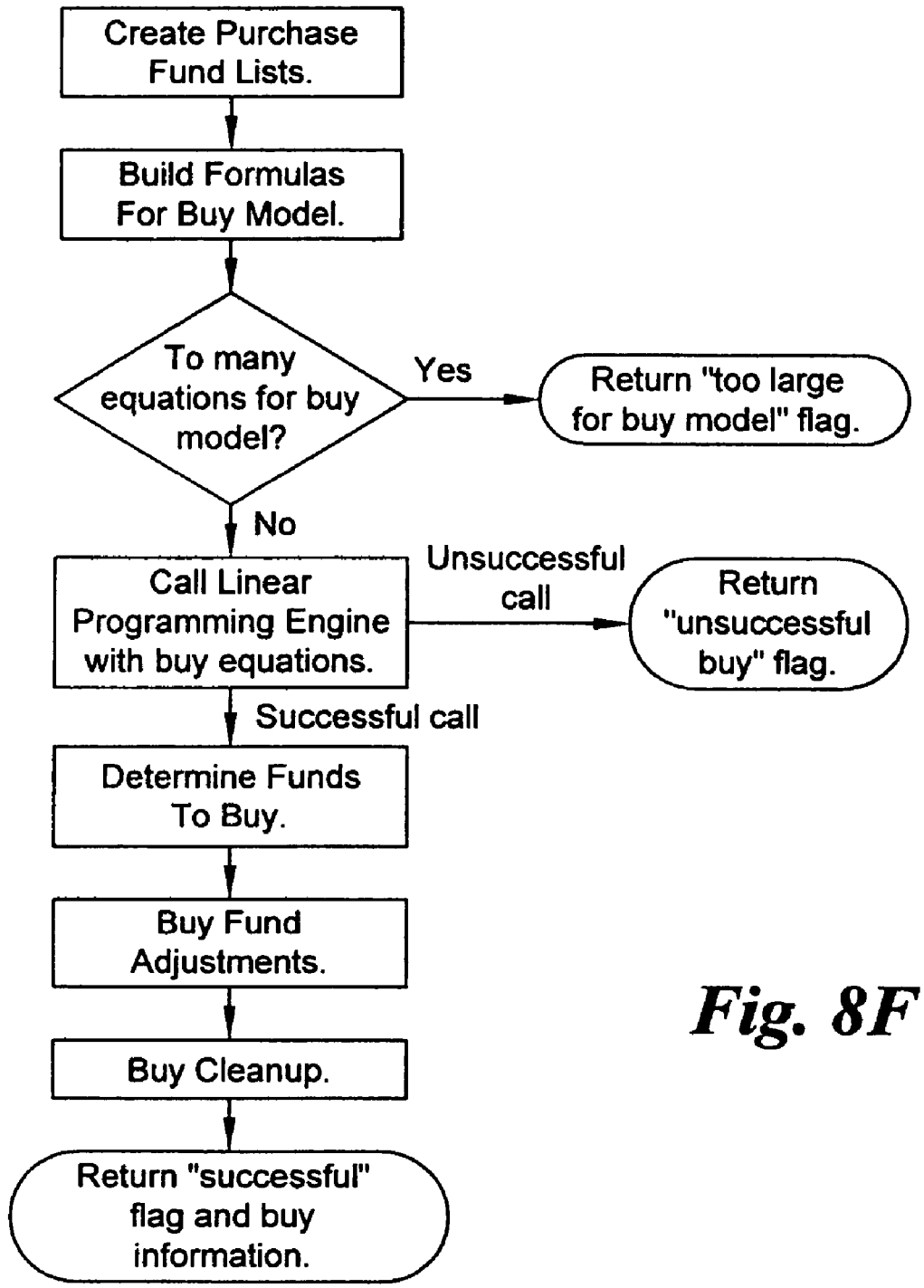

FIG. 8F is a flowchart associated with determining how to invest proceeds from sales in the Auto Rebal Model.

Figure 8G:
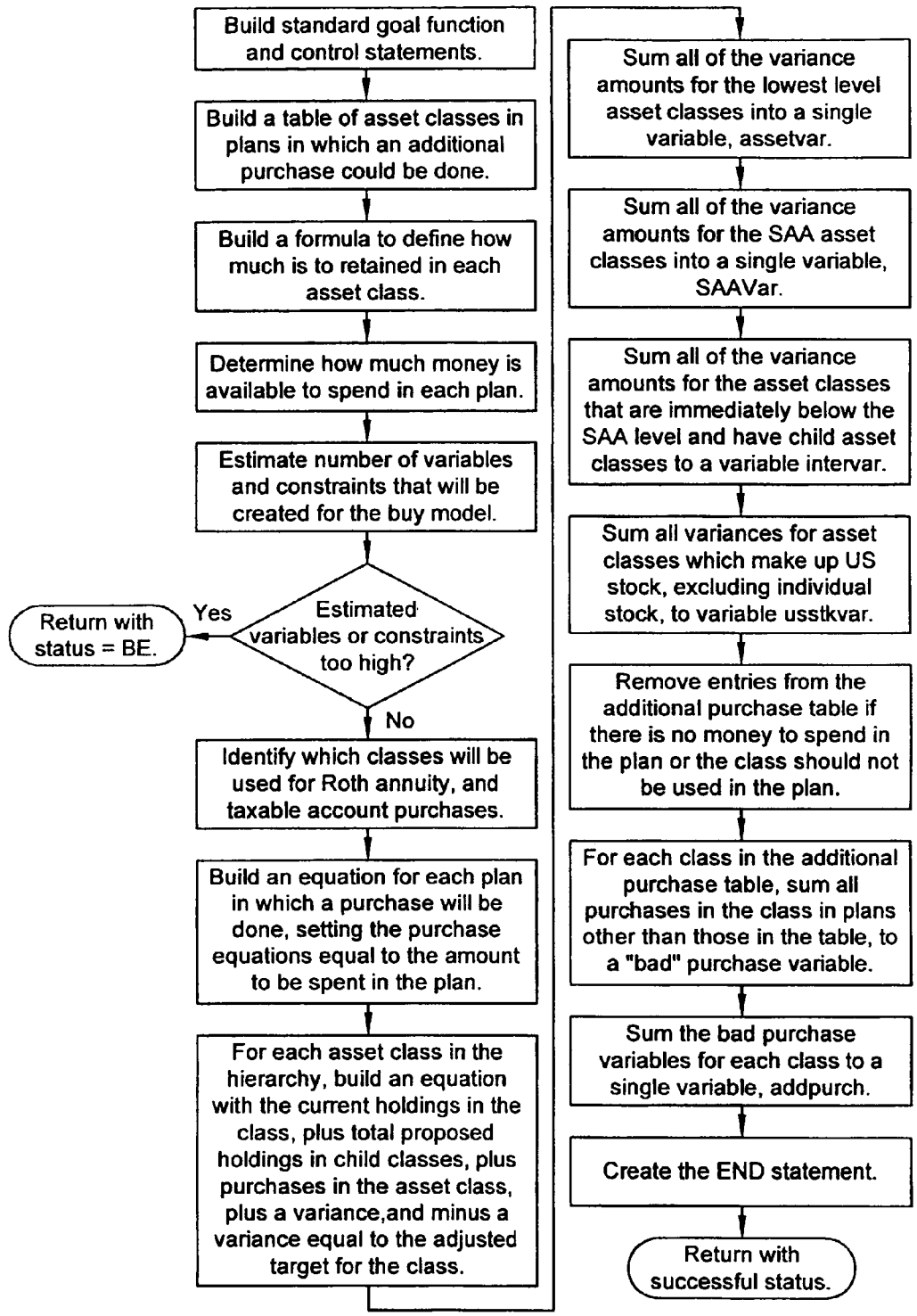

FIG. 8G is a flowchart associated with determining how to invest proceeds from sales and for building equations for a Buy Model in the Auto Rebal Model. BE refers to "request too large for buy linear programming process" (see Status Code values in the Appendix).

Figure 8H:
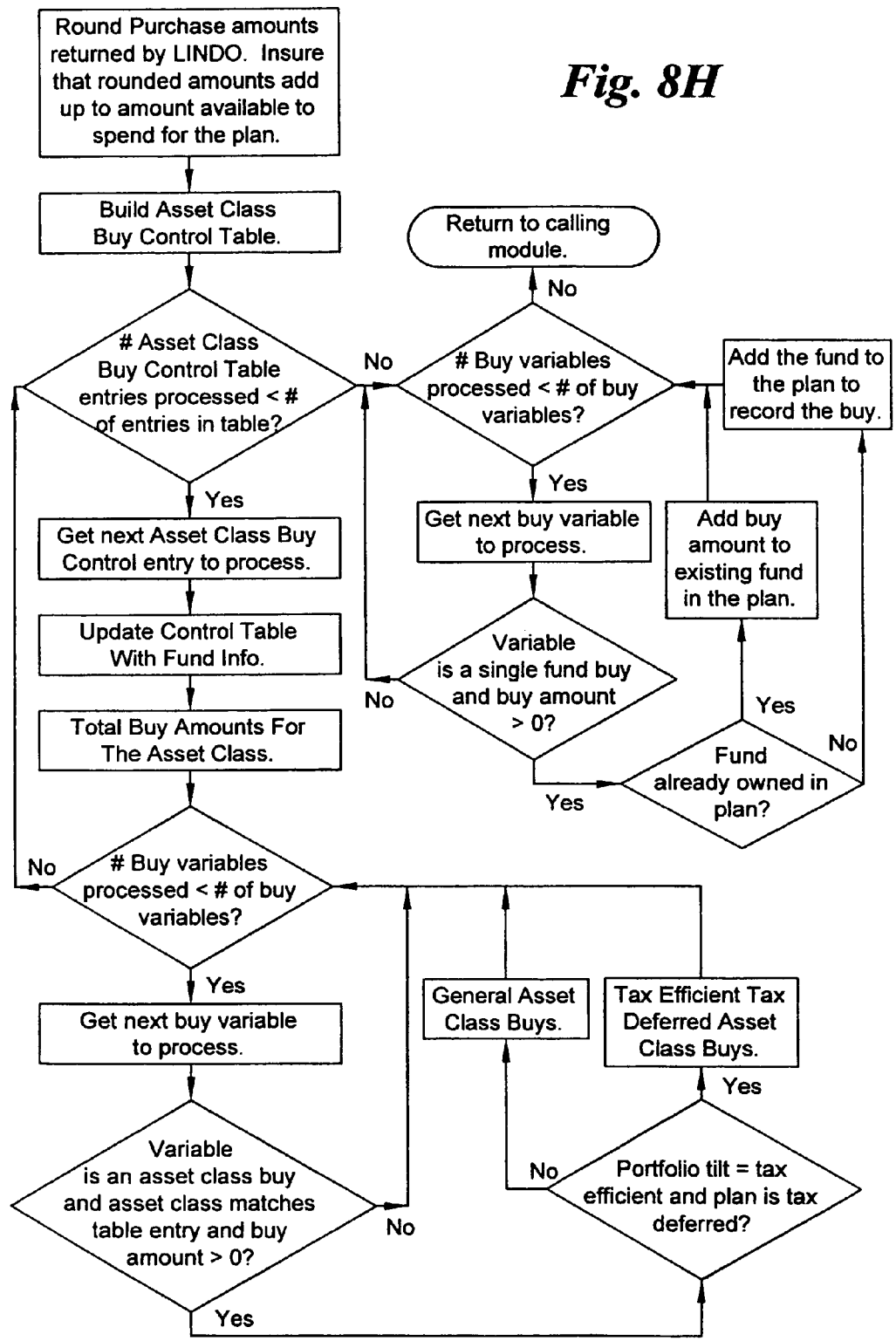
Figure 9A:
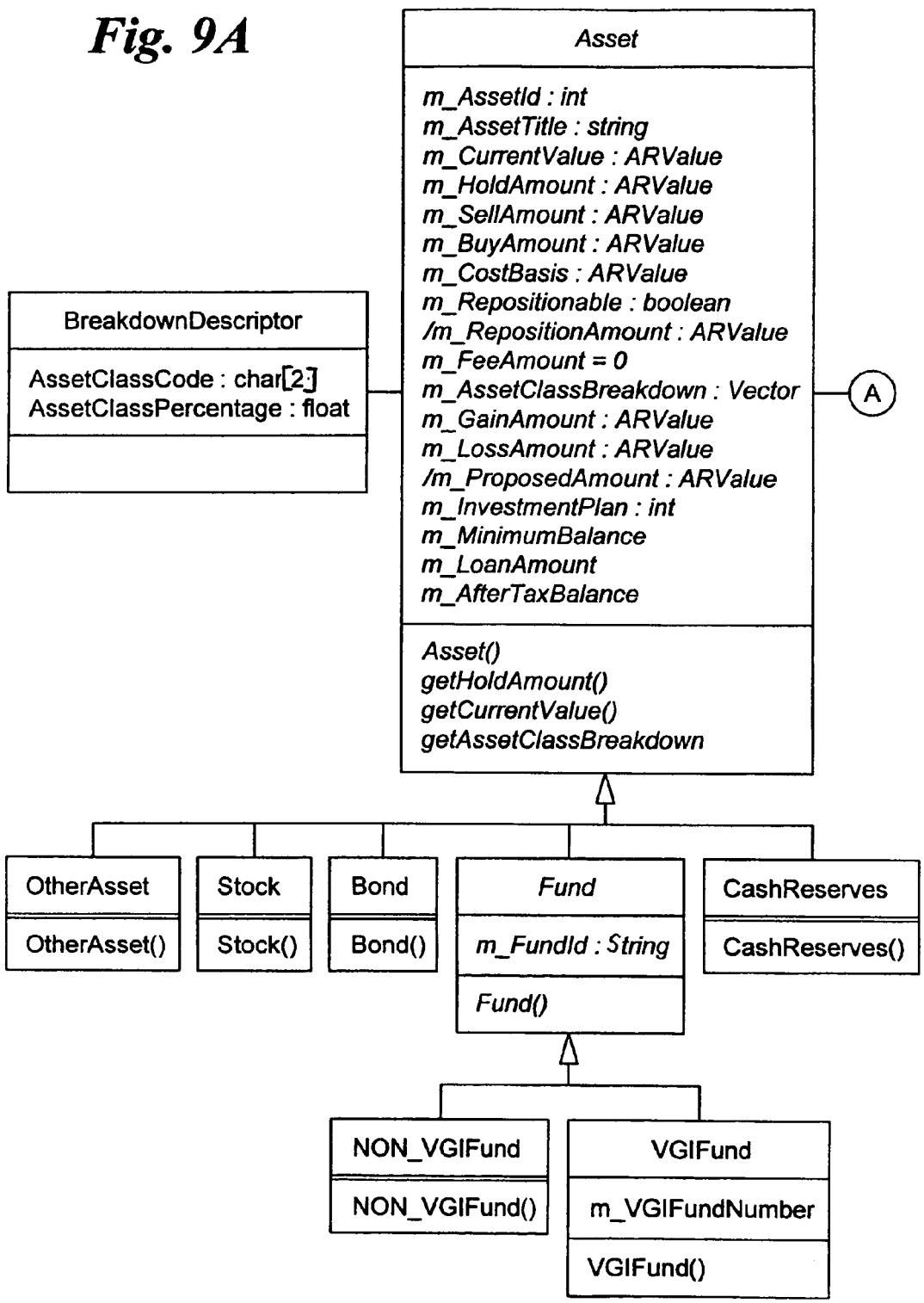
Figure 9B:
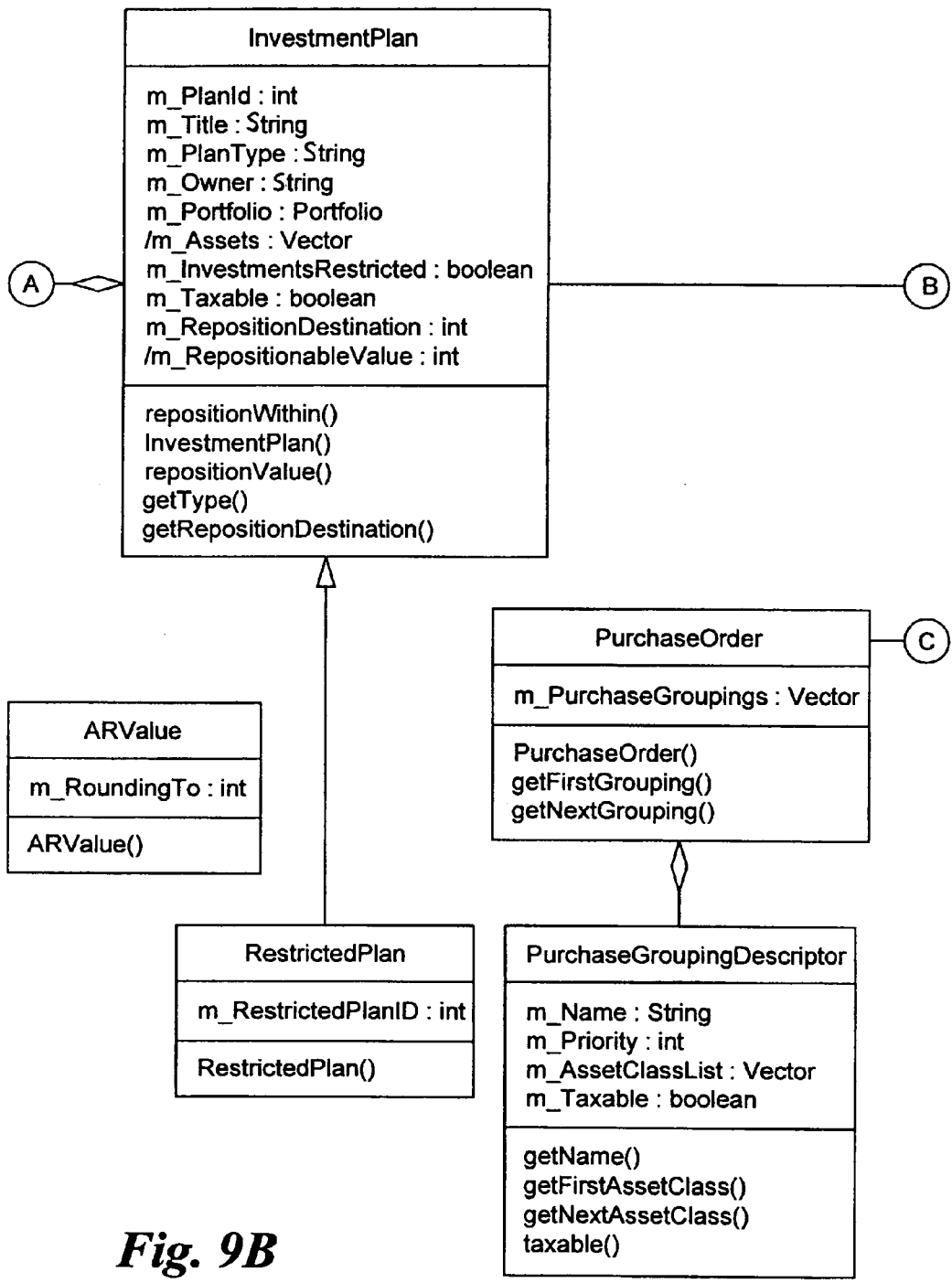
Figure 9C:
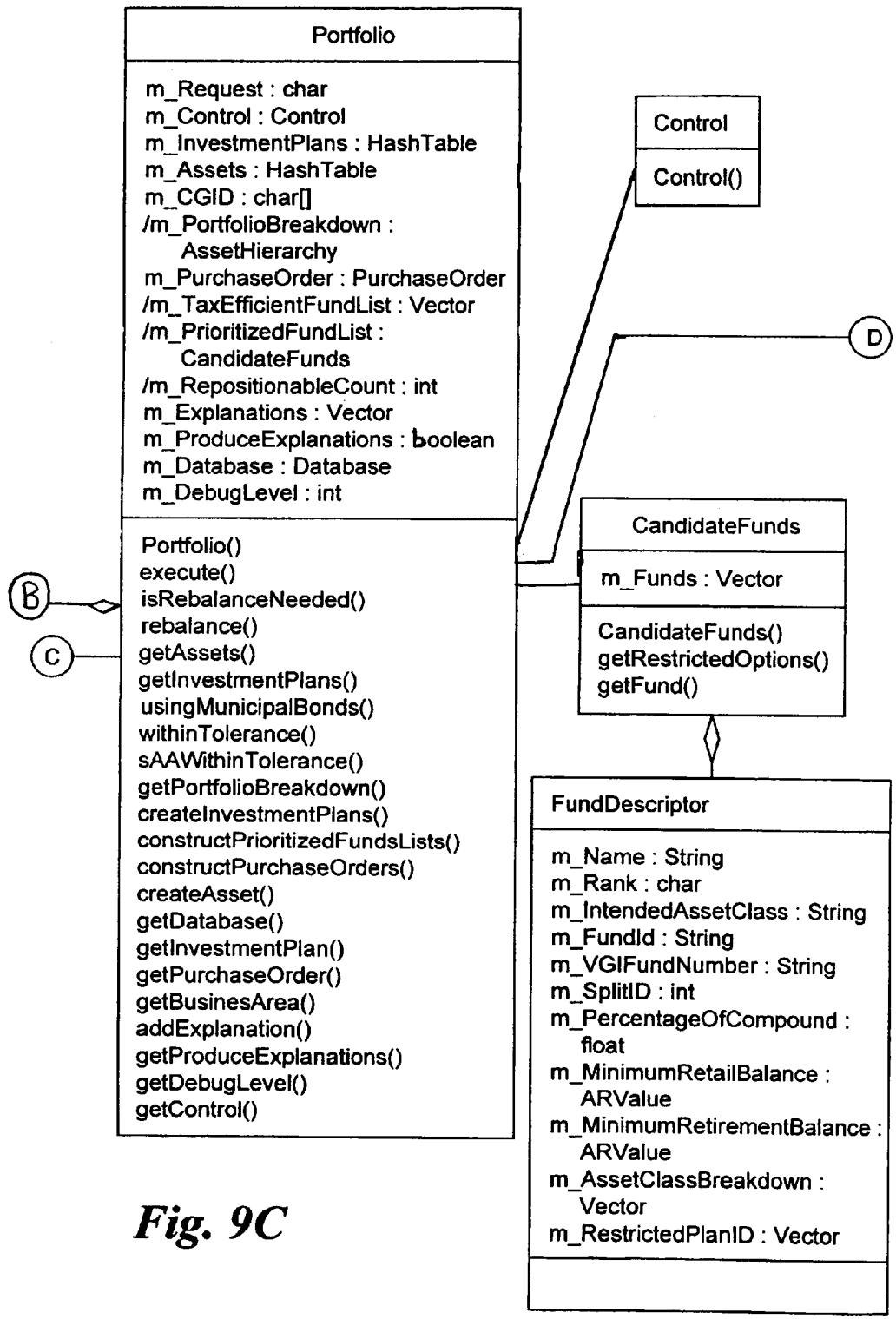
Figure 9D:
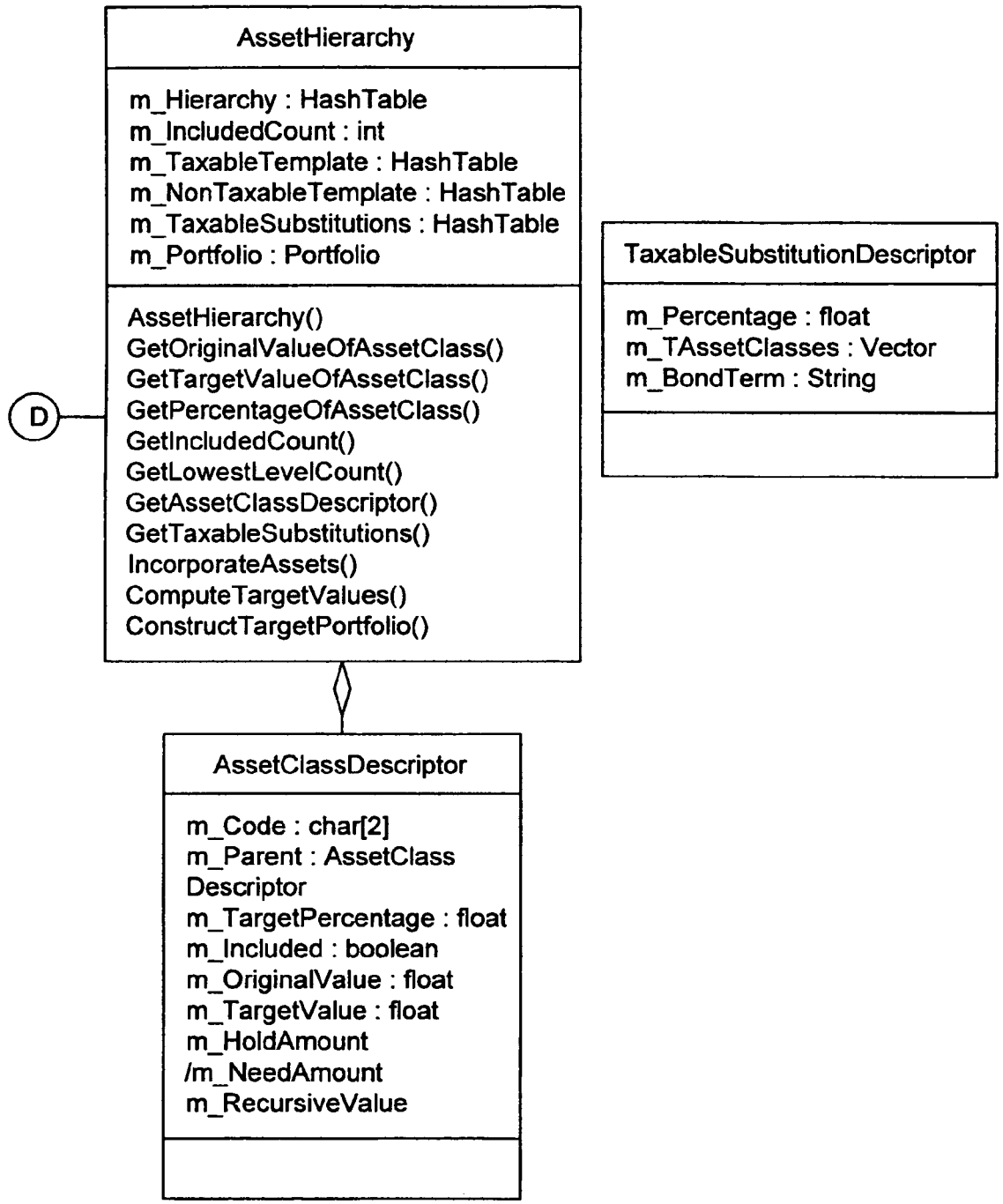
Figure 9G:
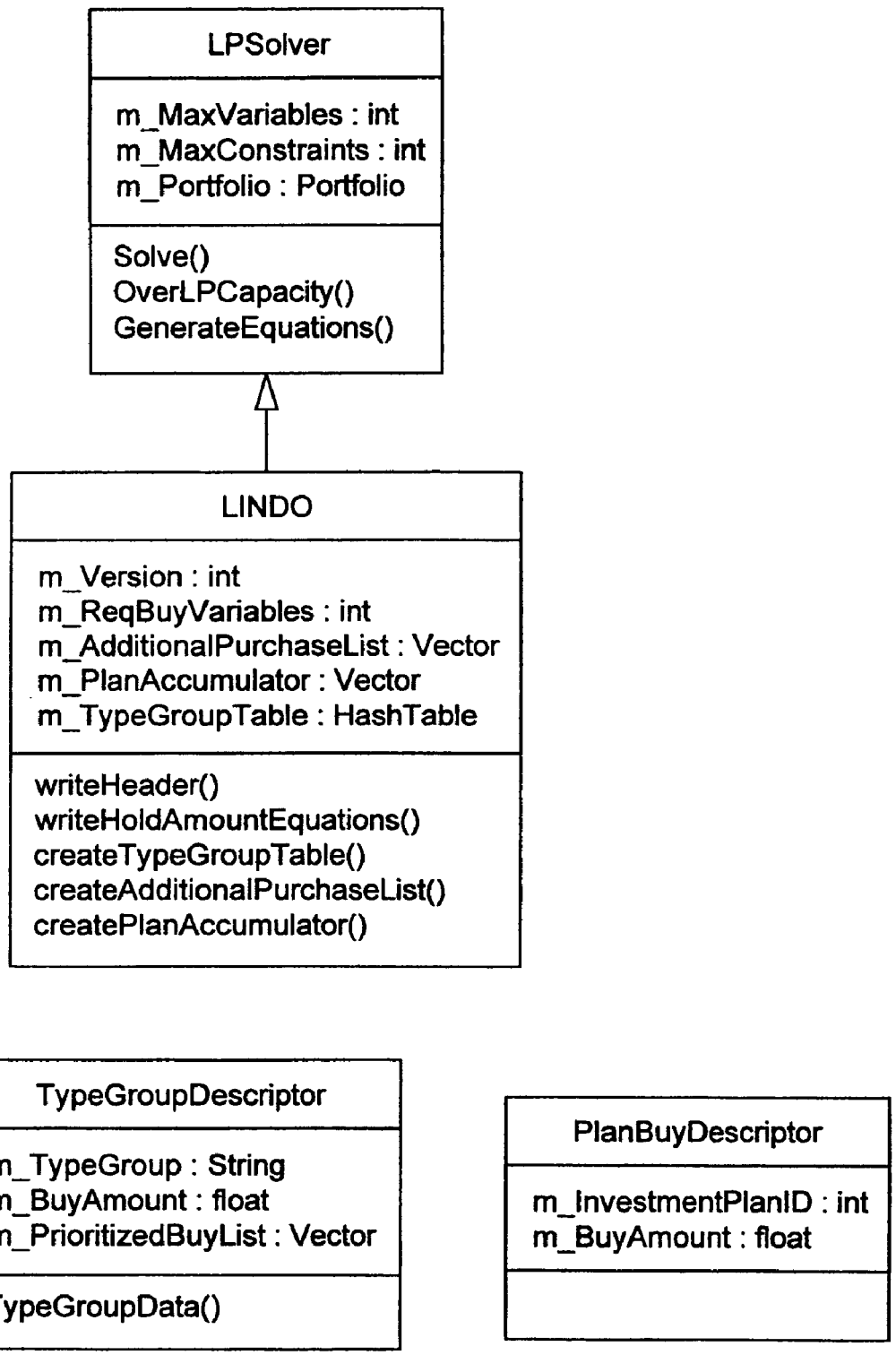

FIG. 8H is a flowchart associated with determining how to invest proceeds from sales and determining which funds to buy. LINDO refers to a linear programming engine used to solve the equations generated by Auto Rebal. The use of other linear programming engines are within the scope of the present invention.

The individual flowcharts are self-explanatory, and thus the individual steps in the flowcharts are not described in further detail herein.

FIGS. 9A through 9H show class diagrams for all of the objects used in the present invention. The class diagrams are self-explanatory, and thus are not described in further detail herein. Additional details of the steps in the flowcharts and of the objects are provided in the linear programming version of the present invention set forth in the APPENDIX.

Figure 10:
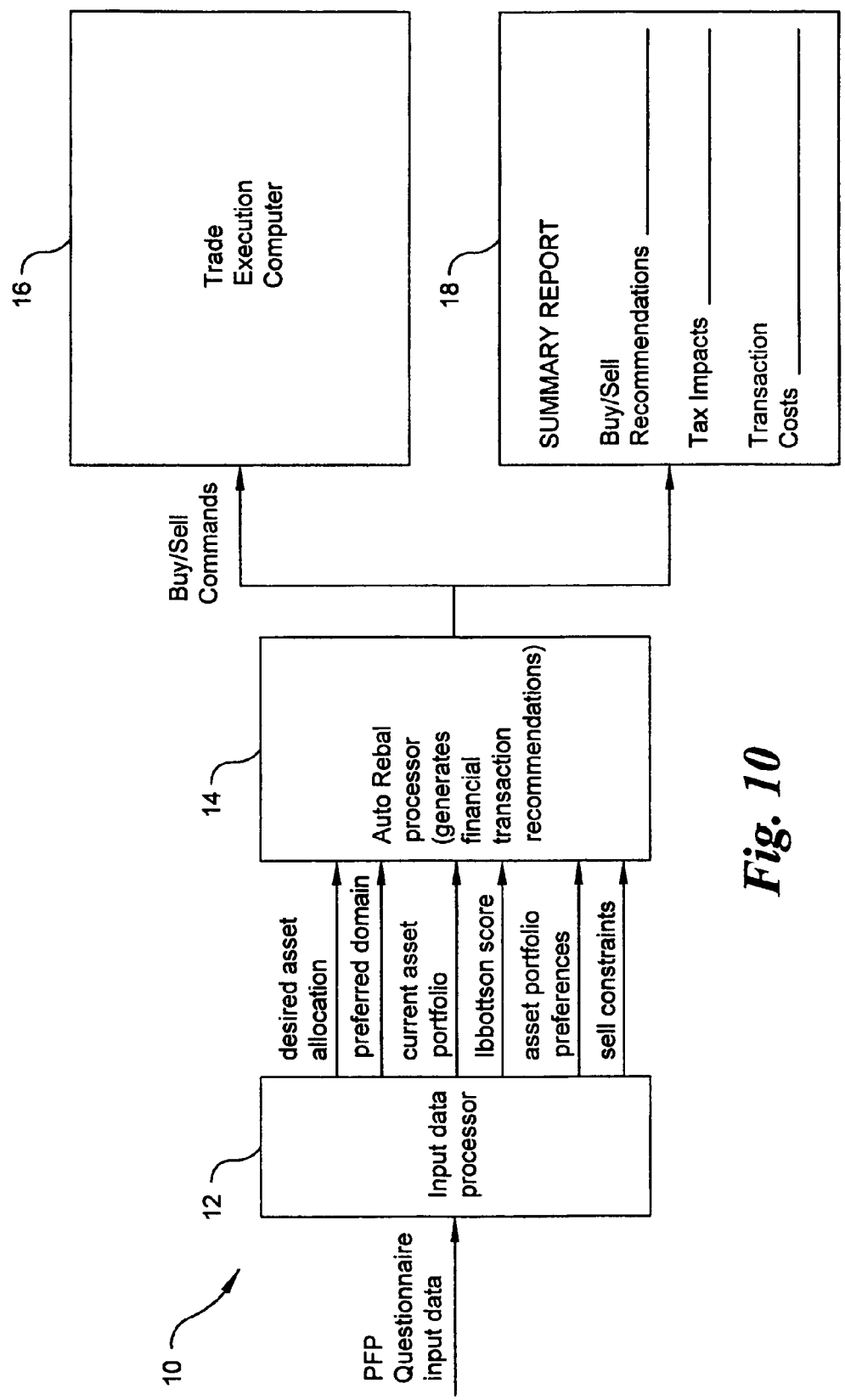
FIG. 10 is a generalized schematic block diagram of the present invention.

FIG. 10 is a schematic block diagram of an apparatus 10 for implementing the Auto Rebal process. The apparatus includes an input data processor 12, an Auto Rebal processor 14, a trade execution computer 16 and a Summary Report 18. PFP questionnaire data are provided to the input data processor 12 which outputs the client's current asset portfolio, asset portfolio preferences, and sell constraints, and calculates and outputs the client's desired asset allocation, preferred domain, and Ibbotson score, and communicates this information to the Auto Rebal processor 14. The Auto Rebal processor 14 uses this information to generate financial transaction recommendations, including asset buy/sell recommendations. In one embodiment of the invention, the recommendations, as well as the tax impacts and transaction costs thereof, are displayed in the Summary Report 18 for review by the client and/or the client's financial manager. In an alternative embodiment of the invention, the buy/sell recommendations are electronically communicated to the trade execution computer 16 which automatically performs the necessary transactions to execute the buy/sell recommendations. The trade execution computer 16 may be any suitable computer for executing trade orders. One example of such a computer is described in U.S. Pat. No. 5,819,238 (Fernholz), the entire disclosure of which is incorporated by reference herein.

As discussed above, the investor would ideally like to rebalance the portfolio without incurring any tax implications or transaction costs. However, selling stock assets almost always has tax implications, and any buying and selling of assets incurs transaction costs which immediately decreases the total assets of the investor. Thus, it is not necessarily beneficial to fully reach the desired asset allocation if doing so would incur excessive transaction costs and/or significant negative tax implications. The present invention addresses these issues in two ways. First, it may be programmed to recommend holding the client's possibly repositionable assets if the client's new asset allocation will be within a predetermined percentage of the desired asset allocation, such as 3%, after selling all of the client's repositionable assets. Furthermore, it may be programmed to recommend selling the client's repositionable assets until the tax cost of selling equals a predetermined percentage of the client's current asset portfolio.

Consider, for example, a client who has a desired SAA of 50% equities and 50% bonds and can rebalance from 65% equities and 35% bonds to 48% equities and 52% bonds without incurring any tax consequences, but that significant tax costs as a percentage of the client's current asset portfolio would arise by further rebalancing to the desired 50/50 ratio. In this example, the buy/sell recommendations would be selected to achieve the 48/52 ratio, instead of the 50/50 ratio. The same type of rebalancing limitations may be used with respect to transaction costs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Appendix

A. Auto Rebal Object.doc—Auto Rebal Object

Inputs

Rebalancing Control Variables

Data Source: All parameters from this section will be passed to Auto Rebal when it is called. For PFP, the parameter values will be obtained from the most recent version of the Auto Rebal Parameters Used table entry for the Client Group Id.

Request—Defines the function to be performed. Choices are "is rebal needed" and "rebalance". This variable will be set by PlanIT when the call is done. For phase 1, this will always be "rebalance".

Periodic Review—Defines whether the request is for a first time or periodic review. This value will be set by PlanIT when the call is done. For phase 1, this will always be "first time".

Client Group Id—A key which identifies the client group for whom Auto Rebal is being run. This key is used to retrieve asset and plan data specific to the client group.

Preferred domain—Choices are stocks "outside" or bonds outside. ("Outside" refers to investments in taxable accounts)

Use Muni Bonds For High Yield Bonds—Choices are yes and no.

Use Muni Bonds For Long Term Bonds—Choices are yes and no.

Use Muni Bonds For Intermediate Term Bonds—Choices are yes and no.

Use Muni Bonds For Short Term Bonds—Choices are yes and no.

m_MinRetirementFundBalance—Minimum balance required for a retirement account.

M_MinRetailFundBalance—Minimum balance required for a retail account.

m_PortfolioTotalCostPct—Percentage of the total portfolio value that is acceptable as a cost to be incurred when repositioning assets.

Minimum Txn Amount—Minimum dollar amount for any buy or sell transaction.

m_TSMPortfolioToleranceMinus—The acceptable negative variance for the large market and mid/small index holdings for combining these purchases into a purchase of Total Stock Market Portfolio.

m_TSMPortfolioTolerancePlus—The acceptable positive variance for the large market and mid/small index holdings for combining these purchases into a purchase of Total Stock Market Portfolio.

m_TotalIntlPortfolioToleranceMinus—The acceptable negative variance for the foreign developed and emerging market holdings for combining these purchases into a purchase of Total International Portfolio.

m_TotalIntlPortfolioTolerancePlus—The acceptable positive variance for the foreign developed and emerging market holdings for combining these purchases into a purchase of Total International Portfolio.

m_BusinessArea—VGI Business area requesting auto rebalancing services. Choices are: PFP and PAS.

Carry Forward Loss—Amount of loss incurred by the customer which can be used to offset gains incurred during rebalancing.

Current Year Gains—Amount of gain incurred by the customer in other activities or incurred for the customer during previous rebalancing in the current year which should be included in the total tax cost calculation used as a limit to repositioning of assets.

m_RoundingTo—Rounding parameter for all calculated values. Choices are to the nearest $1 or nearest $100.

Tax Rate Used For Calculating Tax Cost—Tax rate, expressed as a decimal amount, to be used when estimating the tax cost incurred in rebalancing the portfolio. Current values would be 0.10 or 0.20.

m_SAAPeriodicVarianceMinus—The acceptable negative variance from the target SAA amount when determining whether or not rebalancing is needed. Used for PAS on periodic review.

m_SAAPeriodicVariancePlus—The acceptable positive variance from the target SAA when determing whether or not rebalancing is needed. Used for PAS on periodic review.

m_SAAVarianceMinus—The acceptable negative variance from the target SAA when determining whether rebalancing is complete.

m_SAAVariancePlus—The acceptable positive variance from the target SAA when determing whether rebalancing is complete.

Estimate Tax Cost—Flag to indicate whether tax cost should be estimated for the purpose of determining whether to sell an asset. Possible choices are yes and no.

Estimate Tax Cost Asset %—Percentage of current asset value that should be used to estimate tax cost. This field is only valid if Estimate Tax Cost is yes. Field should be supplied as a decimal amount, <=1.

m_PortfolioTilt—Type of portfolio being used for the rebalancing. Valid choices are NO=core, IN=income, and TE=tax efficient.

m_TacticalShift—The amount by which stock allocations should be decreased and bond allocations increased. Acceptable values are 0.05, 0.10, and 0.

Portfolio Number—The portfolio selected for the client based on their Ibbotson score. The value may have been modified by the counselor. Valid values are 1 through 7.

m_TaxAcctDCAFund—The Vanguard fund number identifying the fund to be used in taxable plans for dollar cost averaging, as an intermediate fund between sells and buys, or as a cash investment. This fund will also be used if the total buy amount in a taxable plan can not be successfully invested in a target fund.

m_TaxExmptDCAFund—The Vanguard fund number identifying the fund to be used in tax exempt plans for dollar cost averaging, as an intermediate fund between sells and buys, or as a cash investment This fund will also be used if the total buy amount in a tax exempt plan can not be successfully invested in a target find.

m_aLegalResidenceState—The client's legal residence state. Used for selecting municipal bond fund alternatives.

Produce Explanations—This is a yes/no flag indicating whether explanations for changes to the proposed portfolio should be produced by the system. If the flag is set to yes, the explanations should be created.

System Control Variables

The following constant values are used to control the rebalancing process. These constants are stored in table tpfs302 as parameters for the SYS business area. These constants are described elsewhere in this design and specify the current value for the parameter. However, the code should retrieve the actual values from the data base.

A stored procedure must be called to retrieve this data. A record will be returned containing the following parameters:

Max # of Assets—integer value
Max # of Plans—integer value
Max # of Constraints—integer value
Max # of Variables—integer value
Required Buy Variables—integer value
Required Buy Constraints—integer value
Target Portfolio Data Source: The target portfolio is stored in tables tpfs106 and tpfs107.

A list of lowest level asset classes and associated percentage amount expressed as a decimal. The total of the percentages for all asset classes must equal 1.

There are separate taxable and tax exempt versions of the portfolios. If the tax exempt version is used, the actual purchases may be in taxable funds depending on whether the client should be using tax exempt funds for that bond duration and whether the type of account in which the purchase is being done permits the use of municipal bonds.

The target portfolio is stored by business area, portfolio number, portfolio tilt, and muni bond use.

EXAMPLE

| | |
|---|---|
| S7 | .32 |
| S8 | .13 |
| S9 | .55 |

Investment Assets

Data Source: The information for these fields will come from the data entered on the investment assets and retirement plan screens. When the Analysis function is requested, PlanIT will extract this data and load it to the new Rebalancing Assets table. The Rebalancing Assets table will be the source of this data for Auto Rebal.

Note: Asset # needs to be sequentially assigned. This does not correspond to anything within PlanIT. This field is used to identify the asset uniquely to the LP engine. This will be done by the stored procedure which retrieves the data from the data base.

Note: Plan # is a sequentially assigned number to keep asset groupings unique. This will be assigned by the stored procedures which extract the data from the questionnaire at the start of the analysis function.

Note: Hold amount should come from PlanIT to allow part, not all of an asset to be specified as held. This capability is provided because of the need for a cash carve out. This would allow the counselor to specify part of the client's cash balance be retained. The cash asset could then be specified as repositionable and the retained portion would be kept. If there was a cash allocation in the portfolio, the held portion would be used to satisfy this. This partial hold won't work until we go to maybe repositionable assets.

Note: Repositionable flag settings are not valid for PAS. An additional field on the investment and retirement plan entry will be needed to specify this information when PAS is implemented.

A list of all assets to be included in the rebalancing. For each asset, the following information must be provided:

Asset #—Sequentially assigned number to uniquely identify an asset. Additional assets can be returned with the output.
Plan #—A number which identifies the plan to which the asset belongs.
VGI Fund #—The fund number used to identify a Vanguard fund.
VGI Fund Flag—A flag to indicate that the asset is a Vanguard fund.
Title
Current Amount—The current value of the asset in whole dollars.
Hold Amount—The amount of the asset to be retained in whole dollars. For a non-repositionable asset, this would equal the current amount. For a maybe or yes repositionable asset, this can be any amount>=0 and <=current amount.
Cost Basis—The total cost basis for the asset in whole dollars. If tax cost is unknown, this field should contain nulls.
Fee Amount—The amount in dollars which would be incurred if the asset is sold. Nulls in phase 1.
Loan Amount—For a retirement plan asset, the dollar amount that is not available for repositioning because it is loaned. This amount must be <=Current Amount and <=Hold Amount.
After Tax Balance—For a retirement plan asset, the dollar amount that represents after tax contributions. This amount must be <=Current Amount.
Repositionable Flag—Flag to indicate whether the asset can be repositioned. Choices are:
  Yes—definitely sell the asset
  No—do not sell the asset
  Maybe—asset may be sold to meet the target allocation percentages
Minimum Balance—The minimum amount allowed in this fund. This will be either the retail or retirement minimum, depending on the type of plan to which this account belongs.
Asset Class Breakdown—The asset classes and associate percentages which make up the asset. These asset classes must be at the lowest level of the asset hierarchy. Percentages are expressed as a decimal amount. All percentages must add up to 1. For each asset class, an asset class code and amount must be provided.

EXAMPLE 1

S7 1.00

EXAMPLE 2

S7 0.60
B2 0.40

If the number of assets retrieved for a plan exceeds the control parameter for maximum assets, exit with an error; auto rebal can not be run.

Investment Plans

Data Source: New PlanIT table, Investment Money Pools. When the Analysis function is requested in PlanIt, PlanIT will extract this data from the existing tables and create the new table.—For retirement plans, most of this data will come from the Retirement Plan entry screen.

Note: Plan # is a sequentially assigned number to keep asset groupings unique. For retirement plans, this could be the plan # (1, 2, etc.) identified on the entry screen. However, there also must be dummy plans created for any ownership type defined for the investment assets. e.g. a plan would be created for joint/spouse and a separate plan for the husband's individual accounts. The stored procedure which extracts this data into the Investment Money Pool table will assign the pool #.

A list of all plans to which the investment assets belong. A plan is a grouping of assets by owner and account type. For example, it could represent all of the assets owned jointly with the spouse or a husband's IRA accounts. It is not an individual account or registration.

For each plan, the following data must be supplied:

Plan #—Sequentially assigned number to uniquely identify a plan. Limited to 99 (existing plus any that would be added due to repositioning an existing plan to a different type).

Type—For retirement plans, this is the type of plan. Available choices are: 401(K), 403(B), 457, Qualified Annuity, Non-qualified Annuity, ESOP, KEOGH, Money Purchase Plan, Profit Sharing, Roth IRA, SARSEP, SEP IRA, SIMPLE IRA, Stock Bonus, Traditional IRA, and Rollover IRA. For non-retirement plans (taxable), this will contain spaces.

Owner—The owner of the plan.

Reposition To Plan #—The plan # to which the repositioned assets should be moved. If the plan assets are being repositioned within the plan, this field will contain the plan #. Must specify a number which corresponds to one of the supplied plans.

Restricted Investments—A flag to indicate whether the investment choices for the plan are limited. Choices are yes and no.

Tax Status—Taxable or tax deferred.

If the number of plans retrieved exceeds the control parameter for maximum plans, exit with an error; auto rebal can not be performed.

Primary Fund List

Data Source: New Preferred Fund Class, Preferred Funds, and Alternate Funds tables containing preferred and alternate finds.

This is a list of the preferred and alternate funds to be used as investment choices in plans which do not have restricted funds. At least one investment choice should be provided for each asset class in the target portfolio. Each entry in the list should contain the following information:

Asset class
Preferred/alternate (P=preferred, A=alternate)
VGI fund number
Fund Id
Title
Minimum Retail Balance
Minimum Retirement Balance
Split Fund #—A number (0 through 9) used to differentiate between multiple funds when purchases should be split between multiple funds. 0 indicates the buy goes to a single fund.
Split Rate—A rate used to specify the portion of an investment that should go to a given fund when the purchase should be split between multiple funds. Maximum amount is 1.00. Format is 9.99. Split rates for the preferred funds for a single asset class must add up to 1.00.

Fund List for Tax Efficient Portfolio

Data Source: New Preferred Fund Class, Preferred Funds, and Alternate Funds tables containing preferred and alternate funds.

A separate list of preferred funds to be used in taxable accounts if the portfolio tilt is tax efficient. Each entry in the list should contain the following information:

Asset class
Preferred/alternate (P=preferred, A=alternate)
VGI fund number
Fund Id
Title
Minimum Retail Balance
Minimum Retirement Balance
Split Fund #—A number (0 through 9) used to differentiate between multiple funds when purchases should be split between multiple funds. 0 indicates the buy goes to a single fund.
Split Rate—A rate used to specify the portion of an investment that should go to a given fund when the purchase should be split between multiple funds. Maximum amount is 1.00. Format is 9.99. Split rates for the preferred funds for a single asset class must add up to 1.00.

Restricted Investment Plans Fund Selections

Data Source: New Master Restricted Investment Alternatives table containing the restricted funds for a plan. The data is stored once in PlanIT for a given plan (e.g. Texaco's 401(K)). However, there can be multiple plans (e.g. husband and wife both belong to Texaco's 401(K) plan) within the data needed by Auto Rebal that point to the same list of restricted funds. The same data would be repeated for each of these plans.

This is a list of the investment choices available to a plan with restricted investment alternatives. For each investment available to a restricted plan, the following information should be provided:

Restricted Plan Id—identifies the restricted plan for which the investments should be used Limited to a maximum of 99.
Restricted asset #—A sequentially assigned number to uniquely identify an asset within a plan. Limited to a maximum value of 99.
Asset #—Uniquely identifies an asset within the plan alternatives. A sequentially assigned number within the plan which starts at 1 for each plan.
Asset Class Breakdown—The asset classes and associate percentages which make up the asset These asset classes must be at the lowest level of the asset hierarchy. Percentages are expressed as a decimal amount. All percentages must add up to 1. For each asset class, an asset class code and amount must be provided. Up to 40 asset classes can be specified.
Minimum Retail Balance—The minimum amount that can be in this fund if the account is in a taxable plan.
Minimum Retirement Balance—The minimum amount that can be in this ftnd if the account is in a non-taxable (retirement) plan.
VGI fund number—only provided for Vanguard funds (may be blank)
VGI Fund Flag—A flag to indicate that a fund is a Vanguard fund.
Fund Id—The id of the fund on the PlanIT data base.
Title
Asset Hierarchy Data Source: Data is in TPFS009.

A list of the available asset classes and how they relate to each other. Only investment asset classes should be included in the hierarchy. The top level of the hierarchy must be IV, for investment. Each entry in the list must contain an asset class, a parent asset class, and a flag to indicate whether it should be included in the rebalancing process. An asset class can be included in the hierarchy for defining assets, but rebalancing can be done at a higher level. Holdings in child asset classes would be combined to determine the holdings at the level where rebalancing is done. IV should not appear as an asset class, only as a parent asset class.

EXAMPLE

| asset class | parent asset class | Rebalancing Level |
|---|---|---|
| SA | ST | Y |
| ST | IV | Y |
| S2 | SA | Y |
| S7 | S2 | N |
| S8 | S2 | N |
| S9 | S2 | N |

Purchase Hierarchies

Data Source: New Purchase Preferences data base table.

The order in which asset classes should be purchased. Separate hierarchies should be provided for the following categories: bonds outside, stocks outside, bonds "inside", stocks inside, Roth, and annuity. Each purchase hierarchy should consist of the complete set of lowest level asset classes which should be purchased, listed in descending preference order. For example, the bonds outside hierarchy would start with bonds but would have stock asset classes listed after the bonds. ("Inside" refers to within a tax sheltered plan. For example, an IRA.)

For the purpose of investment order, bond groups which split into a choice of taxable or tax exempt must include both sets of asset classes. The actual class used would be based on whether municipals should be purchased for the bond group and the whether the type of account in which the purchase is done offers a municipal selection.

Only asset class would be input to the auto rebalancing process. Description is included in the list for information purposes. Also, some asset classes have not yet been added to the asset hierarchy, so the code is not yet known.

Vanguard Funds not Wanted

Data Source: New PlanIT table.

A list of Vanguard fund numbers that the customer does not want to own.

Equivalent Asset Class Table

Data Source: New PlanIT table. The entire table would be read into storage.

Asset Group—The asset group to which an asset class belongs. This code does not need to correspond to any asset class code. It is used simply to group common entries in the table.

Asset Class Code—The asset class code which varies depending on some client criteria. For the initial implementation, asset allocations would switch between municipal bond asset classes and taxable bond asset classes depending on whether the client should be using municipal bonds for their portfolio and whether the investment is being done in a taxable account.

Tax Status—Indicates whether the investment is taxable or non-taxable. Valid values are TX=taxable, NT=non-taxable.

Bond Term—A code to indicate the type of bond. Valid values are HY=high yield, LT=long term IT=intermediate term, ST=short term, and blanks=not applicable.

Outputs

Always Returned

The following data fields are always returned from the auto rebalancing object:

Status—Indicates whether requested function completed successfully. Values are:

| Status Code | Meaning |
|---|---|
| YR | Rebalancing is needed |
| FS | Rebalancing failed in sell linear programming process |
| FB | Rebalancing failed in buy linear programming process |
| FR | Final Report run (set by PlanIT) |
| SE | Request too large for sell linear programming process |
| BE | Request too large for buy linear programming process |
| NR | Rebalancing is not needed |
| SR | Rebalancing was completed successfully |
| BR | Bad request code sent |
| PC | Analysis canceled in PlanIT (set by PlanIT) |

Optional Data Returned—Indicates whether optional output data was returned. Choices are yes and no. For status codes Y or N, no other output data would be provided. For other status codes, rebalancing may have been partially completed.

Optional Output

The following data may or may not be returned. If the optional data returned flag indicates no data was returned, none of this data is returned. If the optional data returned flag indicates data was returned, all types of data will be returned.

Investment Assets

Update the Rebalancing Assets table with this data. For assets that were input, buy amount, sell amount, proposed amount, tax cost, and fee cost fields would be updated. For new assets, added by the rebalancing process, a new row containing the fields shown would be added to the table.

A list of all assets after rebalancing. All input assets will be returned, followed by the assets added by the rebalancing process. For each asset, the following information must be provided:

Asset #—Sequentially assigned number to uniquely identify an asset. For assets which were input, this is the number supplied. For new assets, this is a sequentially assigned number beginning with the last number used on an input asset +1.

Plan #—A number which identifies the plan to which the asset belongs.

Asset Class Breakdown—The asset classes and associate percentages which make up the asset.

VGI Fund # The fund number used to identify a Vanguard fund. (May be blank).

VGI Fund Flag—A flag to indicate that the investment is a Vanguard fund.

Title—Fund name or description of an individual stock or bond.

Current Amount—The current value of the asset in whole dollars. For input assets, this is the amount which was supplied. For new assets, this field would contain zeros.

Buy Amount—The amount of the asset which should be purchased.

Sell Amount—The amount of the asset which should be sold.

Proposed Amount—The amount of the asset which should be held in the proposed portfolio. Current amount +buy amount—sell amount=proposed amount.

Explanations

Update the new Explanations table in the PlanIT data base, adding a row for each message created.

Text messages explaining why different rebalancing decisions were made.

Work Fields which must be Accessible by Multiple Modules within the Auto Rebal Object This section defines work data fields which are needed by the Auto Rebal Object. These fields are temporary storage areas for information which exist only for the instance of the Auto Rebal Object. These fields are created and populated by the Auto Rebal Object. When the object conpletes, the work fields should cease to exist. The contents are unique to a given instance of the Auto Rebal Object.

Asset Gain Amount—Dollar amount gained on an asset since it was purchased. This amount may be an estimate. Created by Develop Gain/Loss For Each Input Asset.

Asset Loss Amount—Dollar amount lost on an asset since it was purchased. This amount may be an estimate. Created by Develop Gain/Loss For Each Input Asset.

Last Used Asset #—Highest asset number currently assigned to an asset. This number is used to assign a unique identifier to any asset added to the portfolio during rebalancing. Created By Initialize Output Investment Assets.

Model File—A sequential file of equations to be used by the LP processing engine to determine the asset classes in which purchases should be done.

Alternate Asset Class Table—This table identifies the taxable asset class codes and percentages to be used for a tax exempt class when the tax exempt class is not applicable. Each row of the table will have the following data fields:

Tax Exempt Bond Class—The tax exempt asset class code which may be replaced by the taxable alternative.

Amount Moved To Taxable Class—The amount of money reallocated from the desired tax exempt asset class to the alternative taxable class.

Alternate Class Count—The count of the alternate taxable asset classes which should be used in place of the Tax Exempt Bond Class. No entry should have an alternate class count <1.

Alternate Class Array—An array of the alternate taxable asset classes. The number of entries in the array corresponds to the Alternate Class Count. Each entry in the array has the following fields:

Asset Class—A taxable asset class code.

Asset Class Percent—The percentage, expressed as a decimal value, of the total portfolio represented by the asset class code. A value of 10% would be stored as 0.10.

Note: Logic within the Auto Rebal Object will look for values in this table even when it may not have been created. It will need to either be able to recognize an "empty" table or have a flag to say the table can not be checked.

Main Control

```
IF request is equal to "is rebal needed"
  Perform Is Rebalance Needed? (Is Rebalance Needed? must have
    access to all input data passed by the calling program.)
  Return to the calling program with Status = status returned by the
    called process and Optional Data Returned Flag = NO
ELSE
IF request is equal to "rebalance" or "rebalance if needed"
  Perform Is Rebal Needed
  IF "rebalance" or Status = YR
    Perform Rebalance Portfolio (Process defined in a separate document.
      The called process must have access to all data passed to this module
      and will create the output data if it is successful.)
```

-continued

```
    Return to the calling program with Status and Optional Data Returned
      Flag = values returned by the called process.
  ELSE
    Return to the calling program with Status = status returned by the
      called process and Optional Data Returned Flag = NO
  END_IF
ELSE
  Return to the calling program with Status = BR and Optional Data
    Returned Flag = NO.
END_IF
```

```
Is Rebal Needed?
Get Target Portfolio Allocation Rates
IF Use Muni Bonds For High Yield Bonds=yes
  or Use Muni Bonds For Long Term Bonds=yes
  or Use Muni Bonds For Intermediate Term Bonds=yes
  or Use Muni Bonds For Short Term Bonds=yes
  Perform Get Taxable Bond Class Allocations (defined in
Rebalance Portfolio)
  Perform Determine Taxable Bond Allocation (defined in
Rebalance Portfolio)
  Perform Switch Target Portfolio Allocations (defined in
Rebalance Portfolio)
END_IF
Develop Current Portfolio Amounts
Develop Target Portfolio Amounts
Develop Adjusted Target Amounts
Go through all Investment Assets.
IF at least one investment asset has a Repositionable Flag
of YES or MAYBE
```

```
Get Target Portfolio Allocation Rates
IF Use Muni Bonds For High Yield Bonds = yes
  or Use Muni Bonds For Long Term Bonds = yes
  or Use Muni Bonds For Intermediate Term Bonds = yes
  or Use Muni Bonds For Short Term Bonds = yes
  Perform Get Taxable Bond Class Allocations
  (defined in Rebalance Portfolio)
  Perform Determine Taxable Bond Allocation
  (defined in Rebalance Portfolio)
  Perform Switch Target Portfolio Allocations
  (defined in Rebalance Portfolio)
END_IF
Develop Current Portfolio Amounts
Develop Target Portfolio Amounts
Develop Adjusted Target Amounts
Go through all Investment Assets.
IF at least one investment asset has a Repositionable Flag of YES or
MAYBE
  IF PAS and periodic review
    Initialize Status to NR
    Locate each of the SAA sub-totals created in the Develop Current
      Portfolio Amounts and do the following:
      Locate the corresponding SAA target in the Adjusted Target Portfolio
      If the SAA amount in the current portfolio <
        [ (1 − m_SAAPeriodicVarianceMinus) * SAA
        adjusted target amount) ] rounded based on m_RoundingTo
        OR SAA amount in the current portfolio >
        [(1 + m_SAAPeriodicVariancePlus) *
        SAA adjusted target amount] rounded based on m_RoundingTo.
        Set Status to YR
      END_IF
    When all SAA amounts have been checked, return the Status
  ELSE
    Return Status = YR
  END_IF
ELSE
  Return Status = NR
END_IF
```

Get Target Portfolio Allocation Rates

```
IF Use Muni Bonds For High Yield Bonds = Yes
    or Use Muni Bonds For Long Term Bonds = Yes
    or Use Muni Bonds For Intermediate Term Bonds = Yes
    or Use Muni Bonds For Short Term Bonds = Yes
  set Tax Status = NT
ELSE
  set Tax Status = TX
END_IF
Call stored procedure Retrieve Target Portfolio to retrieve the allocations
  from the data base. Use the Portfolio Number, m_PortfolioTilt, tax
  bracket = HI, and tax status determined above as the key values
  passed to the stored procedure.
```

Develop Current Portfolio Amounts

```
For each input asset create/update a sub-asset class total for the portfolio for current amount and hold
amount:
  Zero current amount and hold amount accumulator fields for the asset.
  For asset class (a) associated with the asset for a=1 to a=n−1:
    Compute work asset amount = current amount (a) * asset class percent (a) rounded to the nearest
      100.
    Compute work hold amount = hold amount (a)/current amount (a) * asset class percent (a)
      rounded to the nearest 100.
    Current amount accumulator = current amount accumulator + work asset amount.
    Current hold amount accumulator = current hold amount accumulator + work hold amount.
    Locate asset class totals for asset class (a)
    IF total is found, add work asset amount to asset class total-current amount, add work hold amount
      to asset class total-hold amount
    ELSE
      create an asset class total area for asset class (a) with asset class total-current amount = work
        asset amount and asset class total-hold amount = work hold amount
    END_IF
  For asset class (a) associated with the asset for a=n:
    Work asset amount = current amount (a) − current amount accumulator.
    Work hold amount = hold amount (a) − current hold amount − hold amount accumulator.
    Locate asset class totals for asset class (a)
    IF total is found, add work asset amount to asset class total-current amount, add work hold amount
      to asset class total-hold amount
    ELSE
      create an asset class total area for asset class (a) with asset class total-current amount = work
        asset amount and asset class total-hold amount = work hold amount
    END_IF
Develop sub-total for higher level asset classes and SAA's:
  For each asset class total created, find the parent asset class.
    IF the parent class is not = IV, locate the sub-totals for this parent class
      IF the sub-totals are found, add the asset class total for the current amount and hold amount to
        the corresponding sub-total fields
      ELSE create the sub-total for the parent asset class with the sub-total amounts for current
        amount and hold amount equal to the values from the asset class total
      END_IF
      Keep going up the asset hierarchy for the current asset sub-total until the asset class with IV
        for the parent is located. Then go on to process the next asset class total.
    END_IF
```

Develop Target Portfolio Amounts

Go through each asset class in the target portfolio, provided as input, to identify all the parent classes up to the SAA level (SAA is the class for which the parent class is IV).

Get sub-total percentages for each SAA and sub-asset class grouping.

Work through the target portfolio, following the asset hierarchy from higher to lower levels, to develop target amounts for each category. (i.e. First level for which targets are calculated will be the SAA.)

For all entries within the level, except the last, target allocation amount=(target percentage/sum of the target percentages for the hierarchy grouping)*the allocation at the higher level of the asset hierarchy. Round the result to the nearest dollar or hundred dollar depending on the value of the input rounding parameter.

For the last item within a hierarchy grouping, the target allocation amount=(total amount for the category−the sum of the target allocation amounts for the other items within the category).

EXAMPLE

SAA allocations are 10% cash reserves, 80% bonds, 10% stocks. Bond allocations are 8% intermediate term, and 72% short term. The rounding parameter is round to the nearest $100. Total portfolio amount is $500,150.

SAA allocations:
Cash reserves=(0.1/1)*500,150=50,015 which rounds to 50,000
Bonds=(0.8/1)*500150=400,120 which rounds to 400,100
Stocks=500,150−(50,000+400,100)=50,050
Bond allocations:
Intermediate Term=(0.08/0.8)*400,100=40,010 which rounds to 40,000
Short Term=400,100−40,000=360,100
Develop Adjusted Target Amounts
Working from higher to lower levels within the asset hierarchy, determine adjusted target amount for each of the asset categories and sub-totals.
SAA Targets
Initialize adjustment needed to zero.
Repeat for each SAA within the target portfolio.

```
IF hold amount for the SAA in the current portfolio exceeds the target
    amount
    Adjusted target amount = hold amount for the class in the SAA.
    IF Produce Explanations = yes
        Record an explanation that target amount was adjusted due to
        non-repositionable assets.
    END_IF
    Add (hold amount for the class − target amount for the class) to
    adjustment needed.
ELSE
    Adjusted target amount for the class = target amount for the class
END_IF
Repeat for each SAA within the current portfolio:
IF class in the current portfolio is not in the target portfolio
    Add the class to the adjusted target portfolio. Adjusted target amount =
    hold amount from the current portfolio.
    IF Produce Explanations = yes
        Record an explanation that the target amount of zero was adjusted
        due to non-repositionable assets.
    END_IF
    Add the hold amount for the class to adjustment needed.
END_IF
```

If adjustment needed>0, spread among other asset classes at the same level of the hierarchy based on the ratio of the asset class to the other asset classes which can be adjusted. Set Explanation Recorded Flag to NO. Repeat the following process until adjustment needed=0:
Adjustment applied=0.
Get the sum of the percentages for all adjusted target portfolio SAA entries where the adjusted target amount is greater than the hold amount for the class. Repeat for all SAA entries in the target portfolio:

```
IF adjusted target amount > hold amount for the class
    Adjustment amount = (target % for the class/sum of percentages obtained
        earlier)* adjustment needed. The result is rounded to the nearest dollar
        or hundred dollars based on the rounding parameter.
    Adjustment remaining = (adjustment needed − adjustment applied)
    IF adjustment remaining < $100
        Adjustment amount = adjustment remaining
    END_IF
    IF adjustment amount > (adjusted target amount − hold amount for the
        class)
        adjustment amount = (adjusted target amount − hold amount for
        the class)
    END_IF
    Adjusted target amount = (adjusted target amount − adjustment amount)
    Add adjustment amount to adjustment applied.
    IF Explanation Recorded Flag = NO
        IF Produce Explanations = yes
            Record an explanation that the target was adjusted due to
            non-repositionable assets in another asset class.
        END_IF
    END_IF
END_IF
```

Adjustment needed=(adjustment needed−adjustment applied). Adjustment applied=0.
Explanation Recorded Flag=YES

EXAMPLE

|  | Target Amount | Non-Repo Asset Amount | Current Amount |
|---|---|---|---|
| Cash | 50,000 | 51,000 | 60,000 |
| Bonds | 400,100 | 0 | 50,000 |
| Stocks | 50,050 | 0 | 390,150 |

Adjusted cash target=51,000
Adjusted cash minimum=50,000
Adjusted cash maximum=52,500
Adjustment to spread=51,000−50,000=1,000
Bond adjustment=(0.8/0.9)*1,000=889 which rounds to 900
Stock adjustment=1000−900=100
Adjusted bond target=400,100−900=399,200
Adjusted bond minimum=391,200
Adjusted bond maximum=411,200
Adjusted stock target=50,050−100=49,950
Adjusted stock minimum=49,000
Adjusted stock maximum=51,400
Variance=current amount−adjusted target amount
Cash variance=60,000−51,000=+9,000
Bond variance=50,000−399,200=−349,200
Stock variance==390,150−49,950=+340,200
Non-Stock Sub-asset Categories
For SAA's other than stock,[3] continue working down the asset hierarchy to calculate the amounts for each asset class at that level in the same way as described for the SAA's. The amount to be allocated at each sub-level is the amount allocated at the prior level. The percentage weighting for each asset class within the group is the percentage assigned to that group divided by the sum of the percentages in the group.

[3]Stock investments are part of SAA ST.

Stock Sub-asset Categories

The allocations for the first level of the stock SAA is different than other SAA groups. The process to be done is as follows:

The allocation for the foreign stocks (S0 asset category) is the target amount calculated previously.

```
IF foreign target amount > adjusted target stock SAA amount
    S0 adjusted target allocation = adjusted target SAA amount
    IF Produce Explanations = yes
        Record an explanation that the foreign allocation was reduced due to
        non-repositionable assets in other asset classes.
    END_IF
END_IF
```

The intent is to try to allocate the entire desired foreign allocation, regardless of the other stock holdings.
US stock allocation=(adjusted stock SAA target amount−S0 adjusted target allocation)
IF (hold amount for stock SAA−hold amount for S0 asset class)>US stock allocation
    US stock allocation=(hold amount for stock SAA−hold amount for S0 asset class)
    S0 adjusted target allocation=(stock SAA adjusted target allocation−revised US stock allocation)
    IF Produce Explanations=yes2
        Record an explanation of the change to the foreign allocation.
    END_IF
END_IF
Within the foreign stock asset class, calculate the group breakdowns for lower asset levels in the same manner as described previously for the SAA's
For the US stocks group, determine the current non-repositionable amount in "other" US stocks. This would be the amount in any asset groups other than large US (asset class S2) and mid/small US (asset class S3). (The amount would currently be the amount of individual stock holdings. However, the process should not assume this to allow for other asset classes which Vanguard will not include in the target portfolio to be added to the hierarchy.)

Add this allocation amount to the adjusted target portfolio by copying the various asset groups which comprise it from the current portfolio. The allocation amount for each class within this group would be only the hold amount for the class.

IF the "other" stock allocation amount>0
   US target allocation amount=(US target allocation amount−"other" stock allocation−amount)
   IF Produce Explanations=yes
     Record an explanation that the US stock allocation was reduced due to non-repositionable holdings in other stocks.
   END_IF
END_IF The resulting US stock target allocation amount is the total to be split between the large US (S2) and mid/small US asset groups (S3). The allocation between these two groups should be done as previously described for the SAA and other asset groups.

Sub-class breakdowns for large US and mid/small US are done in the same manner as for other asset classes.

EXAMPLE 1

Stock SAA adjusted target allocation=$50,000
Stock SAA hold amount=$30,000
S0 target %=0.06
S0 hold amount=$3,000
Total portfolio value=$900,000
S1 (individual stocks) hold amount=$5,000
S0 adjusted target allocation=0.06*900000=54000
S0 adjusted target allocation is greater than the stock SAA target allocation, so S0 adjusted target allocation=50,000
   US stock allocation=(stock SAA adjusted target allocation−S0 adjusted target allocation)=(50000−50000)=0
   US stock allocation<(stock SAA hold amount of 30000−S0 hold amount of 3000), so the US stock allocation is changed to the difference between the two amounts, $27,000.
   S0 adjusted target allocation=(stock SAA adjusted target allocation−US stock allocation)=(50000−27000)=23000.

EXAMPLE 2

Stock SAA adjusted target allocation=$50,000
Stock SAA hold amount=$6,000
S0 target %=0.06
S0 hold amount=$3,000
Total portfolio value=$300,000
S1 (individual stocks) hold amount=$1,500
S2 (large US stocks) %=0.32
S2 hold amount=$1,500
S3 (mid/small US stocks) %=0.13
S0 adjusted target allocation=0.06*300000=18000
S0 adjusted target allocation is less than the stock SAA target allocation, so S0 adjusted target allocation is not changed.
   US stock allocation=(stock SAA adjusted target allocation−S0 adjusted target allocation)=(50000−18000)=32000
   US stock allocation>(stock SAA hold amount of 6000−S0 hold amount of 3000), so the US stock allocation is unchanged
   US stock allocation=(US stock allocation−"other" stock hold amount)=(32000−1500)=30,500
   Total group percent=S2%+S3%=0.32+0.13=0.45
   S2 adjusted target allocation=(S2%/total group %)*US stock allocation=(0.16/0.45)*30500=10844. Rounded to the nearest $100, S2 adjusted target allocation=10800.

S3 adjusted target allocation is the last allocation of the group, so S3 adjusted target allocation=(US stock allocation−S2 adjusted target allocation)=(30500−10800)=19700.

B. Rebalance Portfolio.doc—Auto Rebal Object—Rebalance Portfolio

Inputs

This module must have access to all input passed to the Auto Rebal Object. This data is defined in Auto Rebal Object-.doc.

Outputs

This module must be able to populate all data identified for the Auto Rebal Object. This data is defined in Auto Rebal Object.doc Main Flow Initialize Status to SR
Review all input assets
IF there is any maybe repositionable assets
   Develop Gain/Loss For Each Input Asset (Creates a gain and a loss amount for each input asset. These fields must be accessible by other routines.)
   Perform Determine How Much Of Each Current Asset To Sell And/Or Hold
END_IF
IF Status=SR
   Perform Determine How To Invest Proceeds From Asset Sales (defined in Determine Investments.doc)
END_IF
Return to the calling module with Status, Optional Data Returned Flag, and optional data fields populated by the called modules.

Develop Gain/Loss for each Input Asset

For each investment asset, determine a gain amount and a loss amount.

---

```
IF plan to which the asset belongs is tax exempt
  work cost = Current Amount
ELSE
  IF Cost Basis Flag = "not known"
    IF Estimate Tax Cost = Y
      Compute work cost = (Current Amount * Estimate Tax Cost Asset %).
      The result should be rounded to the nearest dollar or $100 based on
      m_RoundingTo.
    ELSE
      work cost = 0
    END_IF
  ELSE
    work cost = Cost Basis
  END_IF
END_IF
IF work cost < current asset value
  asset loss amount = 0
  asset gain amount = current asset value − work cost
ELSE
  IF work cost > current asset value
    asset gain amount = 0
    asset loss amount = work cost − current asset value
  ELSE
    asset gain amount = 0
    asset loss amount = 0
  END_IF
END_IF
```

---

Get Taxable Bond Class Allocations

This routine gets an alternate set of target portfolio allocations. This alternate set is the version which uses taxable bonds. This version is required since a client may not be using municipal bonds for all classes of bonds or may be buying bonds in a plan type which does not allow municipal bonds and will therefore need to allocate the bond purchase in the same manner as done for the taxable portfolio.

In these situations, the allocation for a bond class (short term, intermediate term, etc) would remain the same as in the municipal bond version of the portfolio. However, investments would be done using the taxable asset class. In some cases, this change will just be a switch of asset class code. In others, the taxable investment is split between multiple asset class codes (e.g. active and passive investments). In this situation, the class allocation will remain the same as in the municipal portfolio, but will be split in the same ratio as for the taxable allocations.

Use stored procedure Retrieve Target Portfolio to retrieve the alternate target portfolio percentages. Use Portfolio Number, m_PortfolioTilt, tax bracket=HI, and tax status=TX as the keys passed to the procedure. Store the returned asset class codes and associated percentages as an alternate target portfolio.

Determine Taxable Bond Allocation

This procedure determines the taxable allocation to be used for a municipal bond allocation in the target portfolio. This alternate allocation may be used for all investments in the bond class or for investments in the class when the tax exempt investment is not appropriate.

For each asset class in the target portfolio, do the following:
Match the asset class code from the target portfolio to the asset class codes in the Equivalent Asset Class Table.

```
For each asset class in the target portfolio, do the following:
  Match the asset class code from the target portfolio to the asset class
    codes in the Equivalent Asset Class Table.
  IF there is a match and the Tax Status for the matching table entry is
  NT (non-taxable)
    Look for the taxable alternate class in the Equivalent Asset Class Table,
      using the Asset Group from the matching entry and Tax Status of
      TX (taxable) as keys.
    IF a match is found
      Search for the Asset Class from the new matching entry in the alternate
        target portfolio
      If the Asset Class is in the alternate target portfolio, it is a substitution
        for the existing target portfolio asset class
        Create an entry in the Alternate Asset Class Table with the following
          values:
        Tax Exempt Bond Class = Asset Class from the target portfolio which
          started this process
        Amount Moved To Taxable Class = 0
        Alternate Class Count = 1
        One Alternate Class Array entry with the Asset Class = Asset
          Class from the new matching entry and Asset Percent = the percent
          for the Asset Class entry in the target portfolio
      ELSE
        Locate all child asset classes within the asset hierarchy for the Asset
          Class of the new matching entry.
        IF there are no child classes or any is marked as not included in
          rebalancing go on to check the next asset class entry in the target
          portfolio
        ELSE
          For each child class, do the following:
            Search for the child class in the alternate target portfolio.
            If the child class is in the alternate target portfolio
              IF first matching child
                Create an entry in the Alternate Asset Class Table with the
                  following values:
                Tax Exempt Bond Class = Asset Class from the target portfolio
                  which started this process
                Amount Moved To Taxable Class = 0
                Alternate Class Count = 1
                One Alternate Class Array entry with the Asset Class = Asset
                  Class from the new matching entry and Asset Percent = the
                  percent for the Asset Class entry in the alternate target
                  portfolio
              ELSE
                Update the existing entry in the Alternate Asset Class Table for the
                  Tax Exempt Bond Class = Asset Class from the target portfolio
                  which started this process. Do the following:
                  Add 1 to Alternate Class Count
                  Add an additional Alternate Class Array entry with the Asset
                    Class = child class and Asset Percent = the percent for the
                    child class entry in the alternate target portfolio
              END_IF
            ELSE
              Locate and children of the child class being processed in the asset
                hierarchy and add these additional children to the list of child asset
                classes to be checked.
            END_IF
          When all child classes have been checked,
          IF an Alternate Asset Class Table entry was created for the Asset Class
            from the target portfolio which originally started this process
            Adjust the Asset Percents for the entries in the Alternate Class Array
              by doing the following:
            Compute Percent Total = Sum the asset percents for all entries in the
              Alternate Class Array.
            Compute the adjusted Asset Percent for each entry = (Asset Percent/
              Percent Total) * percent for the Tax Exempt Bond Class in the target
              portfolio. Round the percents as needed. However, insure that
              the sum of the entries in the array = the percent for the
              Tax Exempt Bond Class in the target portfolio.
          ELSE
            go on to process the next asset class in the target portfolio
          END_IF
        END_IF
      END_IF
    ELSE
      go on to check the next asset class entry in the target portfolio
    END_IF
  ELSE
    go to check the next asset class in the target portfolio
  END_IF
```

Switch Target Portfolio Allocations

If the portfolio to be used for the client is the municipal bond version, but the client should not be using municipal bonds for a given bond class, this procedure will switch the target allocations to reflect the asset class codes and percentages from the taxable version of the portfolio.

```
For each asset class in the target portfolio, do the following:
  Search the Equivalent Asset Class table for a match on Asset Class and
    Tax Status of NT (non-taxable).
  IF a match is found
    Check the Use Municipal Bond For flag which corresponds to the Bond
      Term of the matching entry (e.g. IF the Bond Term is ST (short term),
      check the Use Municipal Bonds For Short Term Bonds flag.)
    IF there is a corresponding flag and the value is No
      Search the Alternate Asset Class Table for a match on the asset class
        from the target portfolio to the Tax Exempt Bond Class
      IF a match is found
        Delete the asset class entry from the target portfolio
        Add a new entry to the target portfolio for each entry in the Alternate
          Class Array of the matching Alternate Asset Class Table entry.
      ELSE
        go on to the next asset class in the target portfolio
      END_IF
    ELSE
      go on to the next asset class in the target portfolio
    END_IF
  ELSE
    go on to the next entry in the target portfolio
  END_IF
```

C. Determine Investments.doc—Auto Rebal Object—Determine how to Invest Proceeds from Asset Sales Constants Needed by Module Required Buy Variables—The count of variables which will always be present in a "buy" model. Current value is 5.

Required Buy Constraints—The count of constraint equations which will always be present in a "buy" model. Current value is 8.

Maximum Variables—The maximum number of variables which can be in the linear programming model with the current version of the LP processing engine. 16,000 for the industrial version of LINDO.

Maximum Constraints—The maximum number of constraint equations which can be in the linear programming model with the current version of the LP processing engine. 8,000 for the industrial version of LINDO.

Work Fields for Module

This section identifies major work fields which are used in multiple routines within this portion of the Auto Rebal Object.

Asset Class Buy Control Table—This table is used to collect information regarding how buys are to be handled for a given asset class. There will be a maximum of one entry for each asset class in the target portfolio for which there is at least one non-zero adjusted buy variable. Each entry will contain the following data elements:

Asset Class—The asset class from the target portfolio. This is the asset class for which buy variables are defined.

Taxable Buy Amount—The total adjusted buy amounts for the asset class in taxable plans.

Tax Deferred Buy Amount—The total adjusted buy amounts for the asset class in tax deferred plans.

Split Taxable Buy Flag—Yes/No flag to indicate whether the buys in taxable accounts should be split between multiple funds.

Split Tax Deferred Buy Flag—Yes/No flag to indicate whether the buys in tax deferred accounts should be split between multiple finds.

Taxable Preferred Fund Found Flag—Yes/No flag to indicate whether a preferred fund(s) was found for use in the taxable accounts.

Tax Deferred Preferred Fund Found Flag—Yes/No flag to indicate whether a preferred fund(s) was found for use in the tax deferred accounts.

Taxable Preferred Fund Count—The number of preferred funds for the asset class for use in taxable accounts.

Tax Deferred Preferred Fund Count—The number of preferred funds for the asset class for use in tax deferred accounts.

Buy Amount Work Fields—The following fields are used for processing the buys within an asset class. There are nine occurrences of each field, to allow an asset class investment to be split between a maximum of nine funds. There are separate fields for taxable and tax deferred accounts to allow for different ftnd splits in the different tax status accounts. For most portfolios/asset classes, the investment split is done in the same manner for both taxable and tax deferred funds. For these situations, only the taxable fields will be used.

Taxable Split Amount—The amount to be bought in taxable accounts for split fund # (n).

Taxable Split Rate—The allocation rate for taxable accounts for split fund # (n). Maximum value is 1.00. Format is 9.99.

Taxable Fund #—The VGI fund to be used for split fund # (n).

Taxable Fund Holdings—The total existing taxable holdings in split fund (n) which have not been repositioned.

Tax Deferred Split Amount—The amount to be bought in tax deferred accounts for split fund # (n).

Tax Deferred Split Rate—The allocation rate for taxable accounts for split fund # (n). Maximum value is 1.00. Format is 9.99.

Tax Deferred Fund #—The VGI fund to be used for split fund # (n).

Tax Deferred Fund Holdings—The total existing tax deferred holdings in split fund (n) which have not been repositioned.

Main Control

Execute Create Purchase Fund Lists

Execute Build Formulas for Buy Model

```
IF Status = SR
   Call LP processing engine with Model File as input
   IF LP processing engine status is successful
      Execute Determine Funds To Buy
      Execute Buy Fund Adjustments
      Execute Buy Cleanup
   END_IF
END_IF
```

Return to caller with status and output data.

Create Purchase Fund Lists

```
Get the preferred funds for the taxable plans.
Set up the data base keys to use:
   Business area will be based on the setting of m_BusinessArea
   Portfolio number will be the value from Portfolio Number
   Portfolio Tilt = value of m_PortfolioTilt
   Rank = preferred
   Bond Return Flag – set as follows:
      IF Use Muni Bonds For Long Term Bonds = yes or Use Muni Bonds
         for High Yield Bonds = Yes or Use Muni Bonds For
         Intermediate Term Bonds = Yes or Use Muni Bonds For Short
         Term Bonds = Yes
         Bond Return Flag = BO (both)
      ELSE
         Bond Return Flag = TX (taxable only)
      END_IF
   State = value from m_LegalResidenceState
Call stored procedure to Get Preferred and Alternate Funds
IF count of retrieved rows = 0
   IF Produce Explanation = yes
      Record the explanation "No preferred funds found for the portfolio"
   END_IF
ELSE
   For each row retrieved, perform Add A Fund List Entry
END_IF
```

Get the preferred funds for the tax deferred plans. (This only needs to be done when using the tax efficient portfolio.)

```
IF m_PortfolioTilt = TE (tax efficient)
   Set up the data base keys to use:
      Business area will be based on the setting of m_BusinessArea
      Portfolio number will be the value from Portfolio Number
      Portfolio Tilt = NO (core)
      Rank = preferred
      Bond Return Flag – set as follows:
         IF Use Muni Bonds For Long Term Bonds = yes or Use Muni
            Bonds for High Yield Bonds = Yes or Use Muni Bonds For
```

```
        Intermediate Term Bonds = Yes or Use Muni Bonds For Short
            Term Bonds = Yes
            Bond Return Flag = BO (both)
        ELSE
            Bond Return Flag = TX (taxable)
        END_IF
    State = value from m__LegalResidenceState
    Call stored procedure Get Preferred Funds
    IF count of retrieved entries = 0
        IF Produce Explanations = yes
            Record the explanation "No preferred funds found for the
            portfolio"
        END_IF
    ELSE
        For each row retrieved, perform Add A Fund List Entry
    END_IF
END_IF
```

Call the stored procedure to retrieve replacement funds. For each replacement fund, the fund id, VGI fund #, title, retail minimum, retirement minimum, and asset class breakdown will be returned. If the fund is not already in the set of purchase alternatives, add it. For new adds, the rank should be set to R, target asset class to spaces, split find number=0, and split find percent=1.00.

Add a Fund List Entry
Format an entry as follows:
Asset Class=Search Asset Class
Preferred/Alternate=Search Rank
Split Fund #=split fund # from the data base row
Split Fund Rate=investment rate from the data base row
VGI Fund Number=fund number from the data base row
IF Search Rank=Preferred
    IF m_PortfolioTilt=TE (tax efficient)
        Add the formatted entry to the Fund List For Tax Efficient Portfolio.
    ELSE
        Add the formatted entry to the Primary Fund List
    END_IF
ELSE
    Add the formatted entry to the Primary Fund List.
END_IF
Build Equations for Buy Model
Naming Conventions for Variables
C_xx—Current value of holdings in an asset class which are not being repositioned. xx is the asset class.

Bn_xx—An amount to be purchased in an asset class within a given plan. N is the plan # which identifies a specific plan. xx is the asset class.

H_xx—The total holdings in an asset class. This includes the current holdings in the asset class, plus any purchases in the asset class, plus the holdings in any child asset classes. xx is the asset class.

V_xx_M & V_xx_P—Plus and minus variances which, when added to and subtracted from the total holdings in the asset class, make the result equal to the target for that asset class. Two variables are used so that the variance amounts are always positive. Only one variance in a pair would be non-zero at a time. xx is the asset class.

assetvar—The sum of all V_xx_M and V_xx_P variables at the lowest level of the asset hierarchy.

SAAVar—The sum of the V_xx_M and V_xx_P variables for asset classes which are children of the IV class and are represented in the target portfolio (i.e. at least one of the target asset classes adds into the SAA asset class).

InterVar—The sum of the V_xx_M and V_xx_P variables for asset classes which are children of the SAA asset classes included in the SAAVar amount and are parents of other asset classes.

USStkVar—The sum of the V_xx_M and V_xx_P for the S2 and S3 asset classes. These asset classes make up the US stock amount for the target portfolio.

Bad_xx—The total purchases done for an asset class which are in plans which are not preferred selections for the asset class. The preferred plan is one that already has the asset class and is invested in the preferred or an alternate fund for that class. The "bad" plans are any plans which can purchase the asset class and don't own the preferred or alternate fund for the class. xx is the asset class.

AddPurch—The sum of the Bad_xx variables.

Create a sequential file to hold the equations for the model. This file will be referred to as Model File in the remainder of this section.

Write the following constant equations to Model File. These define the goal function and set up for the constraint equations which will follow.
    Min    assetvar+intervar+USstkvar+SAAvar+0.05addpurch subject to Create an additional purchase asset table to hold information on existing Vanguard accounts in preferred or alternate funds. Each entry should contain asset class code, taxable/non-taxable plan indicator, plan type, and to plan #. Go through the input assets and do the following:

---

IF asset class percent (1) for the asset = 100% (only want assets that are not balanced funds)
    and the fund is a Vanguard fund
    and current plan # is equal to Reposition To Plan # (only want assets that are in a
    destination plan)
    Locate asset class (1) in target portfolio (If the asset class for the asset is not included in
        rebalancing, find its first ancestor which is and use this class to check the target portfolio.
        This ancestor class would be the one added to the table if the class is in the target portfolio.)
    IF asset class is found in the target portfolio (Asset class would be considered in the portfolio if it
        is an exact match to a target portfolio asset class or the asset class matches an alternate asset
        class entry for a tax exempt bond class which is in the target portfolio.)
        IF the asset is in a VGI annuity
            or VGI fund # matches a preferred or alternate fund #[1]
            Add the information for the asset to the table. (For alternate asset classes where the
            alternate classes are children of the class which is the taxable alternate to a non- -continued taxable class, put the parent class, not the children into the list of classes to be purchased.)
      END__IF
   END_IF
END__IF

[1]Either the Primary Fund List or Fund List For Tax Efficient Portfolio should be searched. Do the following to determine which list of funds to check for preferred or alternate funds:
IF m__PortfolioTilt = T (tax efficient) and the Plan is tax-deferred
   use the Fund List For Tax Efficient Portfolio
ELSE
   use the Primary Fund List
END__IF Create a table of accumulators for hold amounts and adjusted target amounts for each asset class included in rebalancing. Each table entry should have an asset class code, an adjusted target amount, and a hold amount There should be one entry for each asset class code in the asset hierarchy, including all summary classes (IV included). The hold and adjusted target amounts should all be initialized to zero.

Go through all input assets and add the hold amounts to the hold amounts in the table just created.

```
IF hold amount for the input asset > 0
   Hold amount used = 0
   For asset class (a) associated with the input asset for a=1 to a=n-1:
      Compute work hold amount = hold amount (a) * asset class percent
         (a). The result is rounded to the nearest $100 or $1 depending on
         m__RoundingTo.
      Locate asset class (a) in the accumulator table.
      IF asset class (a) is found in the table
         Add work hold amount to the hold amount for the corresponding
         table entry
      ELSE
         Locate asset class = IV in the accumulator table
         Add work hold amount to the hold amount for the blank asset class
         table entry
      END__IF
      Add work hold amount to hold amount used.
   For asset class (a) associated with the input asset for a=n:
      Compute work hold amount = hold amount (a) − hold amount used.
      Locate asset class (a) in the accumulator table.
      IF asset class (a) is found in the table
         Add work hold amount to the hold amount for the corresponding
         table entry
      ELSE
         Locate asset class = IV in the accumulator table
         Add work hold amount to the hold amount for the IV table entry
      END__IF
END__IF
```

Summarize hold amounts in the table entries for all asset classes which are not included in rebalancing. Store summarized amounts at the first ancestor which is included in rebalancing.

Develop the adjusted target amounts for each level of the asset hierarchy and update the table of adjusted target amounts.

Start at the bottom level of the hierarchy. If the asset class is not included in rebalancing, the target amount is zero. If the asset class is included in rebalancing and it is in the adjusted target portfolio, the target amount from the target portfolio is the target amount for the asset class. If the asset class is included in rebalancing but is not in the adjusted target portfolio, the target amount is zero.

For each level above the lowest level at which rebalancing begins, the adjusted target amount is the sum of the child asset class adjusted target amounts, plus any hold amount for that class. Work up the hierarchy until adjusted targets have been developed for all classes, up to IV. For the IV class, the adjusted target amount is the total portfolio value.

For each entry in the accumulator table which is included in rebalancing, write an equation to Model File to identify the amount held in each asset class. This is the amount which is not being repositioned. Format the equation as C_xx=hold amount for the table entry (where xx is the asset class for the table entry)

Create a plan accumulator table with an entry for each destination plan in the current portfolio that has reposition to field equal to within plan. Each entry should contain a Plan # (multiple input plans may go to a single destination plan) and a buy amount. All the buy amounts should be initialized to zero.

For each input asset, do the following:
   Compute work buy amount=(current value of the input asset−hold amount for the input asset)
   IF work buy amount>0
      Locate the Plan # in the plan accumulator table[2].
         [2]IF the asset belongs to a plan which has Reposition To Plan="new plan", use the Reposition To Plan # to search the Plan Accumulator Table; otherwise, use the Plan #.
      Add work buy amount to buy amount in the corresponding table entry.
   END_IF Determine whether the number of equations needed for the model will be too large for LP processing engine.

Determine Asset Class Count, the number of asset classes in the asset hierarchy which are included in rebalancing.

Determine Target Portfolio Asset Class Count, the number of lowest level asset classes in the target portfolio.

Compute Estimated Variables, the estimated the number of variables in the model, as the sum of the following:
      4 * Asset Class Count
      Target Portfolio Asset Class Count*count of plans with buy amount>0 and non-restricted investment options.
      For each plan with restricted investment options, the number of investment options in the plan.
      Sum of the number of alternate asset classes defined in all entries of the Alternate Class Array within the Alternate Asset Table*Number of non-taxable plans with buy amount>0
      Target Portfolio Asset Class Count
      Required Buy Variables Compute Estimated Constraints, the estimated number of constraints in the model, as the sum of the following:
Number of plans with buy amount>0
3 * Asset Class Count
Target Portfolio Asset Class Count
Required Buy Constraints
# of entries in the Alternate Asset Table
4 if there is one or more annuity plans with a buy amount>0
1 if there is at least one Roth plan with a buy amount>0
1 if there is at least one taxable plan with a buy amount>0
IF Estimated Variables>=Maximum Variables
or Estimated Constraints>=Maximum Constraints
Set Status to BE and exit from this routine
END_IF
Identify which asset classes should be used for purchases to achieve the desired preferred investments in the plan type. Since advice is given only on purchasing Vanguard funds, a list of asset classes to be used will be developed for Roth IRA's, annuities, and taxable accounts.
Total Roth Purchases=0
Total Annuity Purchases=0
Total Taxable Purchases=0
Create a set of work variances from the adjusted target portfolio variances. Each variance included in the work variances should consist of the asset class and associated variance amount. A variance should only be included in the work variances if it is for one of the lowest level asset classes and the variance is negative (i.e. the class is under weighted). The work variance amount should be an unsigned amount.
Locate all plans in the plan accumulator table which have a plan type of Roth, VGI annuity, or are taxable. Add the buy amount from the table entry to the appropriate total purchases accumulator created above.
Using the Roth purchase hierarchy to define the order in which variances are evaluated, go through the list of work variances to determine the asset classes which should be used for purchases in Roth plans. Continue through the hierarchy until Total Roth Purchases amount is equal to zero. Keep track of the classes to be purchased in the Roth plan(s) and the amount to be purchased in the class.

---

If the asset class in the hierarchy is found in the target portfolio and the work variance amount > 0
  Search the Alternate Asset Class Table for a match on the asset class in the hierarchy to Tax Exempt Bond Class
  IF the asset class has a match on Tax Exempt Bond Class
    Add each of the asset classes in the Alternate Class Array to the list of asset classes to be used for Roth accounts
    Add work variance amount to Amount Moved To Taxable Class in the matching Alternate Asset Class Table entry
  ELSE
    Add the asset class to the list of asset classes to be used for Roth accounts
  END_IF
  IF Total Roth Purchases >= work variance amount
    Subtract work variance amount from Total Roth Purchases.
    Move zero to work variance amount.
  ELSE
    Subtract Total Roth Purchases from work variance amount.
    Move zero to Total Roth Purchases.
  END_IF
ELSE
  Go on with the next asset class in the purchase hierarchy.
END_IF

---

Repeat this same process for annuities and taxable accounts using the purchase amounts for those classes and creating a separate list of asset classes for each of the different types. On the taxable accounts, there would be no switch from a tax exempt asset class to a taxable asset class as is described for the Roth plan. This switch to taxable asset classes would occur for the annuity.
The asset classes for non-zero work variances that remain will be allocated to tax deferred plans (retirement accounts). Replace any tax exempt asset classes with the alternate class. Do the following:
Go through the table of work variances. For each variance entry with a variance amount>0, search the Alternate Asset Class Table for a match on the asset class for the variance to the Tax Exempt Bond Class.
IF there is a matching entry in the Alternate Asset Class Table
Add the work variance amount to the Amount Moved To Taxable Class
Move zero to work variance amount
Add a new entry to the work variance table for each Asset Class in the Alternate Class Array. The work variance amount for these entries should be set to 1. (Variance amount does not matter as long as it is greater than zero so that the class will be included for purchases.)
ELSE
go on to the next variance entry in the table
END_IF
Build equations to identify the amount to be purchased in each asset class within a plan and limit these purchases to the amount available to spend within each plan. Assume that a purchase can be done in any of the lowest level asset classes within the target portfolio (not the adjusted target). Do the following for each plan in the plan accumulator table:
IF buy amount for the plan>0
IF plan investment options are not restricted
Create an equation formatted as $Bpid\_xx1+Bpid\_xx2+Bpid\_xx\ldots=$buy amount (where pid is the plan # and xx is a detail asset class. For Roth and taxable accounts, use the list of asset classes previously identified to be used for purchases in that account type. For other account types, use all work variance asset classes for which the corresponding work variance amount is >0. There should be one entry for each of the asset classes within the list to be used for the plan type or that is a lowest level asset class in the target portfolio.)
ELSE
Create an equation formatted as
$Bpid\_xx1+Bpid\_xx2+Bpid\_xx \ldots +Bpid\_M\_nn1+Bpid\_M\_nn2+Bpid\_M\_nn \ldots =$buy amount (where pid is the plan #, xx is a detail asset class from the investments available to the plan, and nn is a restricted asset #. There should be one entry of the format Bpid_xx for each of the unique investment alternatives available to the plan which has a 100% allocation to an asset class and is an asset class that is included in rebalancing. If the asset class is not included in rebalancing, go up the asset hierarchy until an ancestor is located that is included in rebalancing; include this ancestor asset class in the formula. If there are two choices in the plan for an asset class, the asset class should be included in the equation only once. There should be one entry of the format Bpid_M_nn for each investment alternative in the plan where the asset class allocation is split between multiple classes. Do not include a multi-class fund in the formula if all the classes which comprise it are represented by single class fund alternatives.)
END_IF
Write the equation to Model File.
END_IF
If a class allocated to the Roth or taxable plans would appear in another type of plan and there is more than one asset class available to the plan, build a formula to require purchasing the amount allocated to the particular plan type. There would be at least one formula for each class that spans multiple plan types. Format the formula as Bpid_xx+Bpid_xx . . . +Bpid_xx=a where Bpid_xx is a plan buy of the asset class for each of the plans of the type in which the amount should be controlled and a is the amount which should be purchased in the asset class within that plan type.

EXAMPLE 1

Plans 1 and 2 are Roth plans, plan 3 is a taxable plan, and plan 4 is an IRA. Asset classes have been split between the plans as follows:
Roth—SQ $100, SK $300
taxable—SK $100, SW $400
other—SW—$100, BC $500
Formulas to enforce the desired purchases would be:
B1_SK+B2_SK=300
B3_SK=100
B3_SW=400

EXAMPLE 2

Plans 1 and 2 are Roth plans, plan 3 is a taxable plan, and plan 4 is an IRA. Asset classes have been split between the plans as follows:
Roth—SQ $100,
taxable—SW $100
other—SW $300, SX $200

No control formulas would be needed since the Roth and taxable plan types are only buying in a single asset class.

Annuity plans have restricted asset selections, so it is more difficult to control which classes are purchased in these plans. Formulas are needed to control the type of assets (type of assets) purchased in these plans, with the LP engine controlling the actual asset class selection from those available to the plan based on getting as close as possible to the targets.

Based on the asset classes and amounts which should be purchased in the annuity plan(s), determine the amount to be purchased in each of the SAA categories (stocks, bonds, and cash).

For each of these categories which is greater than zero, determine which asset class choices for the plan are descendants of the SAA. (A balanced fund may have portions in multiple SAA's.) For each of these categories which is greater than zero and for which selections were identified, build a formula formatted as Bpid1_xx1+Bpid1_xx2+ . . . Bpid1_xxn+Bpid-n_xx1+ . . . Bpidn_xxn+% Bpid1_M_1+ . . . % Bpid1_M_n+% Bpidn_M_1+ . . . Bpidn_M_n=Y (where pid1 . . . n represents the plan number for each annuity plan, xx1 . . . n represents each asset class purchased in an annuity plan which is a descendant of the category, and % Bpidn_M_1 . . . n represents a balanced asset for which part of the asset adds to the category. A balanced fund would only be included if part of it adds to the category and it was included in the original purchase formula for the plan. The % represents the portion of the asset which belongs in the category. Y=the total amount to be purchased in the annuity plans for the category.)

Adjust the adjusted target amounts developed for all asset classes within the hierarchy. Do the following for each entry in the Alternate Asset Class Table which has an Amount Moved To Taxable Class>0:

Locate the Tax Exempt Bond Class in the table of asset classes and adjusted targets. Subtract Amount Moved To Taxable Class from the adjusted target amount.

```
IF the Alternate Class Count in the Alternate Asset Class Table entry is 1
    Locate the Asset Class for the one entry in the Alternate Class Array within the table of asset
        classes and adjusted targets.
    Add the Amount Moved To Taxable Class to the adjusted target amount
    Go on to process the next entry in the Alternate Asset Class Table
ELSE
    Desired Total Allocation = Amount Moved To Taxable Class
    Set Amount Applied = 0
    Set Adjustment Needed = 0
    Add the Hold Amount for all asset class entries in the Alternate Asset Array to the Desired Total
        Allocation
    Compute Maintain Percent = sum of the Asset Class Percents for all entries in the Alternate Asset
        Array
    Repeat the following process until Desired Total Allocation = 0
        For each Alternate Asset Array entry
            Compute Adjustment Amount = [(Asset Class Percent/Maintain Percent) * Desired
                Total Allocation]. Round the amount based on m_RoundingTo.
            IF Adjustment Amount > (Desired Total Allocation – Amount Applied)
                Adjustment Amount = (Desired Total Allocation – Amount Applied)
            END_IF
            Add Adjustment Amount to Amount Applied
            IF Adjustment Amount < Hold Amount for the asset class
                Compute Adjustment Needed = Adjustment Needed + (Hold Amount – Adjustment
                    Amount)
                Adjustment Amount = Hold Amount
            END_IF
```

-continued

```
    Locate Asset Class from the Alternate Asset Array entry in the table of asset classes and
        adjusted target amounts. Add Adjustment Amount to the adjusted target amount.
    Subtract Amount Applied from Desired Total Allocation
    Amount Applied = 0
END__LOOP
IF Adjustment Needed > 0
  Set Amount Applied = 0
  Repeat the following process until Adjustment Needed = 0
    For each Alternate Asset Array entry with Hold Amount < Adjusted Target Amount
      Compute Adjustment Amount = [(Asset Class Percent/Maintain Percent) *
        Adjustment Needed]. Round the amount based on m__RoundingTo.
      IF Adjustment Amount > (Adjustment Needed − Amount Applied)
        Adjustment Amount = (Adjustment Needed − Amount Applied)
      END__IF
      Locate Asset Class from the Alternate Asset Array entry in the table of asset classes
        and adjusted target amounts.
      IF (Adjusted Target Amount − Hold Amount) < Adjustment Amount
        Adjustment Amount = (Adjusted Target Amount −Hold Amount)
      END__IF
      Subtract Adjustment Amount from Adjusted Target Amount
      Add Adjustment Amount to Amount Applied
    Subtract Amount Applied from Adjustment Needed
    Amount Applied = 0
  END__LOOP
END__IF
Go on to process the next entry in the Alternate Asset Class Table
END__IF
```

Go through the asset hierarchy from top to bottom to build variance equations which limit the current holdings in an asset class, plus any buys in the asset class, to the adjusted target amount. Start at the IV level and do the following:
Identify all asset classes that are direct children of the current asset class.
IF current asset class=IV
   work target amount=total portfolio value
ELSE
   Locate the asset class in the table of asset classes and adjusted target amounts.
   IF the asset class is found
      work target amount=adjusted target amount for the asset class
   ELSE
      work target amount=0
   END_IF
END_IF
If the asset class should be included in rebalancing, create an equation to get current holdings, holdings in child asset classes, and purchases to a single variable for the asset class. The equation should be formatted as
$C\_xx + H\_yy1 + H\_yy2 + H\_yy \ldots + Bpid1\_xx1 + Bpid2\_xx + Bpid \ldots \_xx + aBpid1\_M\_m1 + aBpid1\_M\_nn2 + aBpid \ldots \_M\_nn \ldots - H\_xx = 0$
(Where xx is the current asset class and yy is each of the asset classes which are direct children to the current asset class. Pid is a plan #. a is the allocation for the asset class participation in a "balanced fund" and nn is a restricted asset #. There should be one purchase of the format Bpid xx for each plan with a buy amount greater than zero in which the current asset class can be purchased. For Roth, VGI annuities, and taxable accounts, use the list of asset classes to be used for the plan type to determine whether there can be a purchase for the plan. For all other account types, if the the account type does not have restricted funds, the current asset class must be a work variance asset class for which the corresponding work variance amount is >0. If the account type does have restricted funds, the current asset class must be in the list of available investments as an asset class that is a 100% component of the investment choice or be an ancestor of an investment which is allocated 100% to an asset class which is a descendant of the current asset class and is not included in rebalancing. For such an asset class, the current asset class must be the first ancestor which is included in rebalancing. There should be one or more purchases of the format aBpid_M_nn for each restricted investment plan with a buy amount>0 and at least one asset comprised of multiple asset classes which has the current asset class as one of the component classes. There would be a separate entry for each of the multi-class assets in the plan which contains the current asset class. The allocation amount, a, would be the allocation within the asset that asset class contributes to the total investment choice-e.g. . 1 for 10%. If a class within the allocation is not included in rebalancing, search up through the classes ancestors in the hierarchy until a class that is included in rebalancing is located.)
IF current asset class=IV
   Create an equation formatted as H_xx=work target amount (where xx=the current asset class)
   Write the equation to Model File
ELSE
   Create an equation formatted as $H\_xx + V\_xx\_M - V\_xx\_P = $ work target amount (where xx=the current asset class)
   Write the equation to Model File
END_IF
Create an equation to get a single variance amount for all of the detail level variances which must be minimized. This equation should only contain asset classes in which purchases can occur—i.e. asset classes from the target portfolio.
Identify all lowest level asset classes within the target portfolio (not adjusted target).

Create an equation formatted as $V\_xx1\_M+V\_xx1\_P+V\_xx2\_M+V\_xx2\_P+V\_xx \ldots \_M+V\_xx \ldots \_P-assetvar=0$ (Where xx is a detail asset class. There should be one set of minus and plus variances for each of the lowest level asset classes within the target portfolio or which is an alternate to a non-taxable asset class within the target portfolio which was used for a purchase in a plan)

Write the equation to Model File.

Create an equation to get a single variance amount for all of the SAA variances which must be minimized. Do the following:

Locate all direct children of the IV asset class.

Create an equation formatted as $V\_xx1\_M+V\_xx1\_P+V\_xx2\_M+V\_xx2\_P+V\_xx \ldots \_M+V\_xx \ldots \_P-SAAvar=0$ (Where xx is an asset class that is a child of IV. There should be one set of minus and plus variances for each of the SAA asset classes within the target portfolio.)

Write the equation to Model File.

Create an equation to get a single variance amount for all of the intermediate variances which must be minimized. This set of variances is for the level directly below the SAA's. Do the following:

For each of the asset classes identified as SAA's in the target portfolio in the previous equation, locate the asset classes which are direct children of these classes.

Determine which of these children asset classes is in the target portfolio. That is, at least one of the lowest level asset classes summarizes to the asset class. If the asset class itself is a detail entry (e.g. the level below cash are detail entries), the asset class would not be selected for inclusion in the equation.

Create an equation formatted as $V\_xx1\_M+V\_xx1\_P+V\_xx2\_M+V\_xx2\_P+V\_xx \ldots \_M+V\_xx \ldots \_P-intervar=0$ (Where xx is an asset class that is a child of an SAA and is in the target portfolio as a summary class, not a lowest level entry. There should be one set of minus and plus variances for each of the selected asset classes.)

Write the equation to Model File.

Create an equation for the US stock variance amounts which must be minimized. Do the following:

Identify all asset classes in the asset hierarchy which are direct children of asset class SA.

Determine which of these children asset classes is in the target portfolio. That is, at least one of the lowest level asset classes summarizes to the asset class. If the asset class itself is a detail entry (e.g. the level below cash are detail entries), the asset class would not be selected for inclusion in the equation.

Create an equation formatted as $V\_xx1\_M+V\_xx1\_P+V\_xx2\_M+V\_xx2\_P+V\_xx \ldots \_M+V\_xx \ldots \_P-USstkvar=0$ (Where xx is an asset class that is a child of an SAA and is in the target portfolio as a summary class, not a lowest level entry. There should be one set of minus and plus variances for each of the selected asset classes)

Write the equation to Model File.

Remove entries from the additional purchases asset table if there is no money to spend in the plan. Go through each asset in the additional purchases asset table and do the following:

Locate the plan # in the plan accumulator table.

IF the buy amount=0

Delete the asset from the additional purchases asset table

END_IF

Remove entries from the additional purchases table if the asset class should not be used for the plan. For each entry in the additional purchase asset table, do the following:

IF the plan is a Roth or VGI annuity or the account type is taxable

IF the asset class is not in the list of asset types to be used for the plan

Delete the entry from the table

END_IF

ELSE

IF the asset class in the table entry is not in the list of work variance asset classes with a corresponding work variance amount greater than zero Delete the entry from the table

END_IF

END_IF

Create equations to encourage purchases in registrations which already contain preferred or alternate funds in asset classes for which purchases may be done.

Sort the additional purchase asset table by plan # within asset class.

For each unique asset class in the table, do the following:

Create a equation to encourage purchases in the plan which has an account in the asset class. Format the equation as $Bpid1\_xx+Bpid2\_xx+Bpid \ldots \_xx-bad\_x=0$ (where pid is the plan # for each plan in the plan accumulator table which has a buy amount>0, a purchase for the asset class can be done in the plan, and and there is no entry in the additional purchase asset table for the asset class being processed. xx is the asset class being processed. A plan can purchase in an asset class if the plan is a Roth, VGI annuity, or taxable account and the asset class is included in the list of asset classes to be used for the plan. For other plan types (non-taxable accounts), any asset class in the additional purchase asset table could be purchased)

Write the equation to Model File

Create an equation to summarize the "bad" purchase choices to a single variable. Format the equation as $bad\_xx1+bad\_xx2+bad\_xx \ldots -addpurch=0$ (Where xx1 is an asset class. There should be one entry for each unique asset class in the additional purchase asset table.)

Write the equation to Model File

Write the following statement to Model File:

END

Close Model File

Return to caller with successful completion status.

Determine Funds to Buy

For each plan that has a buy amount>0, go through the output from LP processing engine and locate all the associated buy variables for that plan (Bpid_xx—where pid is the plan # and xx is an asset class to be purchased or Bpid_M_nn- where pid is the plan # and nn represents a specific asset available to the plan.) Do the following:

Adjust the non-zero buy variables for the plan.

Round all non-zero buy variables for the plan, except the last, up or down based on m_Rounding To.

For the last non-zero buy variable for the plan, set the variable=(buy amount for the plan−the sum of all the rounded buy variables for the plan).

Perform Build Asset Class Buy Control Table

Go through each entry in the Asset Class Buy Control Table and do the following:
Perform Update Control Table With Fund Info
Perform Total Buy Amounts For The Asset Class
Go through all of the adjusted buy variables. Select variables with a name format of Bpid_xx (where pid is the plan # and xx is the asset class), the asset class matches asset class for the Asset Class Buy Control Table entry being processed, and the adjusted variable amount>0. For each selected variable, do the following:
IF (m_PortfolioTilt=TE (tax efficient) and plan # is for a tax deferred plan
Perform Tax Efficient Tax Deferred Preferred Fund Additional Purchase
ELSE
Perform General Preferred Fund Additional Purchase
END_IF
Go through all of the adjusted buy variables. Select variables with a name format of Bpid_xx (where pid is the plan # and xx is the asset class), the asset class matches asset class for the Asset Class Buy Control Table entry being processed, and the adjusted variable amount>0. For each selected variable, do the following:
IF (m_PortfolioTilt=TE (tax efficient) and plan # is for a tax deferred plan
Perform Tax Efficient Tax Deferred Alternate Fund Additional Purchase
ELSE
Perform General Alternate Fund Additional Purchase
END_IF
Go through all of the adjusted buy variables. Select variables with a name format of Bpid_xx (where pid is the plan # and xx is the asset class), the asset class matches asset class for the Asset Class Buy Control Table entry being processed, and the adjusted variable amount>0. For each selected variable, do the following:
IF (m_PortfolioTilt=TE (tax efficient) and plan # is for a tax deferred plan
Perform Tax Efficient Tax Deferred Asset Class Buys
ELSE
Perform General Asset Class Buys
END_IF
Go through all adjusted buy variables. For each specific fund variable (nameformat is Bpid_M_nn) where adjusted variable amount>0, do the following:
Set preferred fund number to use to the fund number value for asset nn in the restricted fund list for the plan
IF the fund number for asset nn is NULL (fund is not a Vanguard fund)
set preferred fund title to use to the title value for asset nn in the restricted fund list for the plan
ELSE
Locate preferred fund number to use in the Vanguard Fund List
IF the fund is found
set preferred fund title to use to the title for the matching entry in the Vanguard Fund List
ELSE
set preferred fund title to use to nulls
END_IF
END_IF
Go through the output Investments to determine if the preferred fund already exists in the plan. If fund number is not null, use that as the match criteria; otherwise, use fund title.
IF the preferred fund to use is already owned by the plan
Add the buy amount from adjusted buy variable to the Buy Amount for the output asset
Add the buy amount from adjusted buy variable to the Proposed Amount for the output asset
Move zero to the buy amount for the adjusted buy variable
ELSE
Plan #=pid from the buy variable name
Work asset class breakdown=asset class breakdown for asset nn (from the buy variable name) in the restricted fund list for plan #=pid from the buy variable name
Work buy amount=adjusted variable amount
Perform Add Fund To Output Assets
Adjusted variable amount=0
END_IF
Build Asset Class Buy Control Table
Go through all adjusted buy variables and develop a list of unique asset classes for which a purchase is to be done. For each asset class in the list, do the following:
Initialize the table entry fields:
Asset Class=current asset class from the list of buys
All amounts and counts for the entry=0
All flags for the entry=NO
Add the formatted entry to the Asset Class Buy Control Table
Update Control Table with Fund Info
Zero all occurrences of the Buy Amount Work Fields
Locate taxable funds for the asset class
IF m_PortfolioTilt=TE (tax efficient)
use Fund List For Tax Efficient Portfolio
ELSE
use Primary Fund List
END_IF
Search the fund list determined above to locate all entries with asset class=Asset Class and preferred/alternate flag=P
For each entry found, update the appropriate taxable split fields as follows:
IF Split Fund # for the returned entry=0
Set indx=1
ELSE
Set indx=Split Fund # for the returned entry
END_IF
Taxable Fund # (indx)=VGI Fund Number for the returned entry
Taxable Split Rate (indx)=Split Rate for the returned entry
IF number of entries returned>0
Set Taxable Preferred Fund Found Flag to YES
Set Taxable Preferred Fund Count=number of entries returned
IF number of entries returned>1
Set Split Taxable Buy Flag to YES
END_IF
END_IF
Locate tax exempt funds for the asset class. This is not done for all asset classes, only when taxable and tax exempt fund choices are different.
IF m_PortfolioTilt=TE (tax efficient)
Search the Primary Fund List to locate all entries with asset class Asset Class and preferred/alternate flag=P For each entry found, update the appropriate taxable split fields as follows:

```
IF Split Fund # for the returned entry = 0
    Set indx = 1
ELSE
    Set indx = Split Fund # for the returned entry
END_IF
Tax Exempt Fund # (indx) = VGI Fund Number for the returned
    entry
Tax Exempt Split Rate (indx) = Split Rate for the returned entry
IF number of entries returned > 0
    Set Tax Exempt Preferred Fund Found Flag to YES
    Set Tax Exempt Preferred Fund Count = number of entries returned
    IF number of entries returned > 1
        Set Split Tax Exempt Buy Flag to YES
```

-continued

```
        END_IF
    END_IF
END_IF
```

Total Buy Amounts for the Asset Class

Go through all adjusted buy variables with names formatted as Bpid_xx (where pid is the plan # and xx is the asset class). For each variable in which the asset class=Asset Class on the Asset Class Buy Control Table entry being processed, accumulate the adjusted buy amounts. (Amounts are only split between taxable and tax deferred if the investment choices are different. Otherwise, amounts are accumulated in the taxable field.)

Locate the output Investment Plan entry for the plan # (pid).

IF m_PortfolioTilt=TE (tax efficient)

```
    IF the plan is a taxable plan
        Add the adjusted buy amount to Taxable Buy Amount for the Asset Glass Buy Control Table
            Entry
    ELSE
        Add the adjusted buy amount to Tax Deferred Buy Amount for the Asset Class Buy Control
            Table Entry
    END_IF
ELSE
    Add the adjusted buy amount to Taxable Buy Amount for the Asset Class Buy Control Table
        Entry
END_IF
IF Taxable Preferred Fund Found Flag = yes
    IF Split Taxable Buy Flag for the Asset Class Buy Control Table entry = no
        Taxable Split Amount (1) = Taxable Buy Amount for the table entry
    ELSE
        Perform Determine Taxable Split Amounts For The Asset Class
    END_IF
ELSE
    Taxable Split Amount (1) = Taxable Buy Amount for the table entry
    Taxable Split Rate = 1.00
END_IF
IF m_PortfolioTilt = TE (tax efficient)
    (when taxable and tax deferred buys can be different, determine split amounts based on tax status
        for the plan)
    IF Tax Deferred Preferred Fund Flag = Yes
        IF Split Tax Deferred Buy Flag for the Asset Class Buy Control Table entry = NO
            Tax Deferred Split Amount (1) = Tax Deferred Buy Amount for the table entry
        ELSE
            Perform Determine Tax Deferred Split Amounts For The Asset Class
        END_IF
    ELSE
        Tax Deferred Split Amount (1) = Tax Deferred Buy Amount for the table entry
        Tax Deferred Split Rate (1) = 1.00
    END_IF
END_IF
```

Determine Taxable Split Amounts for the Asset Class

```
For each non-zero Taxable Fund # in the Buy Amount Work Fields (indx = 1 to indx = 9), do the
    following:
    Go through all output Investment Assets
        IF VGI Fund # for the Investment Asset matches the Taxable Fund # (indx)
            Add Hold Amount for the Investment Asset to Taxable Fund Holdings (indx)
        END_IF
    Get Total Taxable Amount = [Taxable Buy Amount from the Asset Class Buy Control Table + sum of
        Taxable Fund Holdings (indx=1 to indx=9)]
    Adjustment Needed = 0
    Applied Amount = 0
    Processed Count = 0
```

-continued

```
Go through all taxable Buy Amount Work Fields (indx = 1 to indx = 9). For each entry, do the following:
    IF Processed Count < (Taxable Preferred Fund Count − 1)
        Taxable Split Amount (indx) = [Total Taxable Amount * Taxable Split Rate(indx)]. Round the
            result based on m_RoundingTo.
        Add Taxable Split Amount (indx) to Applied Amount
        IF Taxable Split Amount (indx) < Taxable Fund Holdings (indx)
            Adjustment Needed = {Adjustment Needed + [Taxable Fund Holdings (indx) − Taxable Split
                Amount (indx)]}
            Taxable Split Amount (indx) = [Taxable Fund Holdings (indx) − Taxable Split Amount
                (indx)]
        END_IF
    ELSE
        Taxable Split Amount (indx) = [Total Taxable Amount − Applied Amount]
        IF Taxable Split Amount (indx) < Taxable Fund Holdings (indx)
            Adjustment Needed = {Adjuslment Needed + [Taxable Fund Holdings (indx) − Taxable Split
                Amount (indx)]}
            Taxable Split Amount (indx) = [Taxable Fund Holdings (indx) − Taxable Split Amount
                (indx)]
        END_IF
    END_IF
IF Adjustment Needed > 0
    Total Adjustable Rate = 0
    Go through all taxable Buy Amount Work Fields (indx =1 to indx = 9)
    IF Taxable Split Amount (indx) > Taxable Fund Holdings (indx)
        Add Taxable Split Rate (indx) to Total Adjustable Rate
    END_IF
    Repeat until Adjustment Needed = 0
        Applied Amount = 0
        Go through all taxable Buy Amount Work Fields (indx = 1 to indx = 9). For each occurrence, do
            the following:
            IF Taxable Split Amount (indx) > Taxable Fund Holdings (indx)
                Compute Adjustment = [{Taxable Split Rate (indx)/Total Adjustable Rate} *
                    Adjustment Needed. Round Adjustment based on m_RoundingTo.
                IF Adjustment > (AdjustmentNeeded − Applied Amount)
                    Adjustment (Adjustment Needed − Applied Amount)
                END_IF
                IF Adjustment > [Taxable Split Amount (indx) − Taxable Fund Holdings (indx)]
                    Adjustment = [Taxable Split Amount (indx) − Taxable Fund Holdings (indx)]
                END_IF
                Taxable Split Amount (indx) = [Taxable Split Amount (indx) − Adjustment]
                Add Adjustment to Applied Amount
            END_IF
        END_LOOP through Buy Amount Work Fields Adjustment Needed = [Adjustment Needed −
            Applied Amount]
        IF Applied Amount = 0
            Repeat until Adjustment Needed = 0
                Locate the largest Taxable Split Amount
                IF Taxable Split Amount (indx) >= Adjustment Needed
                    Subtract Adjustment Needed from Taxable Split Amount (indx)
                    Adjustment Needed = 0
                ELSE
                    Adjustment Needed = Adjustment Needed − Taxable Split Amount (indx)
                    Taxable Split Amount (indx) = 0
                END_IF
            END_REPEAT
        END_IF
    END_REPEAT
END_IF
```

Determine Tax Deferred Split Amounts for the Asset Class
For each non-zero Tax Deferred Fund # in the Buy Amount Work Fields (indx=1 to indx=9), do the following:
　Go through all output Investment Assets
　　IF VGI Fund # for the Investment Asset matches the Tax Deferred Fund # (indx)
　　　Add Hold Amount for the Investment Asset to Tax Deferred Fund Holdings (indx)
　　END_IF
Get Total Tax Deferred Amount=[Tax Deferred Buy Amount from the Asset Class Buy Control Table+sum of Tax Deferred Fund Holdings (indx=1 to indx=9)]
Adjustment Needed=0
Applied Amount=0
Processed Count=0

Go through all tax deferred Buy Amount Work Fields (indx=1 to indx=9). For each entry, do the following:
　IF Processed Count<(Tax Deferred Preferred Fund Count−1)
　　Tax Deferred Split Amount (indx)=[Total Tax Deferred Amount*Tax Deferred Split Rate(indx)]. Round the result based on m_RoundingTo.
　　Add Tax Deferred Split Amount (indx) to Applied Amount
　　IF Tax Deferred Split Amount (indx)<Tax Deferred Fund Holdings (indx)
　　　Adjustment Needed={Adjustment Needed+[Tax Deferred Fund Holdings (indx)−Tax Deferred Split Amount (indx)]}

```
        Tax Deferred Split Amount (indx)=[Tax Deferred
            Fund Holdings (indx)-Tax Deferred Split Amount
            (indx)]
        END_IF
    ELSE
        Tax Deferred Split Amount (indx)=[Total Tax Deferred
            Amount-Applied Amount]
        IF Tax Deferred Split Amount (indx)<Tax Deferred
            Fund Holdings (indx)
            Adjustment Needed={Adjustment Needed+[Tax
                Deferred Fund Holdings (indx)-Tax Deferred Split
                Amount (indx)]}
            Tax Deferred Split Amount (indx)=[Tax Deferred
                Fund Holdings (indx)-Tax Deferred Split Amount
                (indx)]
        END_IF
    END_IF
IF Adjustment Needed>0
    Total Adjustable Rate=0
    Go through all tax deferred Buy Amount Work Fields
        (indx=1 to indx=9)
        IF Tax Deferred Split Amount (indx)>Tax Deferred Fund
            Holdings (indx)
            Add Tax Deferred Split Rate (indx) to Total Adjustable
                Rate
        END_IF
    Repeat until Adjustment Needed=0
        Applied Amount=0
        Go through all tax deferred Buy Amount Work Fields
            (indx=1 to indx=9). For each occurrence, do the fol-
            lowing:
```

```
        IF Tax Deferred Split Amount (indx) > Tax Deferred Fund
            Holdings (indx)
            Compute Adjustment = [{Tax Deferred Split Rate (indx) / Total
                Adjustable Rate} * Adjustment Needed. Round Adjustment
```

-continued

```
                based on m_RoundingTo.
                IF Adjustment > (Adjustment Needed – Applied Amount)
                    Adjustment = (Adjustment Needed – Applied Amount)
                END_IF
                IF Adjustment > [Tax Deferred Split Amount (indx) – Tax
                    Deferred Fund Holdings (indx)]
                    Adjustment = [Tax Deferred Split Amount (indx) – Tax
                        Deferred Fund Holdings (indx)]
                END_IF
                Tax Deferred Split Amount (indx) = [Tax Deferred Split
                    Amount (indx) – Adjustment]
                Add Adjustment to Applied Amount
            END_IF
        END_LOOP through Buy Amount Work FieldsAdjustment
            Needed = [Adjustment Needed – Applied Amount]
        IF Applied Amount = 0
            Repeat until Adjustment Needed = 0
                Locate the largest Tax Deferred Split Amount
                IF Tax Deferred Split Amount (indx) >= Adjustment Needed
                    Subtract Adjustment Needed from Tax Deferred Split
                        Amount (indx)
                    Adjustment Needed = 0
                ELSE
                    Subtract Tax Deferred Split Amount (indx) from Adjustment
                        Needed Tax Deferred Split Amount (indx) = 0
                END_IF
            END_REPEAT
        END_IF
        Applied Amount = 0
    END_REPEAT
END_IF
```

General Preferred Fund Additional Purchase (This routine is used for any taxable asset class buys and tax deferred asset class buys for all portfolios except the tax efficient.)

IF Taxable Preferred Fund Found Flag=yes
   (Try to buy an existing preferredfund)
   Go through each of the taxable split occurrences (indx=1 to indx=9). For each occurrence, do the following:

```
IF Taxable Split Amount (indx) > 0
    Search the output Investment Assets for a match with Plan # in the Investment Asset matches
        pid from the variable name and VGI Fund # for the Investment Asset matches Taxable
        Fund # (indx)
    When a match is found
        IF Taxable Split Amount (indx) >= adjusted variable amount
            Add adjusted variable amount to Buy Amount for the selected Investment Asset
            Add adjusted variable amount to Proposed Amount for the selected Investment Asset
            Subtract adjusted variable amount from Taxable Split Amount (indx)
            Move zero to adjusted variable amount
            Processing of this buy variable is complete. Exit from this routine.
        ELSE
            Add Taxable Split Amount (indx) to Buy Amount for the selected Investment Asset
            Add Taxable Split Amount (indx) to Proposed Amount for the selected Investment
                Asset
            Subtract Taxable Split Amount (indx) from the adjusted variable amount
            Move Zero to the Taxable Split Amount (indx)
            Go on to next split amount
        END_IF
    END_IF
END_IF
```

General Alternate Fund Additional Purchase
(This routine is used for any taxable asset class buys and tax deferred asset class buys for all portfolios except the tax efficient.)
(Try to buy in existing alternate funds.)
IF Taxable Preferred Fund Found Flag=yes
   Go through each of the taxable split variables (indx=1 to indx=9). For each occurrence, do the following:

```
IF Taxable Split Amount (indx) > 0
   (Try to buy in an existing alternate fund for one of the breakdowns for the asset class.)
   IF m_PortfolioTilt = TE (tax efficient)
      use the Fund List For Tax Efficient Portfolio as the source of alternate funds
   ELSE
      use the Primary Fund List as the source for alternate funds
   END_IF
   Locate all entries on either the Primary Fund List or Fund List For Tax Efficient Portfolio
      (depending on result of check done above) with Asset Class = Asset Glass for the current
      Asset Class Buy Control Table entry, Preferred/Alternate Flag = A, and Split Fund # =
      indx. For each selected entry, do the following:
      Search the output Investment Assets for an entry with Plan # = pid from the variable
         name and VGI Fund # = VGI fund number from the selected alternate asset
      When a match is found
         IF Taxable Split Amount (indx) >= adjusted variable amount
            Add adjusted variable amount to Buy Amount for the selected Investment Asset
            Add adjusted variable amount to Proposed Amount for the selected Investment
               Asset.
            Subtract adjusted variable amount from Taxable Split Amount (indx)
            Move zero to adjusted variable amount
            Processing of this buy variable is complete. Exit from this routine.
         ELSE
            Add Taxable Split Amount (indx) to Buy Amount for the selected Investment
               Asset
            Add Taxable Split Amount (indx) to Proposed Amount for the selected
               Investment Asset
            Subtract Taxable Split Amount (indx) from the adjusted variable amount
            Move Zero to the Taxable Split Amount (indx)
            Go on to next split amount
         END_IF
   END_IF
END_IF
```

(All money for the buy variable was not used. Try to buy an existing alternate fund that covers the entire asset class.)

Locate all entries on either the Primary Fund List or Fund List For Tax Efficient Portfolio (depending on the check done above) with Asset Class=Asset Class for the current Asset Class Buy Control Table entry, Preferred/Alternate Flag=A, and Split Fund #=0. For each selected entry, do the following:

Search the output Investment Assets for an entry with Plan #=pid from the variable name and VGI Fund #=VGI fund number from the selected alternate asset
When a match is found
   Add adjusted variable amount to Buy Amount for the selected Investment Asset
   Perform Apply Purchase To All Non-Zero Taxable Split Amounts Processing of this buy variable is complete. Exit from this routine.
END_IF
General Asset Class Buys
(This routine is used for any taxable asset class buys and tax deferred asset class buys for all portfolios except the tax efficient.)
(Buy variable amount was not entirely spent on purchases of existing primary or alternate funds. Create new preferred fund investments.)

```
IF Taxable Preferred Fund Found
   Search all occurrences of taxable split amounts (indx=1 to indx=9). For each occurrence, do the
      following:
      IF Taxable Split Amount > 0 and (plan is not restricted or Taxable Fund # is in the list of
            investments available to the plan)
         Preferred fund number to use = Taxable Fund # (indx)
         IF Taxable Split Amount (indx) >= adjusted buy variable amount
            Work buy amount = adjusted buy variable amount
         ELSE
            Work buy amount = Taxable Split Amount (indx)
         END_IF
         Plan # = pid from adjusted buy variable name
         Perform Buy A Preferred Fund Subtract Work buy amount from Taxable Split Amount (indx)
         Subtract Work buy amount from adjusted buy variable
```

```
        IF adjusted buy variable = 0
            Processing for buy variable is complete. Exit from this routine.
        ELSE
            Go on to process the next taxable split occurrence
        END_IF
    END_IF
END_IF
```

(All of the buy amount was not used in a purchase of a preferred fund. If the plan is a restricted plan, try to buy an alternate fund.)
IF Taxable Preferred Fund Found and plan is restricted.
   (Buy in specific alternate funds if they are available to the plan)
   Search all occurrences of taxable split amounts (indx=1 to indx=9). For each occurrence, do the following:

```
IF Taxable Split Amount > 0
    Locate all alternate funds on the Primary Fund List for the asset class.
        Look for entries with Asset Class = Asset Class, Preferred/Alternate
        Flag = A, Split Fund # = indx. For each located alternate fund,
        do the following:
        IF the VGI fund number for the selected alternate is in the list of
        restricted assets
            Preferred fund number to use = VGI Fund Number for the selected
            alternate
            IF Taxable Split Amount (indx) >= adjusted buy variable amount
                Work buy amount = adjusted buy variable amount
            ELSE
                Work buy amount = Tax Deferred Split Amount (indx)
            END_IF
            Work plan # = pid from adjusted buy variable
            Perform Buy A Preferred Fund
            Subtract Work buy amount from Taxable Split Amount (indx)
            Subtract Work buy amount from adjusted buy variable
            IF adjusted buy variable = 0
                Processing for buy variable is complete. Exit from this routine.
            ELSE
                Go on to process the next tax deferred split occurrence
            END_IF
        END_IF
END_IF
```

(Buy in a non specific VGI alternate fund if one is available to the plan)
Locate all alternate funds on the Primary Fund List for the asset class. Look for entries with Asset Class=Asset Class, Preferred/Alternate Flag=A, Split Fund #=0. For each located alternate fund, do the following:
   IF the VGI fund number for the selected alternate is in the list of restricted assets
      Preferred fund number to use=VGI fund number from the selected alternate
      Work buy amount=adjusted buy variable amount
      Work Plan #=pid of adjusted variable name
      Perform Buy A Preferred Fund
      Perform Apply Purchase To All Non-Zero Taxable Split Amounts
      Processing of this buy variable is complete. Exit from this routine.
   END_IF
(Buy in the first VGI fund for the class that is available to the plan. This is a non-specific buy.)
Go through all restricted assets available to the plan to locate an entry with VGI fund number not equal to nulls, (asset class (1)=Asset Class or is a child of Asset class), and asset class %(1)=1.00.
IF an asset is selected
   Preferred fund number to use=VGI fund number from the selected restricted asset
   Work buy amount=adjusted buy variable amount
   Work Plan #=pid from adjusted buy variable name
   Perform Buy A Preferred Fund
   Perform Apply Purchase To All Non-Zero Taxable Split Amounts
   Processing of this buy variable is complete. Exit from this routine.
END_IF
(Buy in the first non-VGI fund for the class that is available to the plan. This is a non-specific buy.)
Go through all restricted assets available to the plan to locate an entry with VGI fund number equal to nulls, asset class (1)=Asset Class or is a child of Asset Class, and asset class %(1)=1.00.
IF an asset is selected
   Preferred fund number to use=nulls
   Preferred fund title to use=Title for selected restricted asset
   Work buy amount=adjusted buy variable amount
   Work Plan #=pid from adjusted buy variable name
   Work asset class breakdown=Asset Class Breakdown for the restricted asset
   Perform Add Fund To Output Assets
   Perform Apply Purchase To All Non-Zero Taxable Split Amounts
   Processing of this buy variable is complete. Exit from this routine.
END_IF
END_IF
(If this section is reached, the buy amount could not be used in any of the preferred or alternate funds. This should not happen.)
IF plan is taxable
   Preferred fund number to use=m_TaxAcctDCAFund
ELSE
   Preferred fund number to use=m_TaxExmptDCAFund
END_IF
Plan id=pid from adjusted buy variable name
Work buy amount=adjusted variable amount
Perform Buy A Preferred Fund
IF Produce Explanations=yes
   Record explanation "Purchase of nnnn for asset class xx in plan zzzzz was made to the money market because no preferred fund was identified for the asset class." (where nnnn is the adjusted variable amount, xx is the class from the variable name, and zzzz is the plan name for the output Investment Plan with Plan # equal to pid from the variable name.)
END_IF
Subtract Work buy amount from Taxable Split Amount (1)
Subtract Work buy amount from adjusted buy variable

Processing for buy variable is complete. Exit from this routine. Tax Efficient Tax Deferred Preferred Fund Additional Purchase

```
IF Tax Deferred Preferred Fund Found Flag = yes
   (Try to buy an existing preferred fund)
   Go through each of the tax deferred split occurrences (indx=1 to
      indx=9). For each occurrence, do the following:
      IF Tax Deferred Split Amount (indx) > 0
         Search the output Investment Assets for a match with Plan # in
            the Investment Asset matches pid from the variable name and
            VGI Fund # for the Investment Asset matches Tax Deferred
            Fund # (indx)
         When a match is found
            IF Tax Deferred Split Amount (indx) >= adjusted variable
               amount
               Add adjusted variable amount to Buy Amount for the selected
                  Investment Asset
               Add adjusted variable amount to Proposed Amount for the
                  selected Investment Asset
               Subtract adjusted variable amount from Tax Deferred Split
                  Amount (indx)
               Move zero to adjusted variable amount
               Processing of this buy variable is complete. Exit from this
                  routine.
            ELSE
               Add Tax Deferred Split Amount (indx) to Buy Amount for the
                  selected Investment Asset
               Add Tax Deferred Split Amount (indx) to Proposed Amount
                  for the selected Investment Asset
               Subtract Tax Deferred Split Amount (indx) from the adjusted
                  variable amount
               Move Zero to the Tax Deferred Split Amount (indx)
               Go on to next split amount
            END_IF
      END_IF
END_IF
```

Tax Efficient Tax Deferred Alternate Fund Additional Purchase
IF Tax Deferred Preferred Fund Found Flag=yes
   (Try to buy in existing alternate finds.)
   Go through each of the tax deferred split variables (indx=1 to indx=9). For each occurrence, do the following:

```
IF Tax Deferred Split Amount (indx) > 0
   Locate all entries on the Primary Fund List with Asset Class = Asset Class for the current
      Asset Class Buy Control Table entry, Preferred/Alternate Flag = A, and Split Fund # =
      indx. For each selected entry, do the following:
      Search the output Investment Assets for an entry with Plan # = pid from the variable
         name and VGI Fund # = VGI fund number from the selected alternate asset
      When a match is found
         IF Tax Deferred Split Amount (indx) >= adjusted variable amount
            Add adjusted variable amount to Buy Amount for the selected Investment Asset
            Add adjusted variable amount to Proposed Amount for the selected Investment
               Asset
            Subtract adjusted variable amount from Tax Deferred Split Amount (indx)
            Move zero to adjusted variable amount
            Processing of this buy variable is complete. Exit from this routine.
         ELSE
            Add Tax Deferred Split Amount (indx) to Buy Amount for the selected
               Investment Asset
            Add Tax Deferred Split Amount (indx) to Proposed Amount for the selected
               Investment Asset
            Subtract Tax Deferred Split Amount (indx) from the adjusted variable amount
            Move Zero to the Tax Deferred Split Amount (indx)
            Go on to next split amount
         END_IF
   END_IF
END_IF
```

(Buy variable was not completely spent on purchases of alternates for specific fund splits. Try to buy in an existing alternate that covers the entire asset class.)

Locate all entries on the Primary Fund List with Asset Class=Asset Class for the current Asset Class Buy Control Table entry, Preferred/Alternate Flag=A, and Split Fund #=0. For each selected entry, do the following:

Search the output Investment Assets for an entry with Plan #=pid from the variable name and VGI Fund #=VGI fund number from the selected alternate asset When a match is found Add adjusted variable amount to Buy Amount for the selected Investment Asset Add adjusted variable amount to Proposed Amount for the selected Investment Asset Perform Apply Purchase To All Non-Zero Tax Deferred Split Amounts Processing of this buy variable is complete. Exit from this routine.

Tax Efficient Tax Deferred Asset Class Buys (Buy variable amount was not entirely spent on purchases of existing primary or alternate funds. Create new preferred fund investments)

```
IF Tax Deferred Preferred Fund Found
    Search all occurrences of tax deferred split amounts (indx=1 to indx=9). For each occurrence, do the
        following:
        IF Tax Deferred Split Amount > 0 and (plan is not restricted or Tax Deferred Fund # (indx) is in
                the list of funds available to the plan)
            Preferred fund number to use = Tax Deferred Fund # (indx)
            IF Tax Deferred Split Amount (indx) >= adjusted buy variable amount
                Work buy amount = adjusted buy variable amount
            ELSE
                Work buy amount = Tax Deferred Split Amount (indx)
            END_IF
            Work Plan # = pid from adjusted variable name
            Perform Buy A Preferred Fund
            Subtract Work buy amount from Tax Deferred Split Amount (indx)
            Subtract Work buy amount from adjusted buy variable
            IF adjusted buy variable = 0
                Processing for buy variable is complete. Exit from this routine.
            ELSE
                Go on to process the next tax deferred split occurrence
            END_IF
        END_IF
END_IF
```

(All of the buy amount was not used up in the purchase of existing or a new preferred fund Should only be here for restricted plans)
IF Tax Deferred Preferred Fund Found Flag=Yes and plan is restricted
(Buy in specific alternate funds if they are available to the plan)
Search all occurrences of tax deferred split amounts (indx=1 to indx=9). For each occurrence, do the following:

```
IF Tax Deterred Split Amount > 0
    Locate all alternate funds on the Primary Fund List for the asset class.
    Look for entries with Asset Class = Asset Class, Preferred/Alternate
        Flag = A, Split Fund # = indx. For each located alternate fund, do the
        following:
        IF the VGI fund number for the selected alternate is in the list of
                restricted assets
            Preferred fund number to use = VGI Fund Number for the
                selected alternate )
            IF Tax Deferred Split Amount (indx) >= adjusted buy variable
                    amount
                Work buy amount = adjusted buy variable amount
            ELSE
                Work buy amount = Tax Deferred Split Amount (indx)
            END_IF
            Work plan # = pid from adjusted buy variable
            Perform Buy A Preferred FundSubtract Work buy amount from
                Tax Deferred Split Amount (indx)
            Subtract Work buy amount from adjusted buy variable
            IF adjusted buy variable = 0
                Processing for buy variable is complete. Exit from this routine.
            ELSE
                Go on to process the next tax deferred split occurrence
            END_IF
        END_IF
    END_IF
END_IF
```

IF plan is restricted(Buy in a non specific VGI alternate fund if one is available to the plan)
Locate all alternate funds on the Primary Fund List for the asset class. Look for entries with Asset Class=Asset Class, Preferred/Alternate Flag=A, Split Fund #=0. For each located alternate fund, do the following:
    IF the VGI fund number for the selected alternate is in the list of restricted assets
        Preferred fund number to use=VGI find number from the selected alternate
        Work buy amount=adjusted buy variable amount
        Work Plan #=pid of adjusted variable name
        Perform Buy A Preferred FundPerform Apply Purchase To All Non-Zero Tax Deferred Split Amounts
        Processing of this buy variable is complete. Exit from this routine.
    END_IF
(Buy in the first VGI fund for the class that is available to the plan. This is a non-specific buy)
Go through all restricted assets available to the plan to locate an entry with VGI find number not equal to nulls, asset class (1)=Asset Class or is a child of Asset Class, and asset class % (1)=1.00.
IF an asset is selected
    Preferred fund number to use=VGI fund number from the selected restricted asset
    Work buy amount=adjusted buy variable amount
    Work Plan #=pid from adjusted buy variable name
    Perform Buy A Preferred Fund
    Perform Apply Purchase To All Non-Zero Tax Deferred Split Amounts
    Processing of this buy variable is complete. Exit from this routine.
END_IF
(Buy in the first non-VGI fund for the class that is available to the plan. This is a non-specific buy)
Go through all restricted assets available to the plan to locate an entry with VGI fund number not equal to nulls, asset class (1)=Asset Class or is a child of the asset class, and asset class % (1)=1.00.
IF an asset is selected
    Preferred fund number to use=nulls
    Preferred fund title to use=Title for selected restricted asset
    Work buy amount=adjusted buy variable amount
    Work Plan #=pid from adjusted buy variable name
    Work asset class breakdown=asset class breakdown for the selected restricted asset
    Perform Add Fund To Output Assets
    Perform Apply Purchase To All Non-Zero Tax Deferred Split Amounts
    Processing of this buy variable is complete. Exit from this routine.
END_IF
END_IF
(should not happen since asset class would not have been a buy if there was no selection)

Preferred fund number to use=m_TaxExmptDCAFund
Work buy amount adjusted variable amount
Work Plan #=pid from adjusted buy variable name
Perform Buy A Preferred Fund
IF Produce Explanations=yes
   Record explanation "Purchase of nnnn for asset class xx in plan zzzzz was made to the money market because no preferred fund was identified for the asset class." (where nnnn is the adjusted variable amount, xx is the class from the variable name, and zzzz is the plan name for the output Investment Plan with Plan # equal to pidfrom the variable name)
END_IF
Perform Apply Purchase To All Non-Zero Tax Deferred Split Amounts
Subtract Work buy amount from adjusted buy variable
Processing for buy variable is complete. Exit from this routine.
   Buy a Preferred Fund
Locate Preferred Fund Number To Use in Vanguard Fund List
IF find is found
   Preferred Fund Title To Use=fund title from the matching Vanguard Fund List entry
   Work Asset Class Breakdown=asset class breakdown from the matching Vanguard Fund List entry
ELSE
   Preferred Fund Title To Use=Nulls
   Work asset class breakdown=spaces
   Asset Class (1) of Work asset class breakdown=Asset Class being processed
   Asset Class percent (1) of Work asset class breakdown=1.00
END_IF
Perform Add Fund To Output Assets
   Apply Purchase to all Non-Zero Tax Deferred Split Amounts
   Apply Purchase to all Non-Zero Taxable Split Amounts
Repeat the following until adjusted variable amount=0
   Applied amount=0
   Compute total rates=sum of all Taxable Split Rates for any entry where Taxable Split Amount>0
   Go through each taxable split occurrence (indx=1 to indx=9). For each occurrence, do the following:
     Compute adjustment=[(Taxable Split Rate (indx)/total rates)*adjusted variable amount.
     Round adjustment based on m_RoudingTo.
     IF adjustment>(adjusted variable amount–applied amount)
       adjustment=(adjusted variable amount–applied amount)
     END_IF
     IF adjustment>Taxable Split Amount (indx)
       adjustment=Taxable Split Amount (indx)
     END_IF
     Subtract adjustment from Taxable Split Amount (indx)
     Add adjustment to applied amount
   END_LOOP through Taxable Split occurrences Subtract applied amount from adjusted variable amount
   IF Applied Amount=0
     Repeat until Adjusted Variable Amount=0
       Locate the largest Taxable Split Amount
       IF Taxable Split Amount (indx)>=Adjusted Variable Amount
         Subtract Adjusted Variable Amount from Taxable Split Amount (indx)
         Adjusted Variable Amount=0
       ELSE

---

Repeat the following until adjusted variable amount = 0
  Applied amount = 0
  Compute total rates = sum of all Tax Deferred Split Rates for any entry where Tax Deferred Split Amount > 0
  Go through each tax deferred split occurrence (indx=1 to indx=9). For each occurrence, do the following:
    Compute adjustment = [(Tax Deferred Split Rate (indx)/total rates) * adjusted variable amount.
      Round adjustment based on m_RoudingTo.
    IF adjustment > (adjusted variable amount – applied amount)
      adjustment = (adjusted variable amount – applied amount)
    END_IF
    IF adjustment > Tax Deferred Split Amount (indx)
      adjustment = Tax Deferred Split Amount (indx)
    END_IF
    Subtract adjustment from Tax Deferred Split Amount (indx)
    Add adjustment to applied amount
  END_LOOP through Tax Deferred Split occurrences
  Subtract applied amount from adjusted variable amount
  IF Applied Amount = 0
    Repeat until Adjusted Variable Amount = 0
      Locate the largest Tax Deferred Split Amount
      IF Tax Deferred Split Amount (indx) >= Adjusted Variable Amount
        Subtract Adjusted Variable Amount from Tax Deferred Split Amount (indx)
        Adjusted Variable Amount = 0
      ELSE
        Subtract Tax Deferred Split Amount (indx) from Adjusted Variable Amount
        Tax Deferred Split Amount (indx) = 0
      END_IF
    END_REPEAT
  END_IF
  Applied amount = 0
END_REPEAT Subtract Taxable Split Amount (indx) from Adjusted Variable Amount
Taxable Split Amount (indx)=0
END_IF
END_REPEAT
END_IF
Applied amount=0
END_REPEAT
Buy Cleanup
Review all Output Investment Assets, doing the following:
IF Buy Amount>0 and <Minimum Txn Amount
Add up all Buy Amounts for the plan
IF the total Buy Amounts for the plan<Minimum Txn Amount (this should not happen unless the very small accounts have been marked as definitely repositionable)
Go on to next Output Investment Asset
END_IF
Perform Develop Reallocation List
For each entry in the Reallocation List, Perform Reallocate Low Buy
IF Buy Amount for selected asset=0 and Current Amount for selected asset=0
Delete selected asset from the list of Output Investments
END_IF
END_IF
Review all Output Investment Assets, doing the following:
IF VGI Fund Flag indicates the fund is a Vanguard fund and Proposed Amount>0
and Buy Amount=Proposed Amount
and Proposed Amount<Fund Minimum Amount based on the type of plan (tax exempt plans use retirement minimum, all others use retail minimum)
IF the selected asset is the only buy for the plan
Go on to next Output Investment Asset
END_IF
Perform Develop Reallocation List
For each entry in the Reallocation List, Perform Reallocate Asset Class Buy
IF Buy Amount for selected asset=0 and Current Amount for selected asset=0
Delete selected asset from the list of Output Investments
END_IF
END_IF
Develop Reallocation List
Tot Amt To Reallocate=Buy amount for the selected asset
Amt Split=0
Go through each used asset class (i.e. not nulls or spaces) in the asset class breakdown for the selected asset and create the Reallocation List. This list is a list of asset classes and associated portion of the selected buy amount which must be reallocated to another asset(s). For each asset class in the breakdown, do the following:
Compute Amt=(Tot Amt To Reallocate*Percent from the asset class breakdown entry being processed) rounded based on m_RoundingTo.
IF Amt>(Tot Amt To Reallocate−Amt Split)
Amt=(Tot Amt To Reallocate−Amt Split)
END_IF
Add Amt to Amt Split
IF Amt>0
Add an entry to the Reallocation List containing the asset class from the breakdown entry being processed and amount=Amt
END_IF IF Amt Split=0 (should only happen if all calculated amounts end up rounding down to 0)
Add an entry to the Reallocation List containing asset class (1) from the asset class breakdown and amount=Tot Amt To Reallocate
END_IF
Add Fund to Output Assets
Add 1 to Last Used Asset #
Add a new Investment Asset to the output. Asset #=Last Used Asset #, Plan #=Work asset class, asset class breakdown=work asset class breakdown, VGI Fund #=preferred fund number to use, VGI Fund Flag="Vanguard fund", Title=preferred fund title to use, Current Amount=0, Buy Amount=work buy amount, Sell Amount=0, Proposed Amount=work buy amount, Tax Cost=0, Fee Amount=0
Reallocate Asset Class Buy
Adjustment Needed=Amount from Reallocation List Entry
Current Asset Class=Asset Class from Reallocation List Entry
(Look for an alternate purchase asset in the same asset class)
Search all assets associated with the plan to which the selected asset being reallocated belongs for any asset other than the selected asset which has asset class (1)=Current Asset Class and asset class percent (1) =1.00 and Buy Amount>0.
IF an alternate asset is found
Add Adjustment Needed to Buy Amount for the alternate asset
Add Adjustment Needed to Proposed Amount for the alternate asset
IF Produce Explanations=Yes
Record an explanation of "Buy amount of x in fund y for plan m was reallocated to z because the purchase is below the fund minimum." where x=Adjustment Needed, Y=title of the selected asset, m=plan name of the selected asset, and z=title of the alternate asset.
END_IF
Subtract Adjustment Needed from Buy Amount for the selected asset
Subtract Adjustment Needed from Proposed Amount for the selected asset
Processing for this Reallocation List Entry is complete
END_IF
(Look for alternate purchase assets in similar asset classes)
Repeat this process until Current Asset Class=IV (will only happen if other purchases were to balanced funds) or Adjustment Amount=0 (current Reallocation List Entry amount has been reallocated)
Review the asset hierarchy to identify the parent asset class for the Current Asset Class
Review all assets within the plan other than the selected asset being reallocated
IF there are investments which are preferred or alternate fund selections in the plan which would sum to the parent asset class[3] and have asset class percent (1)=1.00
Create a list of the Investment Assets which meet this criteria (referred to later as Selected Alternative Assets). For each asset, include the Asset #, the first asset class (assumes that all preferred and alternate funds are single asset class allocations), and a percent which is initialized to zero.
Perform Reallocate Buy
ELSE
Set Current Asset Class=parent asset class
END_IF IF Adjustment Needed=0
   IF Produce Explanations=yes
      Record an Explanation of "Buy amount of x in fund y for plan m was reallocated to z because the proposed amount is below the fund minimum." where x is the Amount from the Reallocation List Entry, y is the name of the fund for the selected asset, m is the plan name for the plan, and z is a list of the fund names for the assets in the Selected Alternative Assets list.
   END_IF
   Subtract Amount from Reallocation List Entry from Buy Amount for the selected asset
   Subtract Amount from Reallocation List Entry from Proposed Amount for the selected asset
   Processing for this Reallocation List Entry is complete
END_IF

[3] IF selected asset is not in a restricted plan, IF m_PortfolioTilt is "tax efficient" and the plan is a taxable plan, use the Fund List For Tax Efficient Portfolio to determine the preferred and alternate funds; otherwise, use the Primary Fund List. IF the selected asset is in a restricted plan, any asset in the list of funds available to the plan is considered a preferred fund.

(No single asset class asset could be located to which the purchase can be reallocated. Try to locate a balanced fund which contains the asset class)
Current Asset Class=Asset Class from Reallocation List Entry
Repeat this process until Current Asset Class=IV (should not happen) or Adjustment Amount=0 (current Reallocation List Entry amount has been reallocated)
   Review all assets within the plan other than the selected asset being reallocated
      IF there are investments which (contain an asset class=current asset class or an asset class that would sum to current asset class) and are preferred or alternate fund selections in the plan (as defined for the last search)
         Select the first asset found which meets the criteria as the alternate asset
         Add Adjustment Needed to Buy Amount for the alternate asset
         Add Adjustment Needed to Proposed Amount for the alternate asset
         IF Produce Explanations=Yes
            Record an explanation of "Buy amount of x in fund y for plan m was reallocated to z because the purchase is below the fund minimum." where x=Adjustment Needed, Y=title of the selected asset, m=plan name of the selected asset, and z=title of the alternate asset.
         END_IF
         Subtract Adjustment Needed from Buy Amount for the selected asset
         Subtract Adjustment Needed from Proposed Amount for the selected asset
         Processing for this Reallocation List Entry is complete
      ELSE
         Set Current Asset Class=parent asset class
      END_IF
   Reallocate Low Buy
Set Adjustment Needed=Amount for the Reallocation List entry
Set Current Asset Class=Asset Class of the Reallocation List entry
(Try to find another buy for a single asset class buy in either the same asset class or a similar asset class)
Repeat the following process until Current Asset Class=IV (will only happen if all other buys are to balanced funds) or Adjustment Amount=0 (current buy has been reallocated)
   Search the Output Investment Assets for another buy in the same plan as the selected asset with (asset class (1)=current asset class or in a class which sums to current asset class), Asset Class Percent (1)=1.00, and Buy Amount>0.
   IF an alternate investment is found
      Add Adjustment Needed to Buy Amount and Proposed Amount for the alternate asset
      IF Produce Explanations=yes
         Record an Explanation of "Buy amount of x in fund y for plan m was reallocated to z because the amount was less than the minimum transaction amount." where x is Adjustment Needed, y is the name of the fund for the selected asset, m is the plan name for the plan, and z is the name of the fund for the alternate Investment Asset.
      END_IF
      Subtract Adjustment Needed from Buy Amount for the selected asset
      Subtract Adjustment Needed from Proposed Amount for the selected asset
      Move zero to Adjustment Needed
      Processing for this Reallocation List entry is complete
   END_IF
   Review the asset hierarchy to identify the parent asset class for the Current Asset Class
   Set Current Asset Class=parent asset class
(Could not find a single asset class purchase for the same or related asset class. Look for a balanced fund purchase that contains the asset class or a related asset class.)
Set Current Asset Class=Asset Class of the Reallocation List entry
Repeat the following process until Current Asset Class=IV (should not happen) or Adjustment Amount=0 (current buy has been reallocated)
   Search the Output Investment Assets for another buy in the same plan as the selected asset with (any asset class in the asset class breakdown=current asset class or in a class which sums to current asset class) and Buy Amount>0.
   IF an alternate investment is found
      Add Adjustment Needed to Buy Amount and Proposed Amount for the alternate asset
      IF Produce Explanations=yes
         Record an Explanation of "Buy amount of x in fund y for plan m was reallocated to z because the amount was less than the minimum transaction amount." where x is Adjustment Needed, y is the name of the fund for the selected asset, m is the plan name for the plan, and z is the name of the fund for the alternate Investment Asset.
      END_IF
      Subtract Adjustment Needed from Buy Amount for the selected asset
      Subtract Adjustment Needed from Proposed Amount for the selected asset
      Processing for this Reallocation List entry is complete
   END_IF
   Review the asset hierarchy to identify the parent asset class for the Current Asset Class
   Set Current Asset Class=parent asset class
   Reallocate Buy
Review the Selected Alternative Assets IF there are multiple assets for a single asset class
    IF the plan is not restricted and one of the assets is for a preferred fund[4]
        Delete all the other assets for this asset class from the Selected Alternative Assets
    ELSE
        Delete all assets for the asset class except the one with the highest proposed amount
    END_IF
END_IF
Assign a target percent for each of the Selected Alternative Assets. Go through each of the Selected
  Alternative Assets and do the following:
IF the asset class of the Selected Alternative Asset is in the target portfolio
    Set percent for the current Selected Alternative Asset = target portfolio percent for the asset class
ELSE
    Set percent for the current Selected Alternative Asset = 0
END_IF
When all of the Selected Alternative Assets have been reviewed, sum the assigned percents.
IF the sum of the assigned percents = 0
    Count the number of Selected Alternative Assets
    Set percent for each of the Selected Alternative Assets = 1/Count
ELSE
    Delete any Selected Alternative Assets for which percent = 0
END_IF
Get Target Sum = sum of percents for the Selected Alternative Assets
Repeat this process until Adjustment Needed = 0
    Adjustment Applied = 0
    Go through each of the Selected Alternative Assets and do the following:
        Compute Adjustment Amount = [(percent for the current Selected Alternative Asset/Target Sum)
            * Adjustment Needed] Round Adjustment Amount based on m_Rounding_To.
        IF Adjustment Amount > (Adjustment Needed – Adjustment Applied)
            Adjustment Amount = (Adjustment Needed – Adjustment Applied)
        END_IF
        Using the Asset # to located the Output Investment Asset, update the entry with the adjustment by
            adding Adjustment Amount to the Buy Amount for the asset.
        Adjustment Applied = (Adjustment Applied + Adjustment Amount)
        IF (Adjustment Needed – Adjustment Applied) = 0
            Terminate loop through Selected Alternative Assets
        END_IF
    End_Loop through Selected Alternative Assets
    Adjustment Needed = (Adjustment Needed – Adjustment Applied)
    IF Adjustment Applied = 0
        Locate the Selected Alternative Asset with the highest percent. If there are multiple entries with
            the same percent, select the first one.
        Add Adjustment Needed to the Buy Amount for the asset
        Adjustment Needed = 0
        ELSEAdjustment Applied = 0
    END_IF
END_LOOP for processing Adjustment Needed.

---

[4]If m_PortfolioTilt is "tax efficient" and the plan to which the asset being replaced belongs is taxable, use the Fund List For Tax Efficient Portfolio to determine preferred and alternate funds. Otherwise, use the Primary Fund List.

Buy Fund Adjustments
Perform International Fund Replacement
Perform Bond Index Fund Replacement
IF m_PortfolioTilt=NO (Core) or TE (Tax Efficient)
    Perform Total Stock Market Replacement
    END_IF
    International Fund Replacement
IF S4 is in the target portfolio
    and S5 is in the target portfolio
    Compute new S4 amount=sum of all buys to asset class S4
        where S4 is the only asset class for the investment and
        the investment is a new investment (current amount=0)
        and the plan to which the asset belongs is either unrestricted or offers fund 113 as an option.
    Compute new S5 amount=sum of all buys to asset class S5
        where S5 is the only asset class for the investment and
        the investment is a new investment and the plan to which
        the asset belongs is either unrestricted or offers fund 113
        as an option.
    Compute current S4 amount=sum of all current amounts
        for asset class S4
    Compute current S5 amount=sum of all current amounts
        for asset class S5
    IF current S4 amount=0 and current S5 amount=0 and (new
        S4 amount>0 or new S5 amount>0)
        Perform Total International Portfolio Substitution
        Processing for this routine is complete
    END_IF
    IF new S4 amount=0 or new S5 amount=0
        Switch to the substitute fund can not be done. Exit from
            this routine.
    END_IF
    IF (new S4 amount/new S5 amount)>=[(S4 percent in target portfolio/S5 percent in target portfolio)*(1–m_TotalIntlPortfolioToleranceMinus)]
        and (new S4 amount/new S5 amount)<=[(S4 percent in target portfolio/S5 percent in target portfolio)*(1+ m_TotalIntlPortfolioPlus)}
        Perform Total International Portfolio Substitution
        Processing for this routine is complete
    END_IFEND_IF Total International Portfolio Substitution
Set preferred fund number to use to 113
Locate 113 in the list of Vanguard Funds
IF 113 is found
   Set preferred fund title to use to the fund title found in the list of Vanguard Funds
   Set Work asset class breakdown to asset class breakdown for the matching entry in the Vanguard Fund list p0
ELSE
   Set preferred fund title to use to nulls
   Set Work asset class breakdown to spaces
   Asset class (1) of Work asset class breakdown=S4
   Asset class percent (1) of Work asset class breakdown=S4 percent in target portfolio
   Asset class (2) of Work asset class breakdown=S5
   Asset class percent (2) of Work asset class breakdown S5 percent in target portfolio
END_IF
Go through all output Investment Assets and select assets with buy amount>0, current amount=0, (first asset class in asset class breakdown=S4 or S5) and first asset class percent in asset class breakdown=1.00), and VGI fund number not equal to 113. For each selected asset, do the following:

Set Percent A to the percent from the asset class breakdown for the Substitute Fund # for asset class A.
Set Percent B to the percent from the asset class breakdown for the Substitute Fund # for asset class A.
(If there is no percent available for either of the classes, fund replacement can not be done. Exit from this routine.)
Compute new A amount=sum of all buys to asset class A where A is the only asset class for the investment and the investment is a new investment (current amount=0) and the plan to which the asset belongs is either unrestricted or offers substitute fund # as an option.
Compute new B amount=sum of all buys to asset class B where B is the only asset class for the investment and the investment is a new investment and the plan to which the asset belongs is either unrestricted or offers substitute fund # as an option.
Compute current A amount=sum of all current amounts for asset class A
Compute current B amount=sum of all current amounts for asset-class B
IF current A amount=0 and current B amount=0 and (new A amount>0 or new B amount>0)

---

IF plan is not restricted or 113 is in the list of restricted funds for the plan
   Try to locate an asset entry for the fund 113 in the current plan
   IF an existing entry for fund 113 was found in the plan
     Add the buy amount for the selected asset to the buy amount for the existing fund 113 investment
     Add the buy amount for the selected asset to the proposed amount for the existing fund 113 investment
     Delete the selected asset from the output Investment Assets
   ELSE
     Set work buy amount to buy amount for the selected asset
     Work Plan # = plan # from the selected Investment Asset Perform Add Fund To Output Assets
     Perform Add Fund To Output Assets
     Delete the selected asset from the output Investment Assets
   END_IF
END_IF

---

Bond Index Fund Replacement
IF short term corp. bonds are in the target portfolio and short term treasuries are in the target portfolio
   Asset Class A=BC (short term corp)
   Asset Class B=BT (short term treasuries)
   Substitute Fund #=132 (Short-term Bond Index)
   Perform General Fund Replacement
END_IF
IF intermediate term corp. bonds are in the target portfolio and intermediate term treasuries are in the target portfolio
   Asset Class A=BO (intermediate term corp)
   Asset Class B=BU (intermediate term treasuries)
   Substitute Fund #=314 (Intermediate-term Bond Index)
   Perform General Fund Replacement
END_IF
IF long term corp. bonds are in the target portfolio and long term treasuries are in the target portfolio
   Asset Class A=BK (long term corp)
   Asset Class B=BY (long term treasuries)
   Substitute Fund #=522 (Long-term Bond Index)
   Perform General Fund Replacement
END_IF
   General Fund Replacement
Locate the asset class breakdown data for the Substitute Fund #.

A amount=new A amount
   B amount=new B amount
   Perform General Fund Substitution
   Processing for this routine is complete
END_IF
IF new A amount=0 or new B amount=0
   Switch to the substitute fund can not be done. Exit from this routine.
END_IF
IF current A amount >0 and current B amount >0
   Replacement can not be done. Exit from procedure.
END_IF

---

IF percent A <= percent B
   A amount = new A amount
   Total index amount = (A amount / A percent) rounded based on m__RoundingTo B amount = (Total index amount − A amount)
   IF B amount >= new B amount
     B amount = new B amount
     Total index amount = (B amount / B percent) rounded based on m__RoundingTo A amount = (Total index amount − B amount)
     IF A amount >= new A amount
       A amount = new A amount
     ELSE
       IF (new A amount − A amount) <= general retail fund minimum

```
            A amount = new A amount
        END_IF
    END_IF
ELSE
    IF (new B amount - B amount) <= general retail fund minimum
        B amount = new B amount
    END_IF
END_IFELSE
B amount = new B amount
Total index amount = (B amount / B percent) rounded based on
m_RoundingTo A amount = (Total index amount - B amount)
IF A amount >= new A amount
    A amount = new A amount
    Total index amount = (A amount / A percent) rounded based on
    m_RoundingTo B amount = (Total index amount - A amount)
    IF B amount >= new B amount
        B amount = new B amount
    ELSE
        IF (new B amount - B amount) <= general retail fund minimum
            B amount = new B amount
        END_IF
    END_IF
ELSE
    IF (new A amount - A amount) <= general retail fund minimum
        A amount = new A amount
    END_IF
END_IF
END_IF
IF A amount > 0 and B amount > 0
    IF {[(new A amount - A amount) = 0 and current A amount = 0]
       or [(new B amount - B amount) = 0 and current B amount = 0]}
        Perform General Fund Substitution
        Processing for this routine is complete
    END_IF
END_IF
```

General Fund Substitution
Set preferred fund number to use to substitute fund #
Locate the substitute fund # in the list of Vanguard Funds
IF the substitute fund # is found
    Set preferred fund title to use to the fund title found in the list of Vanguard Funds
    Set Work asset class breakdown to asset class breakdown for the matching entry in the Vanguard Fund list
ELSE
    Set preferred fund title to use to nulls
    Set Work asset class breakdown to spaces
    Asset class (1) of Work asset class breakdown=Asset Class A
    Asset class percent (1) of Work asset class breakdown=A Percent
    Asset class (2) of Work asset class breakdown=Asset Class B
    Asset class percent (2) of Work asset class breakdown=B Percent
END_IF
Go through all output Investment Assets and select assets with buy amount>0 (first asset class in asset class breakdown=Asset Class A or Asset Class B) and first asset class percent in asset class breakdown=1.00), and VGI fund number not equal to substitute fund #. Process assets which have current amount=0 first. For each selected asset, do the following:

```
IF plan is not restricted or substitute fund # is in the list of restricted funds
for the plan
    IF the selected asset is for asset class A
        IF A amount = 0
            Work buy amount = 0
        ELSE
            IF buy amount for the selected asset <= A amount
               or (buy amount for the selected asset - A amount) <=
                  fund minimum (check either the retail or retirement
                  minimum depending on the plan type)
                Work buy amount = buy amount for the selected asset
            ELSE
                Work buy amount = A amount
            END_IF
            IF Work Buy Amount <= A Amount
                Subtract Work buy amount from A amount
            ELSE
                A amount = 0
            END_IF
        END_IF
    ELSE
        IF B amount = 0
            Work buy amount = 0
        ELSE
            IF buy amount for the selected asset <= B amount
               or (buy amount for the selected asset - B amount) <=
                  fund minimum (check either the retail or retirement
                  minimum depending on the plan type)
                Work buy amount = buy amount for the selected asset
            ELSE
                Work buy amount = B amount
            END_IF
            IF Work Buy Amount <= B Amount
                Subtract Work buy amount from B amount
            ELSE
                B amount = 0
            END_IF
        END_IF
    END_IF
END_IF
```

```
IF Work buy amount > 0
    Try to locate an asset entry for the substitute fund # in the current plan
    IF an existing entry for the substitute fund # was found in the plan
        Add the Work buy amount to the buy amount for the existing
            substitute fund # investment
            Add the Work buy amount to the proposed amount for the
                existing substitute fund # investment
    ELSE
        Work Plan # = plan # from the selected Investment Asset Perform
            Add Fund To Output Assets
        Perform Add Fund To Output Assets
    END_IF
    Subtract Work buy amount from the buy amount for the selected asset
    Subtract Work buy amount from the proposed amount for the selected
    asset
    IF proposed amount for the selected asset = 0
        Delete the selected asset from the Output Assets
    END_IF
END_IF
```

Total Stock Market Replacement

Compute new SQ amount=sum of all buys to asset class SQ where SQ is the only asset class for the investment and the purchase is a new buy (current amount=0) and the plan to which the asset belongs is either unrestricted or offers fund 85 or 102 as an option.

Compute new SX amount=sum of all buys to asset class SX where SX is the only asset class for the investment or all asset classes in the investment are descendants of SX and the purchase is a new buy (current amount=0) and the plan to which the asset belongs is either unrestricted or offers fund 85 or 102 as an option.

IF new SQ amount=0 or new SX amount=0
  No switch can be done. Exit from this routine.
END_IF
IF m_PortfolioTilt=TE (tax efficient)
  Compute TMSP amount=sum of all proposed amounts in fund 85 (TSMP) in taxable plans
Compute Cap Appreciation Amount=sum of all proposed amounts in fund (102) in taxable plans
  Compute new SQ amount=(new SQ amount+TSMP amount+Cap Appreciation Amount)
END_IF
IF (new SQ amount/new SX amount)>[(target SQ allocation rate/target SX allocation rate)*(1−m_TSMPortfolioToleranceMinus)]
  and (new SQ amount/new SX amount)<[(target SQ allocation rate/target SX allocation rate)*(1+mTSMPortfolioTolerancePlus)}
  Perform Switch To Total Stock Market Portfolio
  Processing for this routine is complete
END_IF Switch to Total Stock Market Portfolio
General TSMP Switch
Set preferred fund number to use to 85 (TSMP—Total Stock Market Portfolio)
Locate preferred fund number to use in the list of Vanguard Funds
IF preferred fund number to use is found
  Set preferred fund title to use to the fund title found in the list of Vanguard Funds
  Set Work asset class breakdown to the asset class breakdown for the entry in the list of Vanguard Funds
ELSE
  Set preferred fund title to use to nulls
  Set Work asset class breakdown to spaces
  Set asset class (1) of Work asset class breakdown to S6
  Set asset class percent (1) to 1.00
END_IF
Go through all output Investment Assets. Select an asset if buy amount>0, [{(first asset class in asset class breakdown=SQ or SX) and first asset class percent in asset class breakdown=1.00} or all asset classes in the investment are descendants of SX], and VGI Fund # not equal to 85 or 102). For each selected asset, do the following:

---

IF plan is unrestricted or fund 85 is in the list of restricted investments for the plan
  Try to locate an asset entry for fund 85 in the current plan
  IF existing TSMP was found in the plan
    Add the buy amount for the selected asset to the buy amount for the existing TSMP investment
    Add the buy amount for the selected asset to the proposed amount for the existing TSMP investment
    Subtract Buy Amount for the selected asset from Proposed Amount for the selected asset
    IF Current Amount for the selected asset = 0 and Proposed Amount for the selected asset = 0
      Delete the selected asset from the output Investment Assets
    END_IF
    Go on to processing the next output Investment Asset
  END_IF
END_IF
IF plan is unrestricted or fund 102 is in the list of restricted funds for the plan
  Try to locate an asset entry for fund 102 in the current plan
  IF existing Tax Managed Cap Appreciation was found in the plan
    Add the buy amount for the selected asset to the buy amount for the existing investment
    Add the buy amount for the selected asset to the proposed amount for the existing investment
    Subtract Buy Amount for the selected asset from Proposed Amount for the selected asset
    IF Current Amount for the selected asset = 0 and Proposed Amount for the selected asset = 0
      Delete the selected asset from the output Investment Assets
    END_IF
    Go on to processing the next output Investment Asset
  END_IF
END_IF
IF plan is unrestricted or fund 85 is in the list of restricted funds for the plan
  Set work buy amount to buy amount for the selected asset
  Perform Add Fund To Output Assets
  Subtract Buy Amount for the selected asset from Proposed Amount for the selected asset
  IF Current Amount for the selected asset = 0 and Proposed Amount for the selected asset = 0
    Delete the selected asset from the output Investment Assets
  END_IF
END_IF
IF fund 102 is in the list of restricted funds for the plan
  Set preferred fund number to use to 102 (Tax Managed Cap Appreciation)
  Locate preferred fund number to use in the list of Vanguard Funds
  IF preferred fund number to use is found
    Set preferred fund title to use to the fund title found in the list of Vanguard Funds
    Set Work asset class breakdown to the asset class breakdown for the entry in the list of Vanguard Funds
  ELSE
    Set preferred fund title to use to nulls
    Set Work asset class breakdown to spaces
    Asset class (1) of Work asset class breakdown to SQ
    Asset class percent (1) of Work asset class breakdown = (SQ target allocation / [SX -continued

```
        target allocation + SQ target allocation])
    Asset class (2) of Work asset class breakdown = SX
    Asset class percent (2) of Work asset class breakdown = (SX target allocation / [SX
        target allocation + SQ target allocation])
    END_IF
Set work buy amount to buy amount for the selected asset
Perform Add Fund To Output Assets
Subtract Buy Amount for the selected asset from Proposed Amount for the selected asset
IF Current Amount for the selected asset = 0 and Proposed Amount for the selected asset = 0
    Delete the selected asset from the output Investment Assets
    END_IF
END_IF
```

What is claimed is:

1. A computer-implemented apparatus for automating and executing investment planning for a client comprising:
   (a) a processor that receives data regarding:
      (i) the client's current asset portfolio, including the taxable status of each asset,
      (ii) the client's desired asset allocation, and
      (iii) the client's preferred domain,
      wherein the processor is configured to automatically generate financial transaction recommendations for modifying the client's current asset portfolio to reach as close as possible to the desired asset allocation and the preferred domain, the recommendations including specific recommendations for selling amounts of selected current assets and specific recommendations for buying amounts of one or more investment funds; and
   (b) a trade execution computer configured to sell amounts of selected current assets or buy amounts of one or more investment funds in accordance with the specific recommendations.

2. The apparatus of claim 1 wherein the processor is further configured to determine tax impacts of potential sell transactions, the recommendations being selected to minimize the tax impacts.

3. The apparatus of claim 2 wherein the processor is further configured to receives data regarding: (iv) the client's asset portfolio preferences, including current assets that the client wishes to hold or sell, and constraints on asset selling, and the processor is further configured to automatically generate the financial transaction recommendations based on the client's asset portfolio preferences.

4. The apparatus of claim 1 wherein the processor is further configured to determine transaction costs of potential sell transactions, the recommendations being selected to minimize the transaction costs.

5. The apparatus of claim 1 wherein the client's current asset portfolio includes repositionable assets, non-repositionable assets and conditionally repositionable assets, and the processor is configured to generate a recommendation to hold the client's conditionally repositionable assets if the client's new asset allocation will be within a predetermined percentage of the desired asset allocation after selling all of the client's repositionable assets.

6. The apparatus of claim 5 wherein the predetermined percentage is 3%.

7. The apparatus of claim 1 wherein the client's current asset portfolio includes repositionable assets, non-repositionable assets and conditionally repositionable assets, and the processor is configured to treats the conditionally repositionable assets as non-repositionable assets when making the current asset portfolio modifications.

8. The apparatus of claim 1 wherein the client's current asset portfolio includes repositionable assets, non-repositionable assets and conditionally repositionable assets, and the processor is configured to generate a recommendation to sell the client's repositionable assets until the tax cost of selling equals a predetermined percentage of the client's current asset portfolio.

9. The apparatus of claim 1 wherein the recommendations include recommendations to (i) add specific amounts of shares to currently held mutual funds, and (ii) open one or more new mutual funds and contribute specific amounts of shares to the new funds.

10. The apparatus of claim 1 wherein the desired asset allocation is determined based upon the client's Ibbotson score.

11. The apparatus of claim 1 wherein the processor is further configured to generate target portfolio amounts and adjusted target portfolio amounts for each asset category in the desired asset allocation.

12. The apparatus of claim 1 further comprising:
   (c) an input data processor that is configured to:
      (i) receives information regarding the client which is necessary to determine the client's desired asset allocation and the client's preferred domain, and
      (ii) determines and outputs the client's desired asset allocation and the client's preferred domain, wherein the outputted desired asset allocation and preferred domain are inputted into the processor.

* * * * *